United States Patent
Shimizu et al.

(10) Patent No.: US 6,917,842 B2
(45) Date of Patent: Jul. 12, 2005

(54) INFORMATION PROCESSING APPARATUS AND METHOD

(75) Inventors: Kazuma Shimizu, Ibaraki (JP); Ryozo Yanagisawa, Shizuoka (JP); Yoshikazu Sasago, Shizuoka (JP); Yoshiyuki Batori, Shizuoka (JP); Masanari Morioka, Shizuoka (JP); Hiroshi Takarada, Shizuoka (JP); Katsushi Koike, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 10/077,352

(22) Filed: Feb. 15, 2002

(65) Prior Publication Data

US 2002/0149625 A1 Oct. 17, 2002

(30) Foreign Application Priority Data

| Feb. 20, 2001 | (JP) | 2001-044145 |
| Jun. 25, 2001 | (JP) | 2001-191449 |
| Feb. 14, 2002 | (JP) | 2002-036805 |
| Feb. 14, 2002 | (JP) | 2002-036806 |
| Feb. 14, 2002 | (JP) | 2002-036807 |
| Feb. 14, 2002 | (JP) | 2002-037036 |

(51) Int. Cl.[7] .................. G06F 19/00; G06T 17/00
(52) U.S. Cl. ................. 700/96; 700/95; 702/153
(58) Field of Search .............. 700/95, 96; 356/908; 901/46, 47; 345/423, 427; 702/150–153

(56) References Cited

U.S. PATENT DOCUMENTS 4,724,525 A * 2/1988 Purcell et al. ............ 702/168
4,918,627 A    4/1990 Garcia et al.
4,979,224 A   12/1990 Maiocco et al.
5,198,990 A    3/1993 Farzan et al.
5,606,651 A    2/1997 Brown et al.
6,075,539 A    6/2000 Ishida et al.

FOREIGN PATENT DOCUMENTS

| EP | 0874296 A2 | 10/1998 |
| EP | 0884664 A2 | 12/1998 |
| JP | 5-282 388 | 10/1993 |
| JP | 8-82575 | 3/1996 |
| JP | 8-190575 | 7/1996 |
| JP | 8-314985 | 11/1996 |
| JP | 11-143926 | 5/1999 |
| JP | 2000-235594 | 8/2000 |
| KR | 1998-071132 | 10/1998 |

OTHER PUBLICATIONS

Wilson, John "AutoCAD 2000–3D Modeling, A Visual Approach" 2000, Auto Desk Press, Thompson Learning, USA XP002254455.

Cohn S. David "AutoCAD 2000: The Complete Reference"XP–002254456 McGraw–Hill, USA XP002254456.

Partial European Search Report, dated Oct. 1, 2003.

* cited by examiner

Primary Examiner—Jayprakash N. Gandhi
(74) Attorney, Agent, or Firm—Morgan & Finnegan, LLP

(57) ABSTRACT

An information processing apparatus, method and computer readable medium provide for sorting attribution information of a 3D model into a plurality of groups; selecting a group from the plurality of groups; and selectively displaying a part of the attribution information corresponding to the selected group with the 3D model in a virtual 3D space.

11 Claims, 58 Drawing Sheets

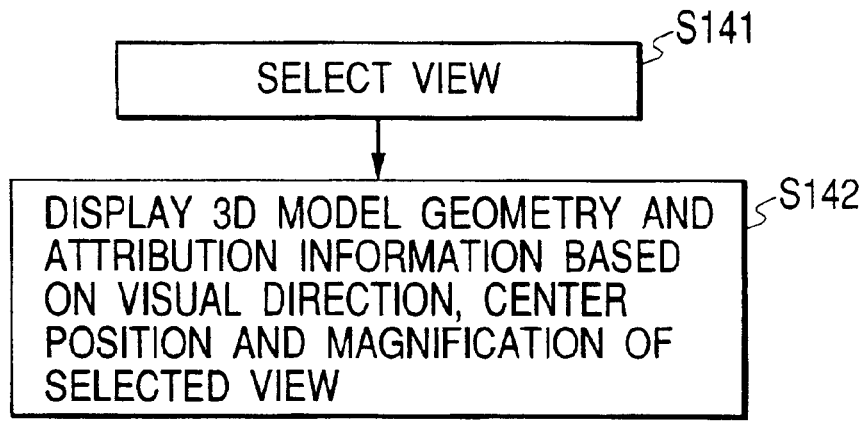
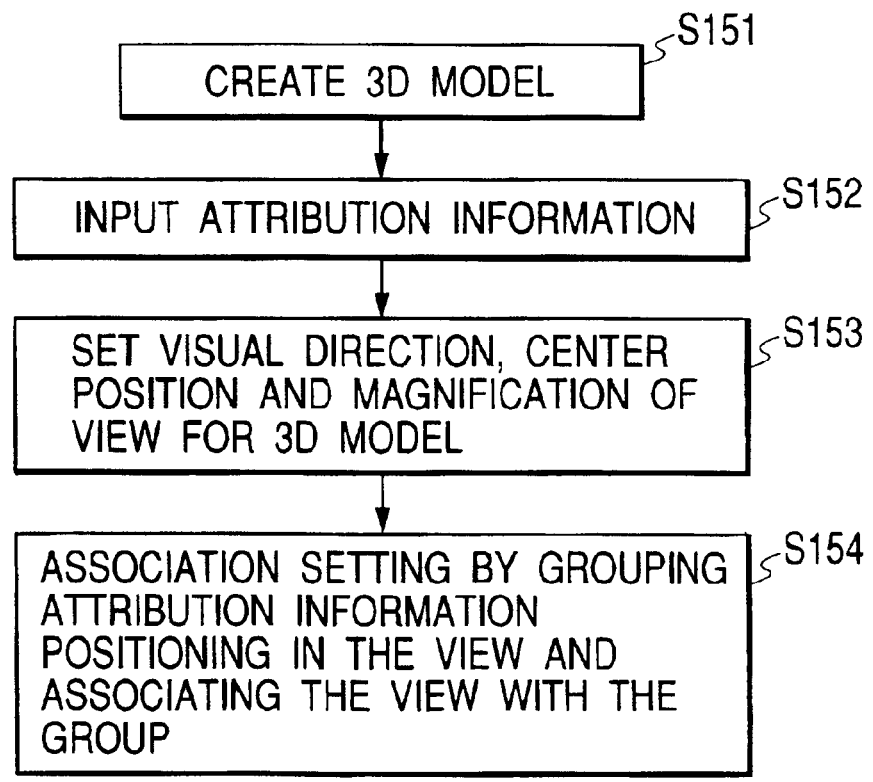

FIG. 28
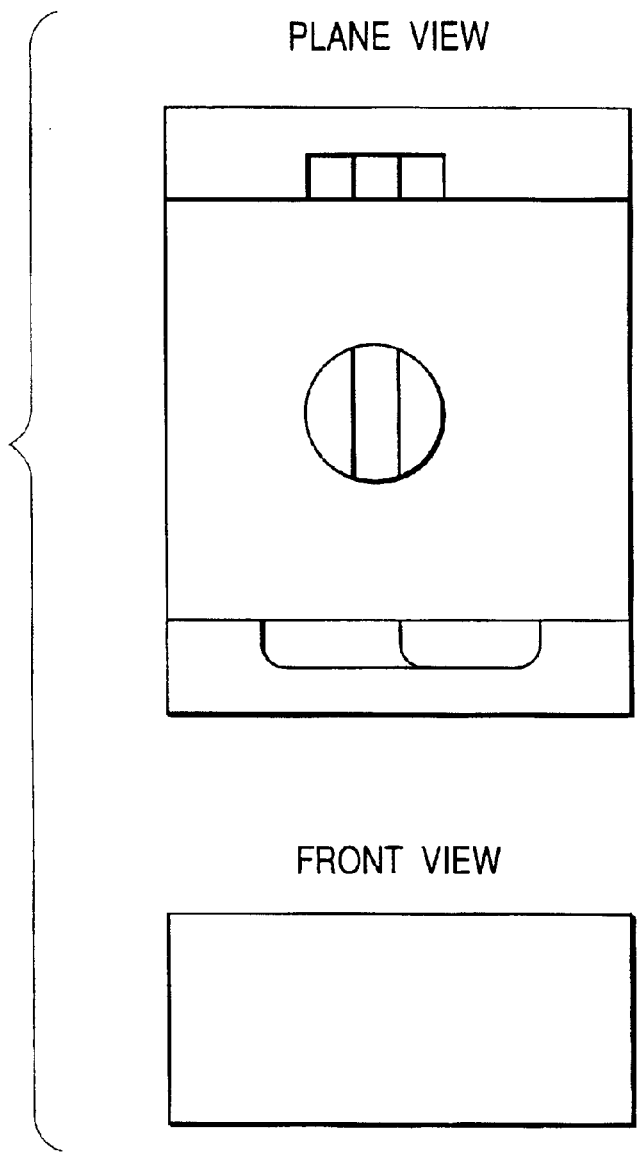
PLANE VIEW
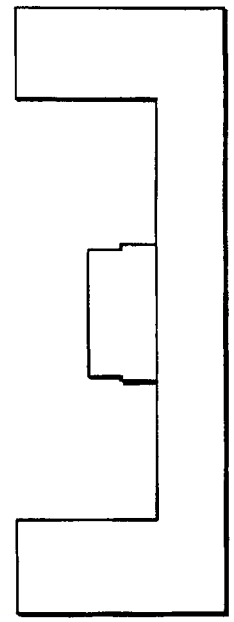
SIDE VIEW
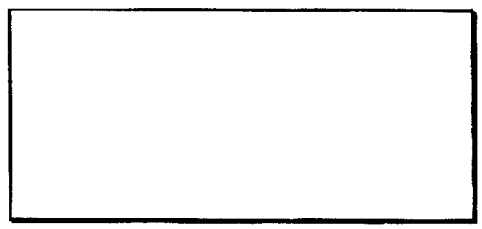
FRONT VIEW

FIG. 32
PLANE VIEW
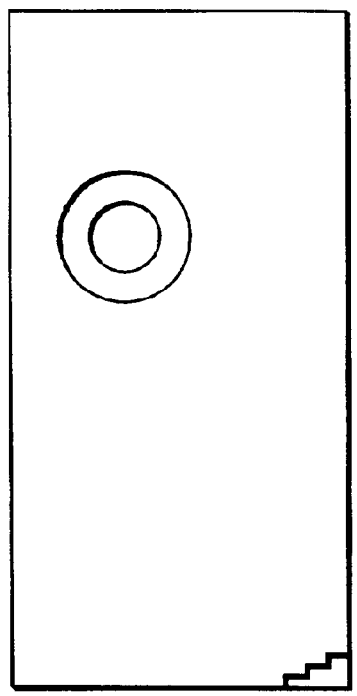
SIDE VIEW
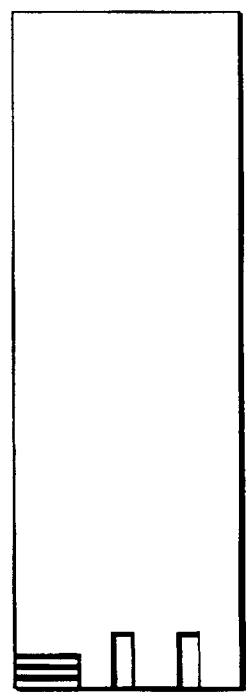
FRONT VIEW
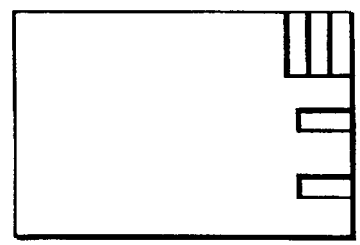

FIG. 41

| IDENTIFIER | POINT ID | COORDINATE | DESIGN VALUE | UPPER LIMIT OF TOLERANCE | LOWER LIMIT OF TOLERANCE | MEASURED VALUE | ATTRIBUTION INFORMATION |
|---|---|---|---|---|---|---|---|
| 31 | | | 50 | 0.1 | −0.1 | | |
| 32 | 1 | 15,15,13 | 27 | 0.05 | −0.05 | | |
| 32 | 2 | 15,30,13 | 27 | 0.05 | −0.05 | | |
| 33 | 1 | 25,10,35 | 25 | 0.05 | −0.05 | | |
| 33 | 2 | 25,20,35 | 25 | 0.05 | −0.05 | | |
| 33 | 3 | 25,30,35 | 25 | 0.05 | −0.05 | | |

FIG. 42
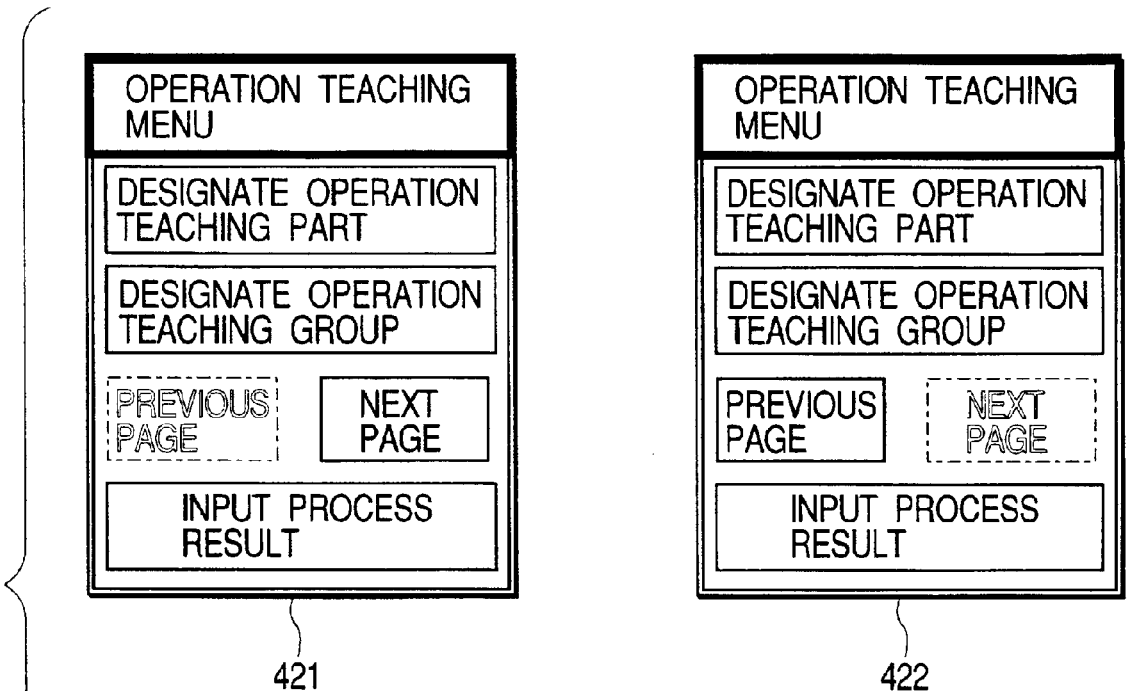
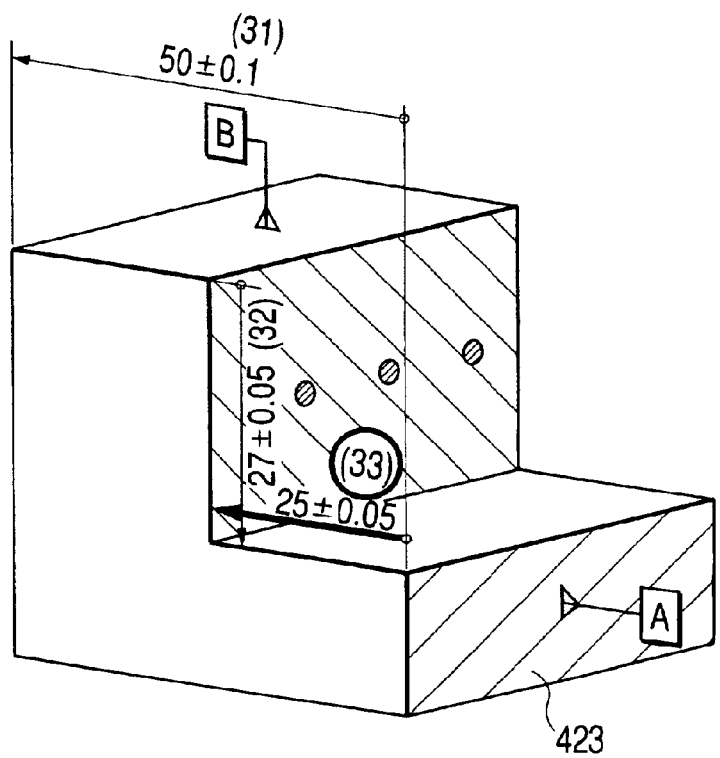

INFORMATION PROCESSING APPARATUS AND METHOD

BACKGROUND OF THE INVENTION

1. Field of the Invention

The present invention relates to an information processing apparatus and a method therefor, and in a method therefor employing a 3D model (computer aided geometry model in 3D) generated by using 3D-CAD.

2. Related Background Art

Conventionally, a CAD apparatus (especially, a 3D-CAD apparatus) is employed to design objects (hereinafter simply referred to as parts) having a three-dimensional shape, such as parts for goods or products. Further, based on this design, metal molds for manufacturing parts are generated.

Before using the design information prepared by the CAD apparatus, attribution information, such as dimensions, dimensional tolerances, geometric tolerances, annotations and symbols, are entered for a 3D model (computer aided geometry model in 3D).

In order to enter this attribution information for the 3D model, planes, ridge lines, center lines and vertexes of the 3D model are selected. For example, attribution information shown in FIG. 29 is entered for a 3D model shown in FIG. 27 (the front view, the plan view and the side view of this 3D model are shown in FIG. 28). The attribution information includes:

(A) distances (lengths, widths and thicknesses), angles, hole diameters, radii, chamfering dimensions, and dimensional tolerances accompanied by dimensions;
(B) geometric tolerances and dimensional tolerances to be added to planes and ridge lines, without dimensions being entered;
(C) annotations to be transmitted or instructed for machining or manufacturing parts, units and products, and symbols that are determined in advance as a premise for representing, for example, surface roughness.

For adding attribution information to a 3D model, roughly two methods, as follow, are employed.

(1) Method for adding dimensions, dimensional tolerances, geometric tolerances, annotations and symbols Dimension lines and projection lines are required for the entry of dimensions and dimensional tolerances.

Leader lines are required for the entry of geometric tolerances, annotations and symbols.

(2) Method for adding dimensional tolerances, geometric tolerances, annotations and symbols without dimensions being provided.

Dimension lines and projection lines are not required.

Leader lines are required for the entry of dimensional tolerances, geometric tolerances, annotations and symbols.

For a downstream process, such as a metal mold manufacturing process, attribution information is confirmed by referring to a CAD model or a 2D drawing (drawing in 2 dimention), and molding products and metal mold parts are inspected.

For the metal mold manufacturing process, the inspection of molding products is performed after the metal mold design, the NC programming, the metal mold manufacture and the molding steps have been completed.

For the inspection of a molding project, a manual measuring instrument or an automatic measuring instrument, such as a CMM, a microscope or a micrometer, is employed based on such design information as the designated dimensional tolerances for a drawing or a model.

A three-dimensional measuring instrument measures (for each plan) a molded product in each of several directions, such as the obverse, the reverse and the right and left of the product. When a 2D drawing is employed, a double measurement is performed by adding marks to the measured dimension, or carefully without missing a measurement.

When a molded product is inspected in the conventional manner, the following problems have arisen.

(1) The measurements must be conducted while taking into account which measurement instrument should be employed for each dimension, and the same dimension must be referred to many times to determine whether it has already been measured, or whether it should be measured by employing the measurement instrument being used at the pertinent step. Thus, an extended period of time is required to complete the measurements.

(2) The measurements must be conducted in order by using each measurement instrument or each plan for a measurement instrument. For example, measurement steps are conducted in the following order: dimension measurements are performed using a CMM (three-dimensional measurement instrument), then, a microscope is used, when there are measurements that not obtained using a CMM, and if all such measurements are not obtained using a microscope, a micrometer is used. The total measurement time, therefore, is extended.

(3) Design information for several tens, or hundreds or more dimensions are provided as attribution information for a drawing or a model. For the measurement of dimensions, required information must be extracted to identify the portion that is to be measured, and for a complicated model, target dimensions must be searched for while the measurements are being made. Therefore, an extended period of time is required.

(4) Since marks representing measurements that have been obtained are added to a drawing while the measurement process is in progress, omissions, clerical errors and oversights tend to occur. And frequently, at the end of the measurement process, an examination reveals portions that were missed or for which measurements were not obtained, and measurements made for the dimensions of these portions must be repeated using the individual measurement instruments. Therefore, time for backtracking is required.

(5) The measurement values and the portions measured using measurement instruments are transferred to paper and are compared with the dimensions. Therefore, time is required to perform this comparison of the measurement results.

Furthermore, identifiers are added so that sizes can be compared with measurement results. Therefore, measurement values are generally recorded with the identifiers, so that measurement results can be compared with dimensions to which identifiers on a drawing are attached.

In Japanese Patent Application Laid-Open No. 5-282388 a dimension inspection apparatus adds an identifier to a CAD drawing and prints a measurement examination sheet, or outputs data to a measurement instrument.

According to this method, the system automatically adds identifiers and displays data in order to reduce the labor effort required and to eliminate errors. The contents of the identifiers to be added need not be designated in advance.

In addition, in Japanese Patent Application Laid-Open No. 08-082575 a method and an apparatus for generating and displaying an evaluation table automates the collection of measurement results, so as to improve the efficiency of the measurement process.

Further, described in Japanese Patent Application Laid-Open No. 08-190575 are "an apparatus and a method for teaching an inspection", and described in Japanese Patent Application Laid-Open No. 2000-235594 are "a CAD system and a method for inspecting a measured dimension value", while the measurement instrument is limited to a CMM and an identifier for a dimension is added to CMM path data, so that a measured value is output with the identifier to the output file of the three-dimensional measurement instrument and the measurement results can be read by the CAD system and compared with the dimensions. Furthermore, a CAD system available on the market also handles a method for adding an identifier to a dimension and outputting CMM path data, and for reading the measurement results and comparing them with the dimensions.

When the measurement results are to be compared with the dimensions, however, conventionally, the following problems and requests have arisen.

(6) The conventional technique limits the measurement instrument that is used to an automated measurement instrument, such as a CMM, and does not support the use for a measurement operation of a manual measurement instrument, such as a micrometer.

(7) Even an automated measurement instrument, such as a CMM, may not easily prepare a measurement program on a CAD screen (off-line teaching), and the conventional technique does not support the generation (on-line teaching) of a measurement program using a CMM.

(8) The capability of an operation using a manual measurement instrument and the off-line teaching using an automated measurement instrument is not taken into account for the conventional automatic identifier addition system. Thus, an improved function for transmitting information to an operator (a function for the visibility of an identifier, etc.) is required.

(9) In the inspection process, a large number of steps are required for manual on-line teaching and for manual measurement. Therefore, for both aspects of the cost and the delivery deadline, a demand exists for the improvement of the operating efficiency and for a reduction in the number of steps.

(10) Measurements must be conducted while taking into account which measurement instrument should be employed for each dimension, and the same dimension must be referred to many times so as to determine whether it has been already measured, or whether it should be measured by employing the measurement instrument used for the pertinent step. Thus, an extended period of time is required for measurements.

(11) Measurements must be conducted in order by using each measurement instrument or in accordance with a plan that provides for the use of each measurement instrument. For example, measurement steps are performed in the following order: dimension measurements are normally performed using a CMM (three-dimensional measurement instrument), then, a microscope is used when there are measurements that are not obtained using a CMM, and if all such measurements are not obtained using a microscope, a micrometer is used. The total measurement time, therefore, is extended.

(12) Conventionally, a 2D drawing is employed to transmit design/manufacturing information, and a great number of steps is required for the generation of the 2D drawing. To eliminate this problem, it is anticipated that when a "paper drawing-less" (hereinafter referred to as drawing-less ) process is implemented whereby design information is transmitted by adding design/manufacturing information, such as dimension tolerances, to a 3D model, the number of steps required for the transmission of data can be considerably reduced.

(13) A method for performing measurements while referring to the dimensional tolerances added to a 2D drawing is set up for the inspection step, and a system for efficiently measuring dimensions while referring to attribution information added to a 3D model is required to implement the "drawing-less" process and to reduce the number of data transmission steps and the cost.

(14) Design information for several tens or hundreds or more dimensions are provided as attribution information for a drawing or a model. Then, for the measurement of the dimensions, required information must be extracted to identify portions to be measured, and for a complicated model, target dimensions must be searched for while the processing for the measurements is conducted. An extended period of time is therefore required.

(15) Since marks representing the measurements that have been completed are added to a drawing while the measurement process is being performed, omissions, clerical errors and oversights tend to occur. And frequently, after the measurement process has been completed, a drawing is examined and a portion is found that was missed and for which measurements were not obtained, and for this portion the dimensions must again be measured using individual measurement instruments. Time is therefore required to counter this setback.

At an inspection step, measurement points representing a portion to be measured are determined for the addition of attribution information, such as dimensional tolerances, and a measurement program is generated that provides for the use of a manual measurement instrument for the measurements.

Using a pen, marks are added to portions on a drawing printed on paper as measurement points that correspond to locations that are to be measured, or measurement points are added to a CAD model using a CAD apparatus. Further, a measurement program is prepared by referring to the information for the measurement points added to the CAD model.

Then, at the NC programming step, offset values equivalent to cut margins are added as attribution information to the CAD model and an NC program is prepared.

When the CAD model is later changed by altering its design, generally it is exchanged for another model during the downstream process, and additional information, such as measurement points currently carried by the CAD model or offset values equivalent to the cut margin, is added to the CAD model after the change.

Usually, when a plurality of operators handle the same data, the following three methods are employed.

A. Exclusive Control

A change right is designated for data, and only an operator having this right may change that data. When another operator is to correct data for which a change right exists, the current holder of the change right must terminate any alteration operation, stabilize the data being processed, and release the right change to the other. Then, the other operator, to whom the change right has been transferred, may operate on the stored data. The change right is owned by only one person at a time.

B. Synchronization Across a Network

When a computer transmits alteration information as operating change procedures to other computers to which it is connected via a network, the altered content is reflected in the data originally held by the receiving computers.

C. Manual Re-Input

A portion containing changes is evaluated and manually employed so it is reflected in the CAD model for which the added information is provided, or the added information is used for the re-entry of data in the model being updated.

When data has been shared in the above described manner, the following problems and demands have arisen.

(16) For exclusive control, it is difficult for parallel operations to be simultaneously performed, even though consistency of data by using common data can be maintained.
(17) Synchronization across a network must be controlled by the operator of a terminal connected to the network, and temporarily proceeding with an independent operation is difficult.
(18) Although additional information can be re-entered manually and independently, the labor for re-entry and entry of omissions may be required.
(19) When data is altered, it is also difficult to identify the portion that has been altered.

SUMMARY OF THE INVENTION

In order to resolve at least one of the problems, it is one objective of the present invention to add, to data generated by a CAD apparatus, attributions for improving operability. It is another objective of the present invention to efficiently perform an inspection using data generated by a CAD apparatus.

Accordingly, an object of the present invention is to provide an information processing apparatus comprising:

attribution input means for entering attribution information for a 3D model;

attribution categorization means for sorting the attribution information into a plurality of groups;

attribution display means for displaying attribution information for each of the groups.

Another object of the present invention is to provide an information processing method comprising:

an attribution input step of entering attribution information for a 3D model;

an attribution categorization step of sorting the attribution information into a plurality of groups;

an attribution display step of displaying attribution information for each of the groups.

Another object of the present invention is to provide a computer executable program product comprising:

code for entering attribution information for a 3D model;

code for sorting the attribution information into a plurality of groups;

code for displaying attribution information for each of the groups.

Another object of the present invention is to provide an information processing apparatus comprising:

visual line setting means for defining an arbitrary visual direction and a visual line for a 3D model;

attribution entering means for categorizing, into groups, attribution information corresponding to the arbitrary visual direction set by the visual line setting means, and for adding the categorized attribution information to the groups;

storage means for storing the visual direction in correlation with the categorized attribution information groups;

designation means for designating the visual direction; and display means for displaying an attribution information group that corresponds to the visual direction designated by the designation means.

Another object of the present invention is to provide an information processing method comprising:

a visual line setting step of defining an arbitrary visual direction and a visual line for a 3D model;

an attribution entering step of categorizing, into groups, attribution information corresponding to the arbitrary visual direction set at the visual line setting step, and of adding the categorized attribution information to the groups;

a storage step of storing the visual direction in correlation with the categorized attribution information groups;

a designation step of designating the visual direction; and a display step of displaying an attribution information group that corresponds to the visual direction designated at the designation step.

Another object of the present invention is to provide a computer executable program comprising:

code for defining an arbitrary visual direction and a visual line for a 3D model;

code for categorizing, into groups, attribution information corresponding to the arbitrary visual direction set at the visual line setting step, and for adding the categorized attribution information to the groups;

code for storing the visual direction in correlation with the categorized attribution information groups;

code for designating the visual direction; and code for displaying an attribution information group that corresponds to the visual direction designated at the designation step.

Another object of the present invention is to provide an information processing apparatus comprising:

identifier addition means for adding an identifier to attribution information, including a CAD model dimension;

operation teaching means for teaching operation results, such as measurement results;

operation results reading means for, based on the identifier, reading the operation results and the attribution information in correlation with each other; and operation results display means for displaying the operation results in correlation with the CAD model.

Another object of the present invention is to provide an information processing method comprising:

an identifier addition step of adding an identifier to attribution information, including a CAD model dimension;

an operation teaching step of teaching operation results, such as measurement results;

an operation results reading step of, based on the identifier, reading the operation results and the attribution information in correlation with each other; and an operation results display step of displaying the operation results in correlation with the CAD model.

Another object of the present invention is to provide a computer executable program comprising:

code for adding an identifier to attribution information, including a CAD model dimension;

code for teaching operation results, such as measurement results;

code for, based on the identifier, reading the operation results and the attribution information in correlation with each other; and code for displaying the operation results in correlation with the CAD model.

Another object of the present invention is to provide an information processing apparatus comprising:

attribution information comparison means for comparing old attribution information with new attribution information; and additional information transfer means for, when the old and the new attribution information correspond, transferring additional information provided for the old attribution information to the new attribution information.

Another object of the present invention is to provide an information processing method comprising:

an attribution information comparison step of comparing old attribution information with new attribution information; and an additional information transfer step of, when the old and the attribution information correspond, transferring additional information provided for the old attribution information to the new attribution information.

Another object of the present invention is to provide a computer executable program comprising:

code for comparing old attribution information with new attribution information; and code for, when the old and the new attribution information correspond, transferring additional information provided for the old attribution information to the new attribution information.

Another object of the present invention is to provide an information processing apparatus comprising:

attribution information comparison means for comparing old attribution information with new attribution information; and changed attribution information teaching means for displaying changed attribution information in correlation with data.

Another object of the present invention is to provide an information processing method comprising:

an attribution information comparison step of comparing old attribution information with new attribution information; and a changed attribution information teaching step of displaying changed attribution information in correlation with data.

BRIEF DESCRIPTION OF THE DRAWINGS

FIG. 14 is a flowchart showing the processing for adding attribution information to a 3D model;

FIG. 15 is a flowchart showing the processing for adding attribution information to a 3D model;

FIG. 28 is a front view, a plan view and a side view of the 3D model in FIG. 27;

FIG. 32 is a front view, a plan view and a side view of the 3D model;

FIG. 41 is a conceptual diagram showing data used for measurement;

FIG. 42 is a diagram showing an operation teaching process for a 3D model;

DESCRIPTION OF THE PREFERRED EMBODIMENT

One embodiment of the present invention will now be described in detail while referring to the accompanying drawings.

General Processing for Metal Mold Production

Figure 1:
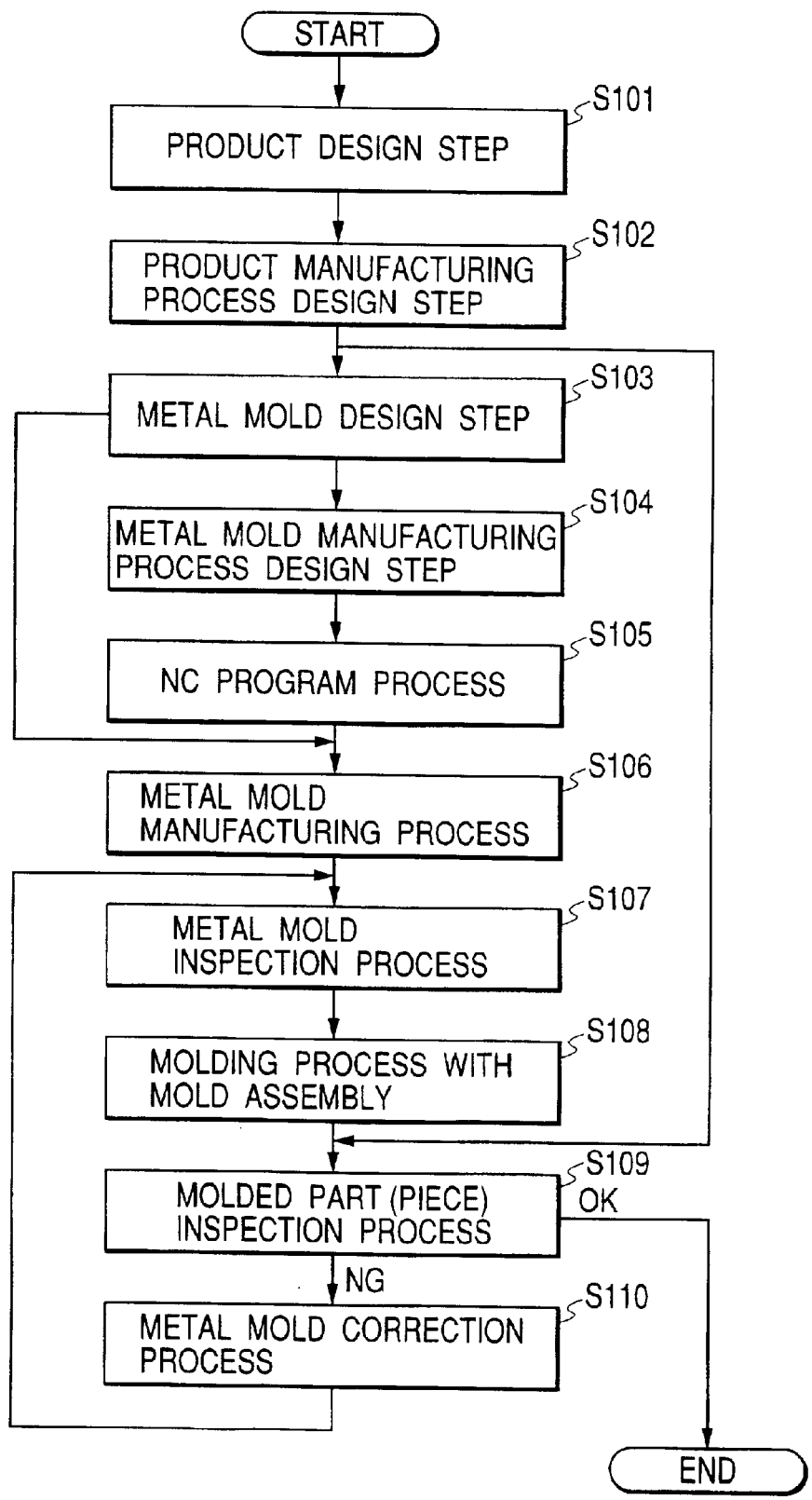
FIG. 1 is a flowchart showing the general processing for molded metal part mold production.

FIG. 1 is a flowchart showing the general processing performed when the present invention is applied for the production of a metal mold for molded parts.

In FIG. 1, at step S101 a product is designed and design drawings for individual parts are prepared. The design drawings of the parts include required information for the production of parts and limitations. The design drawings of the parts are generated by a Computer Aided Design in 2 Dimension (2D-CAD) or a Computer Aided Design in 3 Dimension (3D-CAD) system, and the drawing generated by the 3D-CAD system (3D drawing) includes attribution information such as geometric and dimensional tolerances. The dimensional tolerances can be correlated with the geometry (a plane, a ridge line, a point), and is used to instruct the inspection of a product and to instruct metal mold accuracy.

At step S102, the manufacturing, such as the assembly or the molding of a product, is studied, and a process drawing is generated for each part. The process drawing for a part includes detailed inspection instructions in addition to information required for parts manufacture. A 2D-CAD or a 3D-CAD system is employed to generate the process drawing for the part.

Example inspection instructions are:
(1) numbering of items to be measured (dimensions or dimensional tolerances); and
(2) an instruction for a measurement point or a measurement method for an item to be measured.

At step S103, a metal mold is designed based on the process drawing (a step drawing and a metal mold specification) for the part prepared at step S102, and a metal mold drawing is generated. The metal mold drawing includes information required for metal mold manufacture and a restriction condition. The metal mold drawing is generated by a 2D-CAD or a 3D-CAD system, and the metal mold drawing (3D drawing) generated by the 3D-CAD system includes attribution information, such as dimensions and dimensional tolerances.

At step S104 the process for the manufacture of the metal mold is studied based on the metal mold drawing generated at step S103, and a metal mold process drawing is generated. The metal mold manufacturing process includes NC machining and general machining. For the steps of the NC manufacturing (automatic machining using numerical control), an instruction for generating an NC program is issued. For the general machining (manual machining), an instruction for performing the general machining is issued.

At step S105, an NC program is generated based on the metal mold drawing.

At step S106, a machine is used to manufacture a metal mold part.

At step S107, the obtained metal mold part is inspected based on the information generated at step S103.

At step S108, metal mold parts are assembled to form a mold.

At step S109, a part obtained by molding is inspected based on the information generated at steps S101 and S102. If the part passes the inspection, the processing is thereafter terminated.

At step S110, based on the inspection results at step S109, a metal mold is corrected for which the accuracy of the molded product is insufficient.

(Product Design)

An explanation will now be given for the design of a product and the generation of a design drawing for each part. The design drawing for the part is generated using a 2D-CAD or a 3D-CAD system.

First, the design of a part will be explained by using an information processing apparatus illustrated in FIG. 2, e.g., a CAD apparatus.

Figure 2:
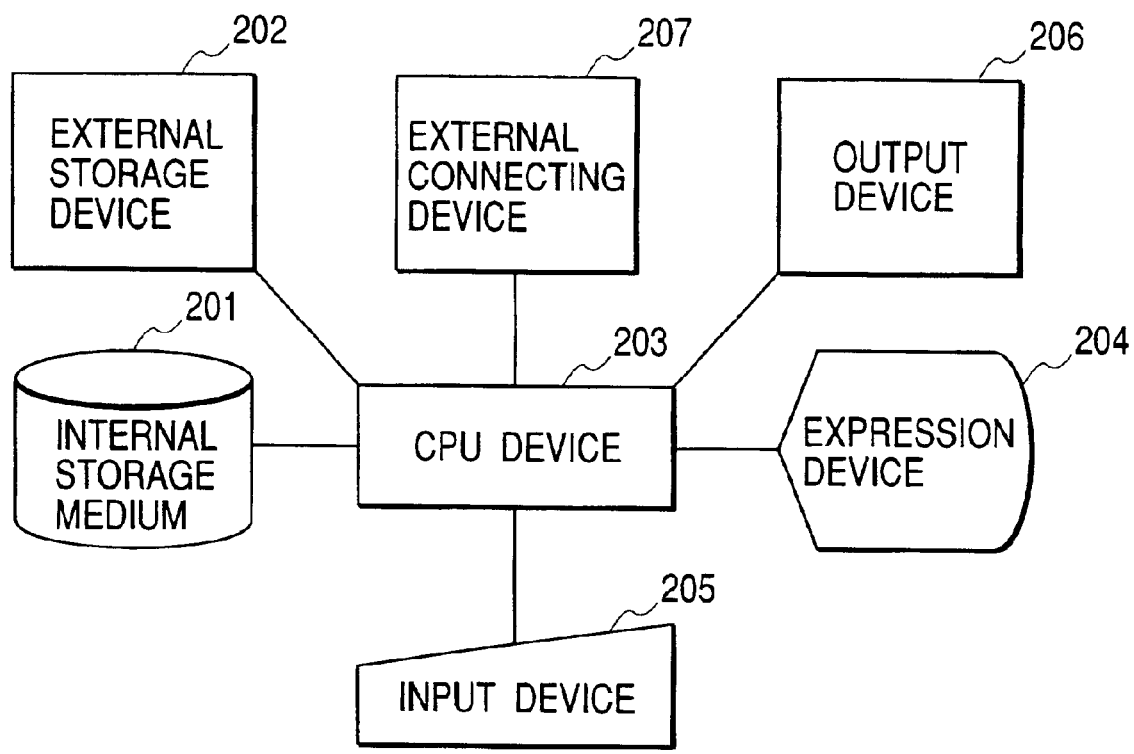
FIG. 2 is a block diagram showing a CAD apparatus.

FIG. 2 is a block diagram of a CAD apparatus. In FIG. 2, an internal storage medium 201 and an external storage device 202 are semiconductor storage devices or magnetic storage devices, such as RAMs, for storing CAD data and a CAD program.

A CPU device 203 performs the processing in accordance with a CAD program command.

A display device 204 is used to display the geometry in accordance with a command received from the CPU device 203.

An input device 205, such as a mouse or a keyboard, is used to provide an instruction for the CAD program.

An output device 206, such as a printer, outputs a drawing sheet in accordance with a command received from the CPU device 203.

An external connecting device 207 connects the CAD apparatus to an external device, supplies data received from the CAD apparatus to an external device, or permits an external device to control the CAD apparatus.

Figure 3:
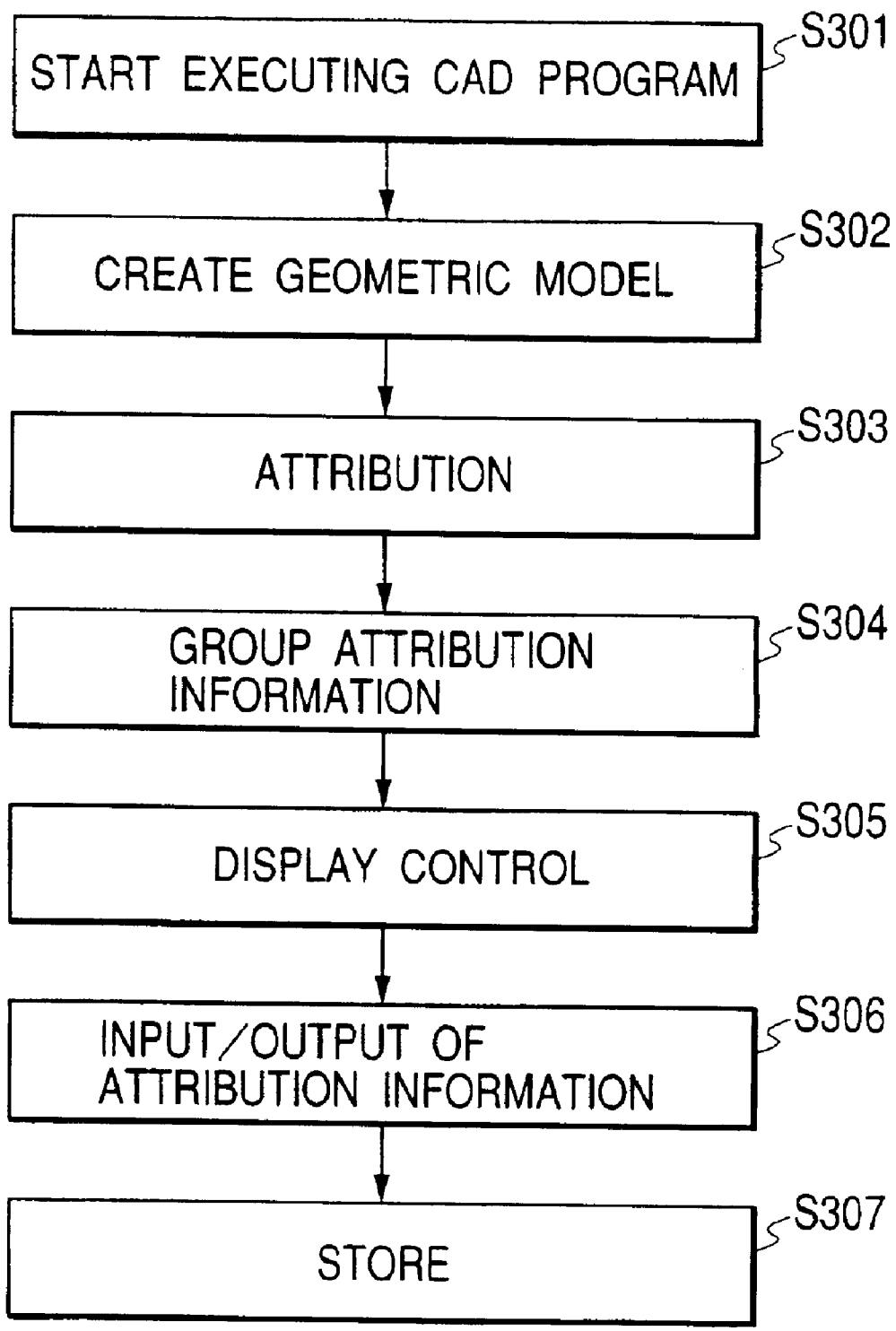
FIG. 3 is a flowchart showing the processing performed by the CAD apparatus in FIG. 2.

FIG. 3 is a flowchart showing the processing performed by the CAD apparatus in FIG. 2.

First, when an operator uses the input device 205 to enter an instruction to activate the CAD program, the CAD program stored in the external storage device 202 is read into the internal storage medium 201 and is executed by the CPU device 203 (step S301).

Then, in consequence with instructions interactively entered by the operator using the input device 205, a geometry model, which will be described later, is generated in the internal storage medium 201 and is displayed as an image on the display device 204 (step S302). Further, when the operator uses the input device 205 to designate a file name, the previously prepared geometry model stored in the external storage device 202 can be read into the internal storage medium 201 where it can be handled by the CAD program.

The operator employs the input device 205 to add, as attribution information, a dimensional tolerance to a geometry model (step S303). The added attribution information can be displayed as image information, such as labels, on the display device 204, and is stored in the internal storage medium 201 in correlation with the geometry model.

To provide total control for the display of the attribution information, the operator uses the input device 205 to designate a search condition and to provide information, which is stored on the internal storage medium 201, for the group for the attribution information (step S304). For this, the operator can designate a group and provide an attribution in advance. In addition, the operator can use the input device 205 to register the attribution information in a group or to delete it therefrom.

Next, the operator uses the input device 205 to designate a condition, such as a group, and to exercise display control, such as the display or non-display of attribution information or the colors used for the attribution information (step S305). Further, for a geometry model the operator uses the input device 205 to set up a display method, such as a display direction, a magnification power or the center position of the display. Since the display device is designated afterwards, the display direction, the magnification and the display center that are designated can be used for the display of the geometry model. Further, since the display method can be correlated with the grouped attribution information, when the display method is designated, only the correlated attribution information is displayed. The display method is stored on the internal storage medium 201.

The attribution information is stored in the external storage device 202 as instructed by the operator (step S306). An identifier may be added to the attribution information, and may be stored with the attribution information in the external storage device 202. This identifier can be used to correlate the attribution information with other data.

Further, the attribution information can be updated by reading from the external storage device 202 to the internal storage medium 201 the information added to the attribution information.

Next, the operator uses the input device 205 to store, in the external storage deice 202, a CAD attribution model obtained by adding the attribution information to the geometry model (step S307).

The geometry model and the CAD attribution model will now be described.

Figure 4:
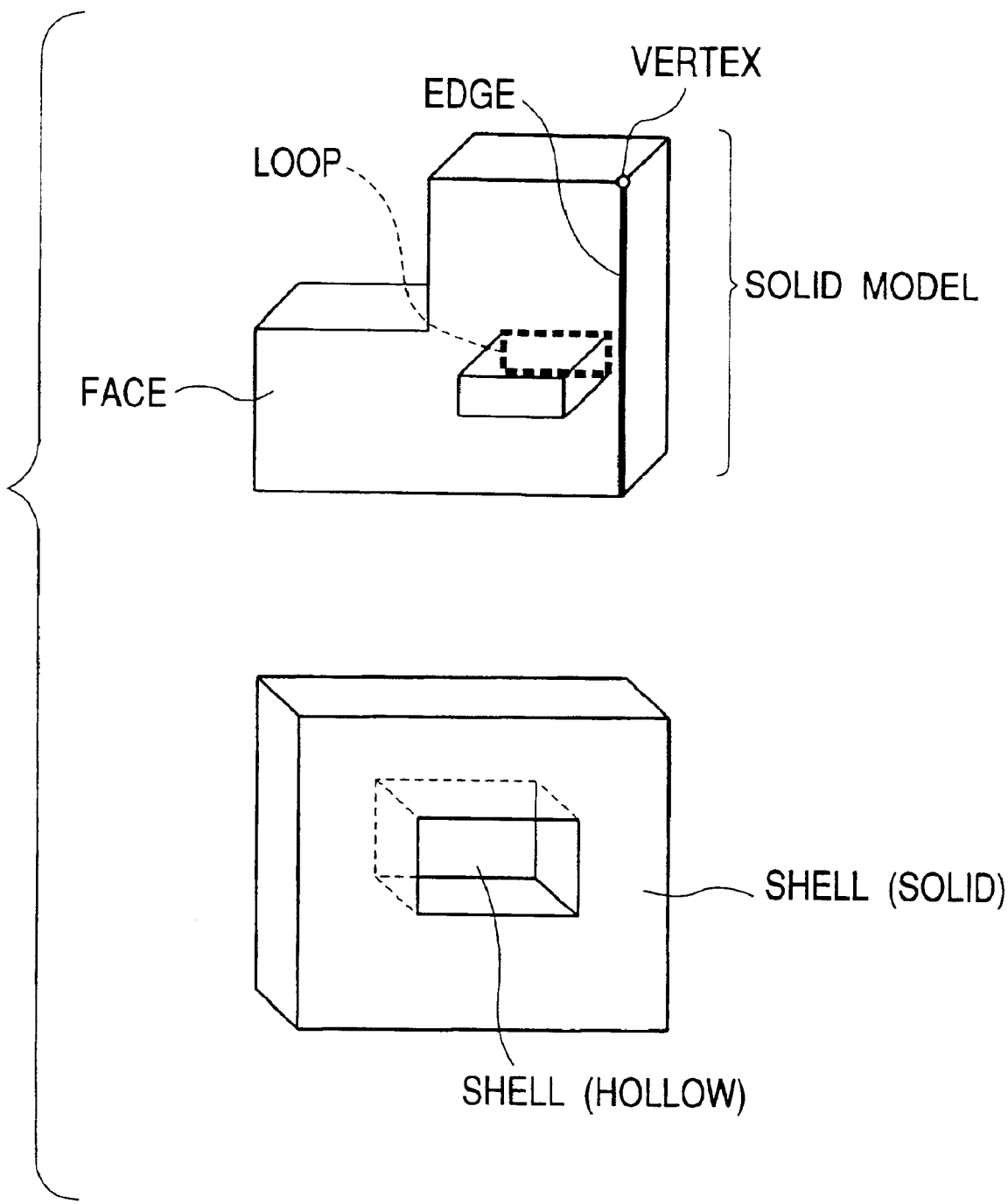
FIG. 4 is a diagram showing an example geometry model.
Figure 5:
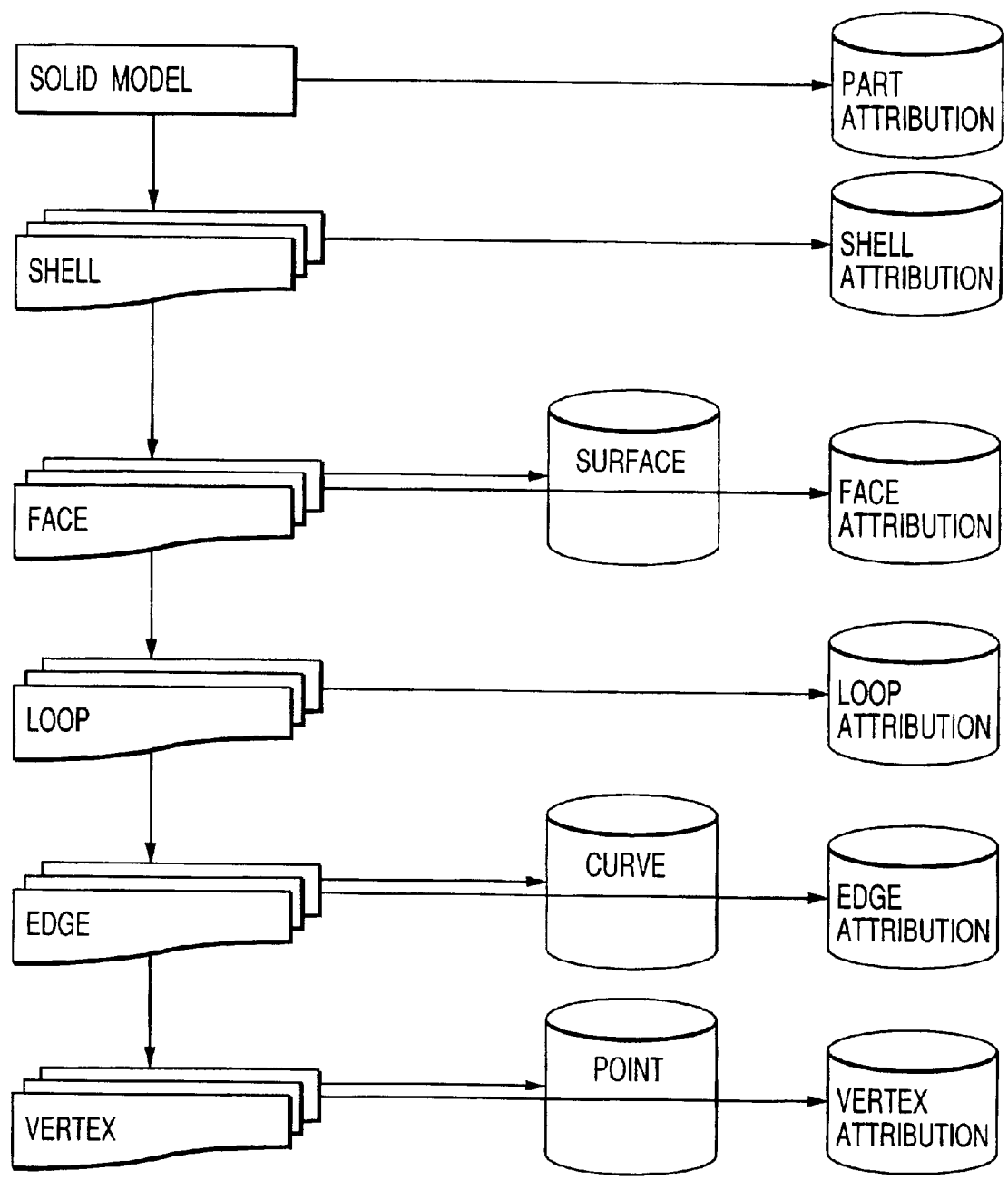
FIG. 5 is a conceptual diagram showing the correlation of individual sections constituting a geometry model.

FIG. 4 is a diagram showing an example geometry model, and FIG. 5 is a conceptual diagram showing the correlation of the individual portions that constitute the geometry model.

In FIG. 4, SolidModel is shown as a typical example for the geometry model. As is shown in FIG. 4, the SolidModel information is used as an expression method whereby CAD is employed to define in a three-dimensional space the geometry of a part, which includes topological information (Topology) and geometric information (Geometry). As is shown in FIG. 5, the topological information for the Solid-Model is hierarchically stored on the internal storage medium 201, and includes one or more than Shell, one or more than Face for one Shell, one or more than Loop for one Face, one or more than Edge for one Loop and two Vertexes for one Edge.

Further, Surface information that expresses the Face geometry, such as a flat plane or a cylindrical plane, is stored on the internal storage medium 201 in correlation with the Face. Also, Curve information that expresses Edge geometry, such as a linear line or an arc, is stored on the internal storage medium 201 in correlation with the Edge. And in addition, the coordinates in the three-dimension space are stored on the internal storage medium 201 in correlation with the Vertexes.

For the topological elements of the Shell, the Face, the Loop and the Vertex, correlated attribution information is stored on the internal storage medium 201.

As an example, the method for storing the Face information on the internal storage medium 201 will now be described.

Figure 6:
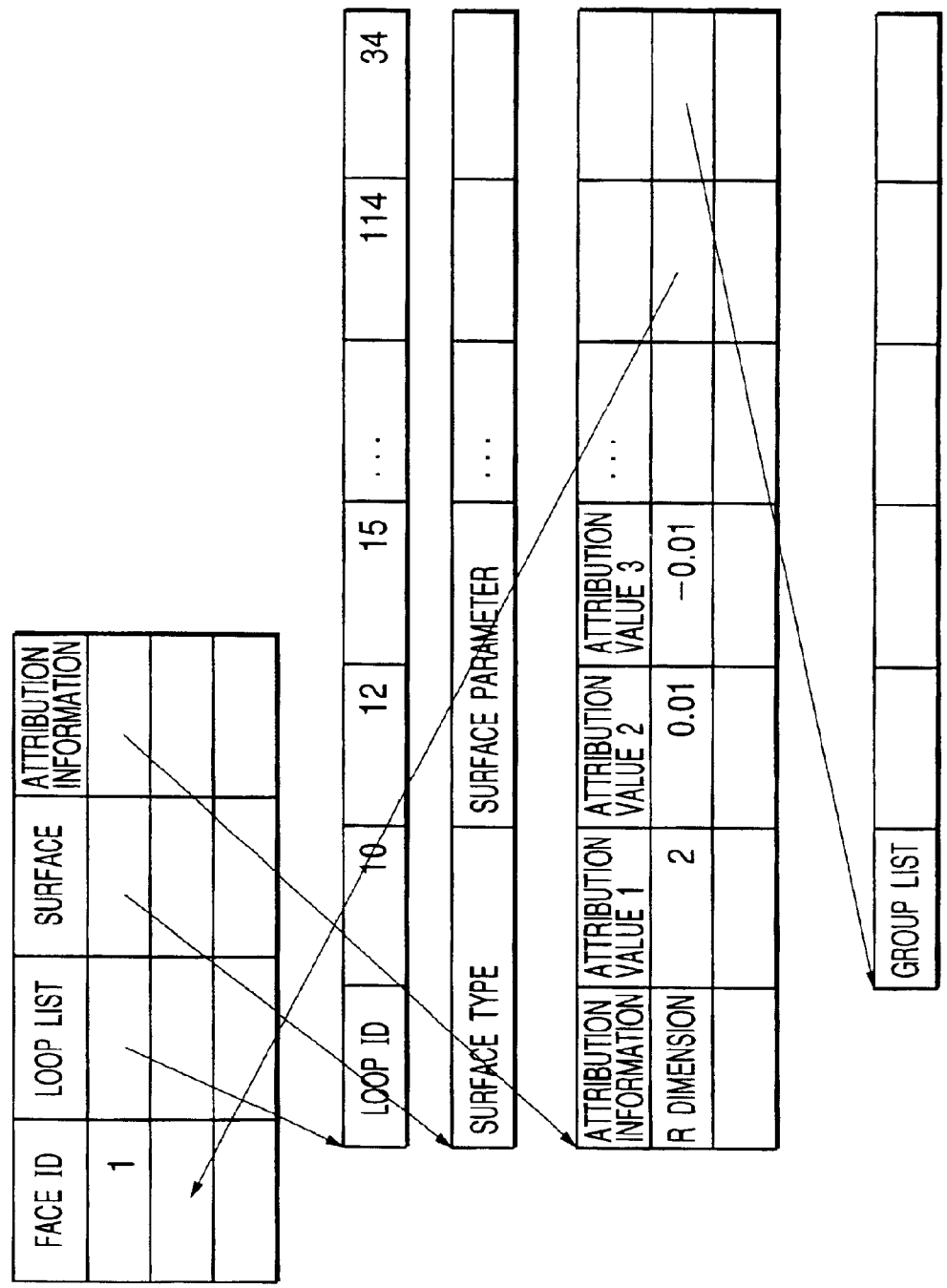
FIG. 6 is a conceptual diagram showing a method used for storing Face information in an internal storage medium 201.

FIG. 6 is a conceptual diagram showing the method for storing the Face information on the internal storage medium 201.

As is shown in FIG. 6, the Face information includes a FaceID, a pointer to LoopList, which constitutes the Face, a pointer to the Surface data, which represents the Face geometry, and a pointer to the attribution information.

LoopList is a list of the IDs of all the Loops that constitute the Face. The Surface data includes SurfaceType and SurfaceParameter, which is consonant with SurfaceType. The attribution information includes an attribution type and an attribution value consonant with the attribution type, and the attribution information includes a pointer to the Face and a pointer to a group to which an attribution belongs.

(Input and Display of Attribution Information for a 3D Model)

A detail explanation will now be given for the processing for entering attribution information for a 3D model, and for displaying a 3D model to which the attribution information is added.

Figure 10A:
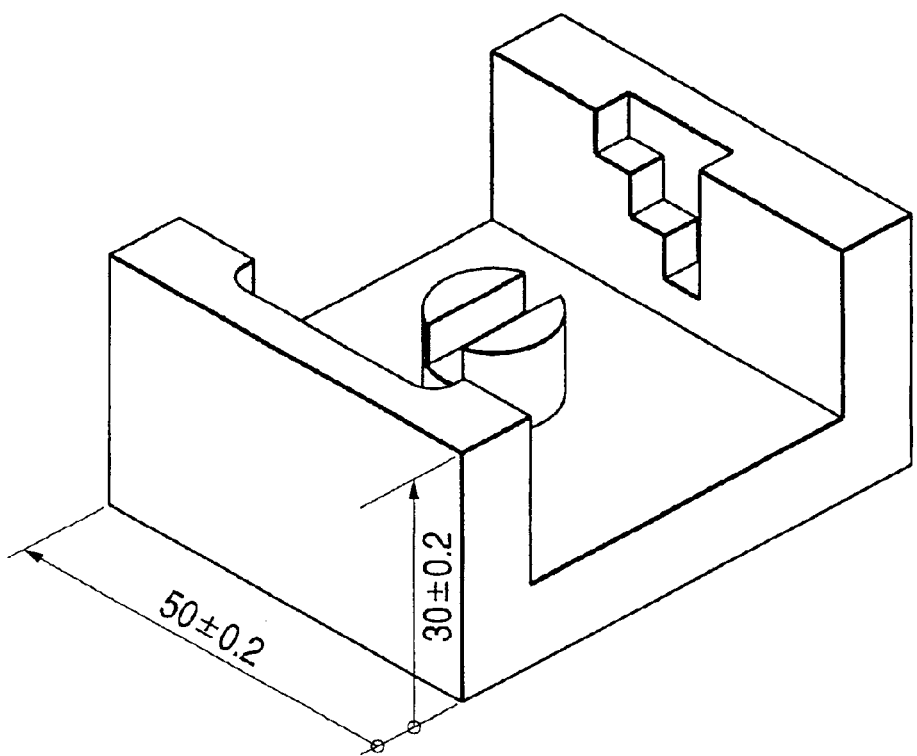
FIGS. 10A and 10B are diagrams showing a 3D model and accompanying attribution information.
Figure 10B:
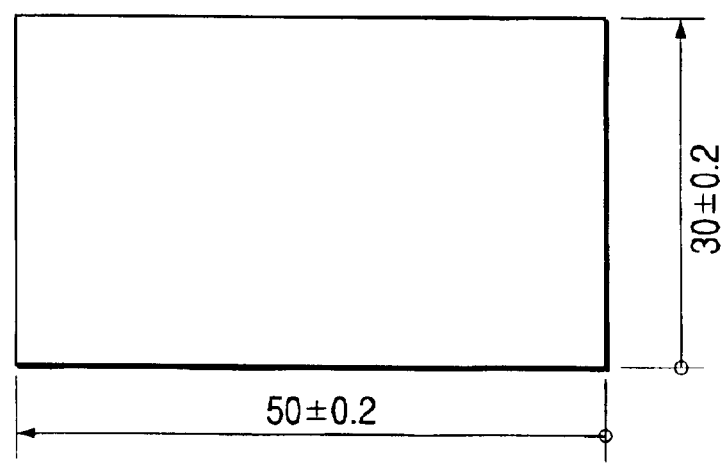
Figure 11A:
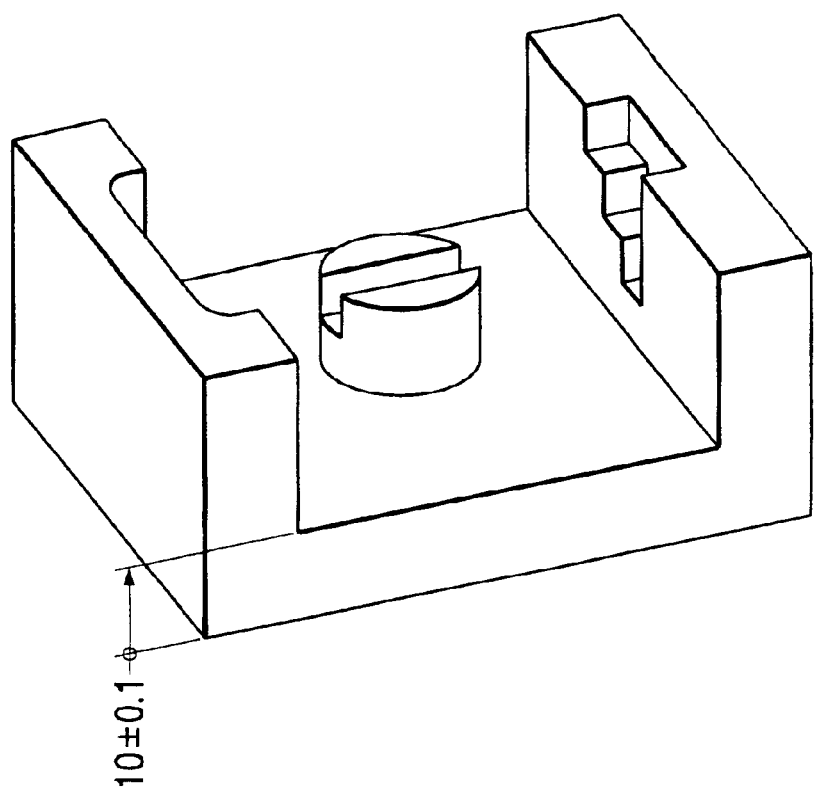
FIGS. 11A and 11B are diagrams showing a 3D model and accompanying attribution information.
Figure 11B:
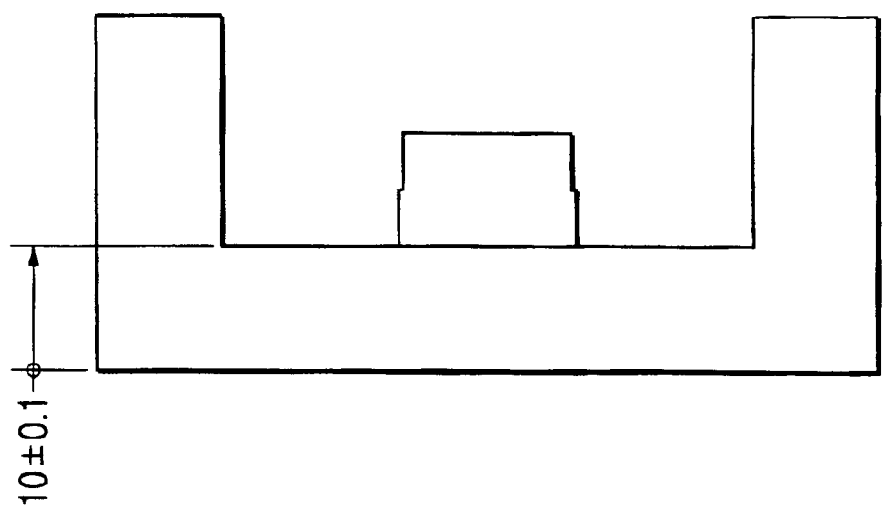
Figure 12:
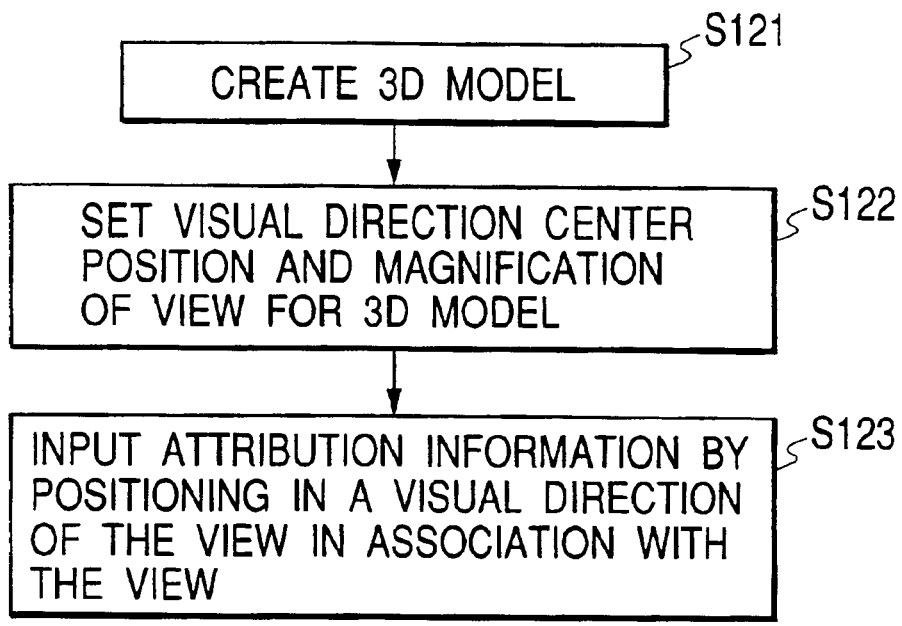
FIG. 12 is a flowchart showing the processing for adding attribution information to a 3D model.
Figure 13:
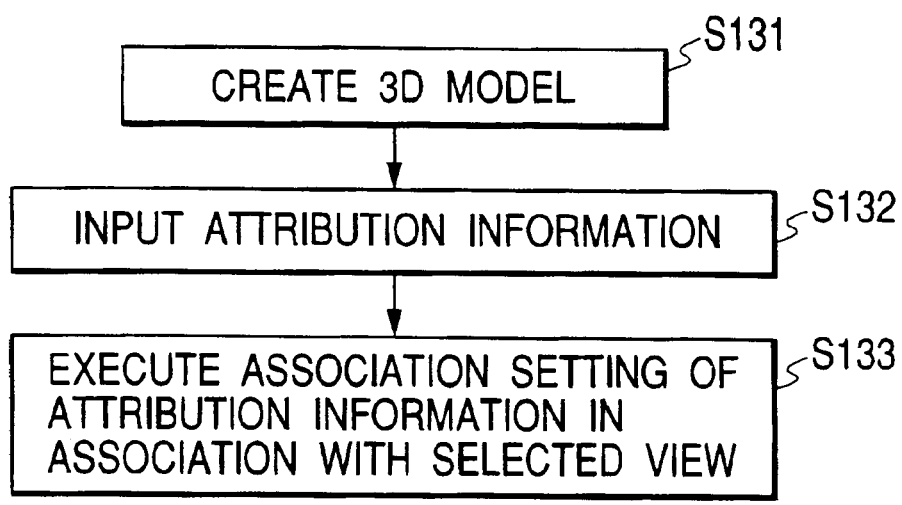
FIG. 13 is a flowchart showing the processing for adding attribution information to a 3D model.

FIGS. 7 to 11A and 11B are diagrams showing a 3D model and attribution information, and FIGS. 12 to 14 are flowcharts for the processing for adding attribution information to a 3D model.

Figure 7:
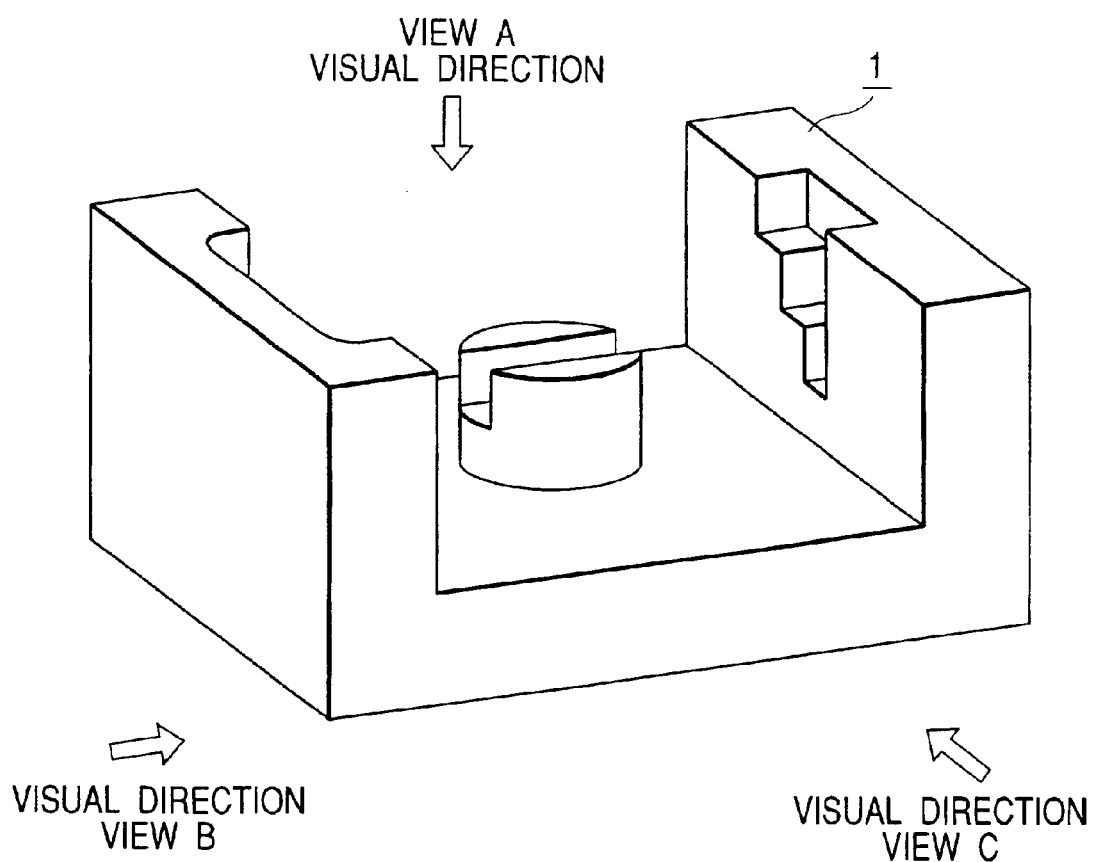
FIG. 7 is a plan view of a 3D model and an attribution allocation plane.

At step S121 in FIG. 12, a 3D model 1 in FIG. 7 is generated, and at step S122, a required view is established in order to provide attribution information for the 3D model that is generated.

The view is used to define conditions concerning the display of the 3D model 1 that are determined by the visual direction, the magnification and the center position of a visual line in order to view the 3D model 1 in (virtual) three-dimensional space. For example, in FIG. 7, a view A is determined in the visual direction perpendicular to a plan view in FIG. 28. The magnification and the center position of the visual line are determined, so that the geometry of the 3D model 1 and almost all the attribution information that is provided can be displayed on the screen of the display device. For example, in this embodiment, the magnification is 2 and the visual center position is determined to be substantially the center in the plan view. A view B in the visual direction perpendicular to the plan view, and a view C in the visual direction perpendicular to the side view are set in the same manner.

Figure 8:
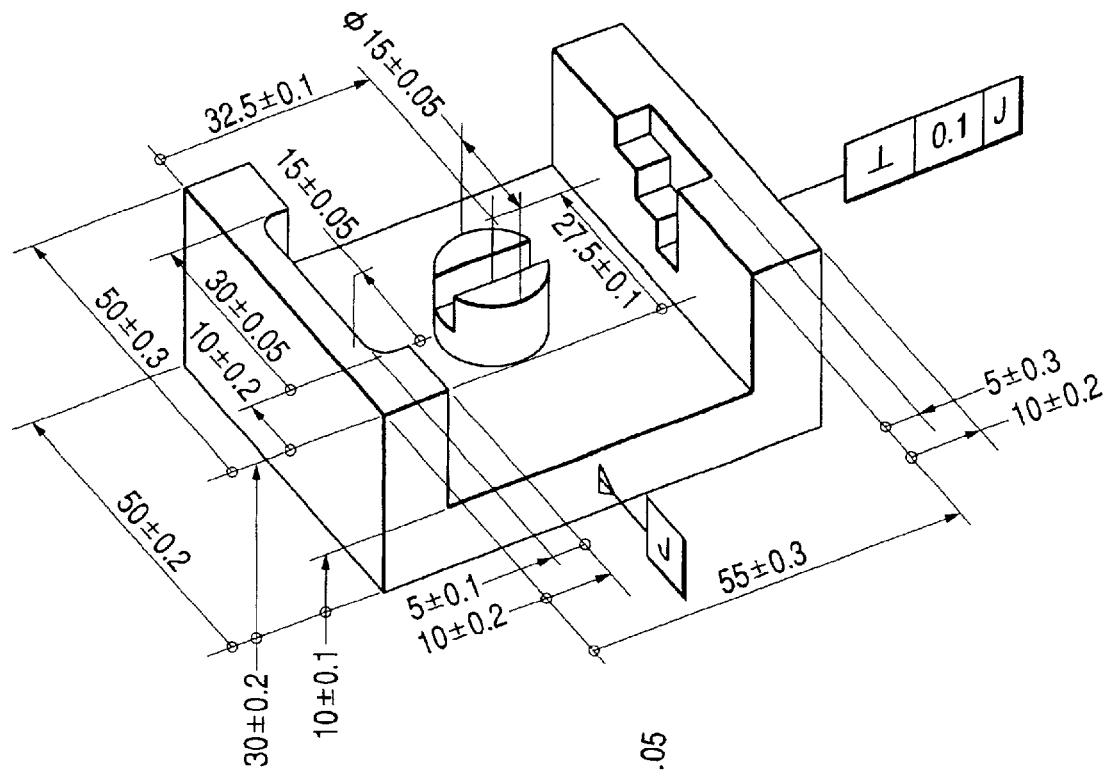
FIG. 8 is a diagram showing a 3D model and accompanying attribution information.
Figure 9:
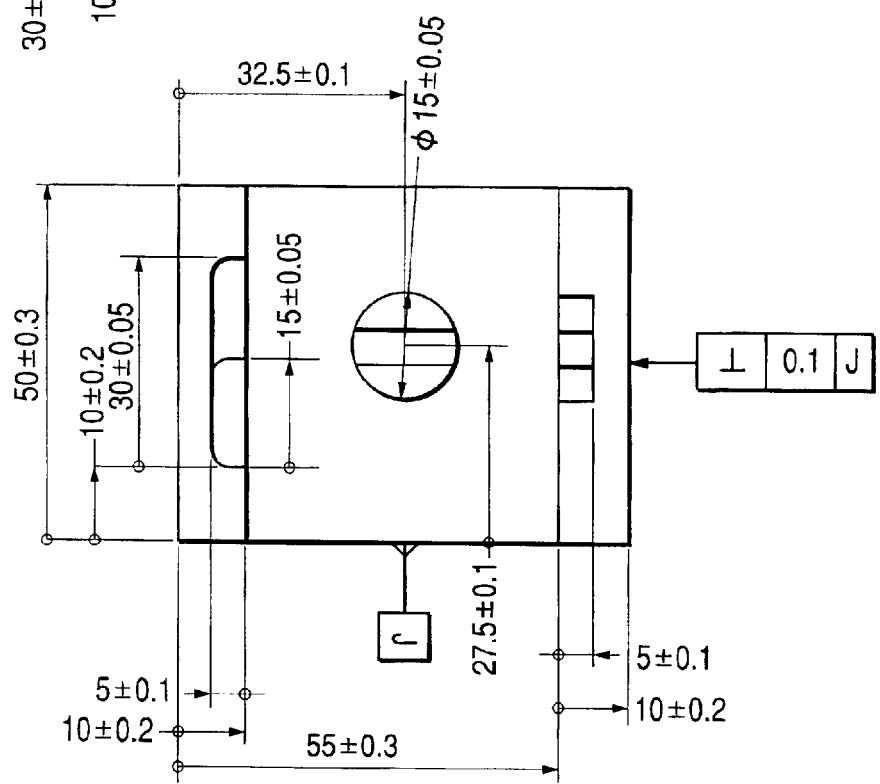
FIG. 9 is a diagram showing a 3D model and accompanying attribution information.

At step S123, the attribution information is entered, so that it is positioned in the visual direction of each view and correlated with the view. FIGS. 8, 10A and 11A are diagrams showing the state wherein attribution information is provided for the views A, B and C, and FIGS. 9, 10B and 11B are diagrams showing the 3D model 1 as it appears from the views A, B and C and the attribution information therefor.

The correlation of the views with the attribution information may be performed after the attribution information has been entered. For example, as is shown in the flowchart in FIG. 13, at step S131, the 3D model 1 is created, at step S132, the attribution information is entered, and at step S133, the attribution information is correlated with a desired view. Further, the attribution information correlated with the view may be corrected as needed, i.e., added or deleted.

The attribution information may be entered while the 3D model 1 is displayed two-dimensionally, while being viewed from the individual views. The entry of the attribution information can be implemented in the same manner as is the process for creating a two-dimensional drawing using so-called 2D-CAD. And as needed, the attribution information can be entered while the 3D model is displayed three-dimensionally. Since the user can enter the attribution information while watching the 3D model 1 displayed three-dimensionally, erroneous input will not occur and the entry of data will be performed efficiently.

To read the attribution information for the 3D model, at step S141 in FIG. 14, a desired view is selected, and at step S142, based on the visual direction of the selected view, the magnification and the visual center, attribution information is displayed that is provided in correlation with the geometry of the 3D model and the view. At this time, views selectable for the 3D model 1 are appropriately stored, and icons are displayed on the screen, making it possible for a desired view to be easily selected. When, for example, the view A, B or C is selected, a 3D model is displayed in FIG. 9, 10B or 11B. At this time, since the attribution information is positioned relative to each view, the 3D model can extremely easily be seen two-dimensionally.

(Another Method for Entering Attribution Information)

In the attribution information entering processing described above while referring to FIGS. 11A and 11B to 14, the attribution information is correlated with the individual views. The correlation means is not limited to this arrangement, however, and the attribution information may be sorted into groups, for example, and the groups correlated with the views.

This process will now be described while referring to the flowcharts in FIGS. 15 and 16.

The attribution information input in advance either is sorted into groups selectively or is based on the search results, and each group is correlated with an arbitrary view. As a result, the same results and effects as described above can be obtained. Further, when the attribution information is corrected, i.e., is added to a group or is deleted therefrom, attribution information correlated with the view can be manipulated.

That is, the 3D model 1 is generated (step S151), the attribution information is entered (step S152), and the visual direction of the view, the center position and the magnification are set for the 3D model 1 (step S153). Then, the attribution information input at step S152 is assembled into a group, and the selected view is correlated with the grouped attribution information (step S154).

Figure 16:
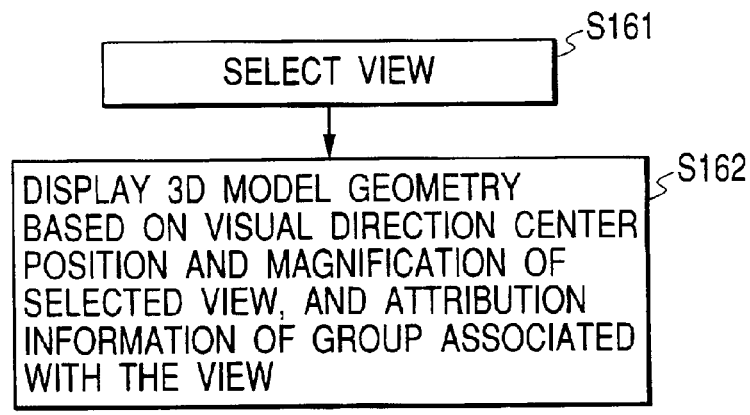
FIG. 16 is a flowchart showing the processing for adding attribution information to a 3D model.

As is shown in FIG. 16, the view for the display is selected (step S161) and the attribution information provided for the selected view is displayed (step S162).

(Setting Up a Plurality of Views)

An explanation will now be given for the processing for setting up a plurality of views with the same visual direction orientation.

Figure 17:
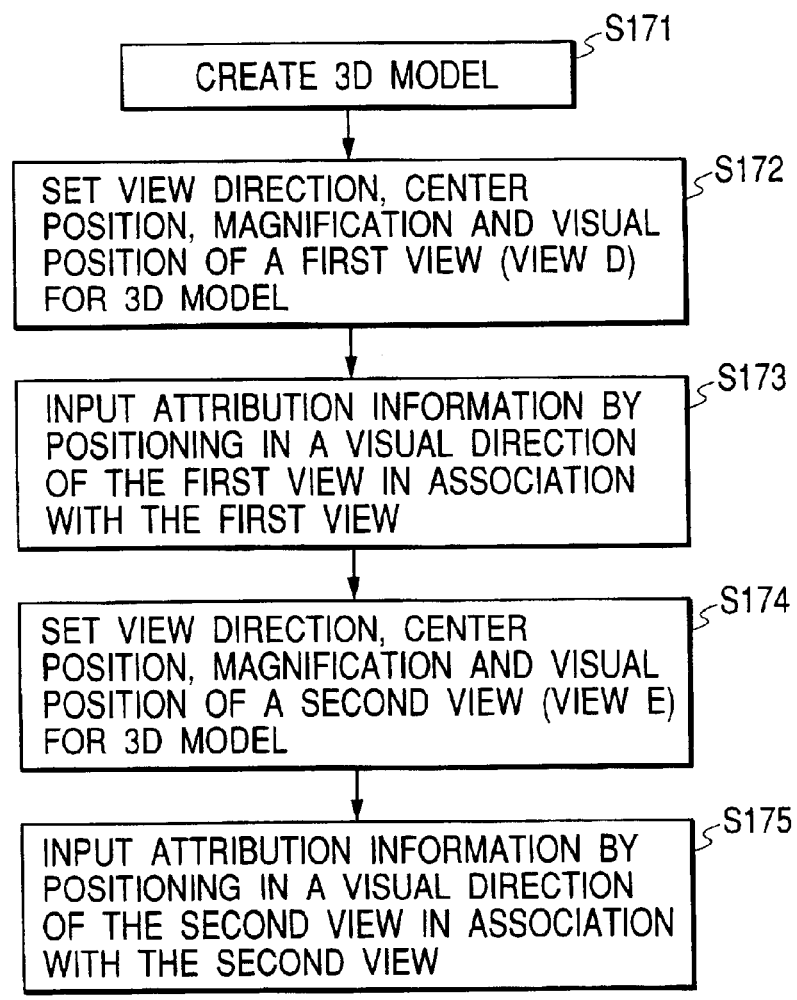
FIG. 17 is a flowchart showing the processing for adding attribution information to a 3D model.
Figure 18:
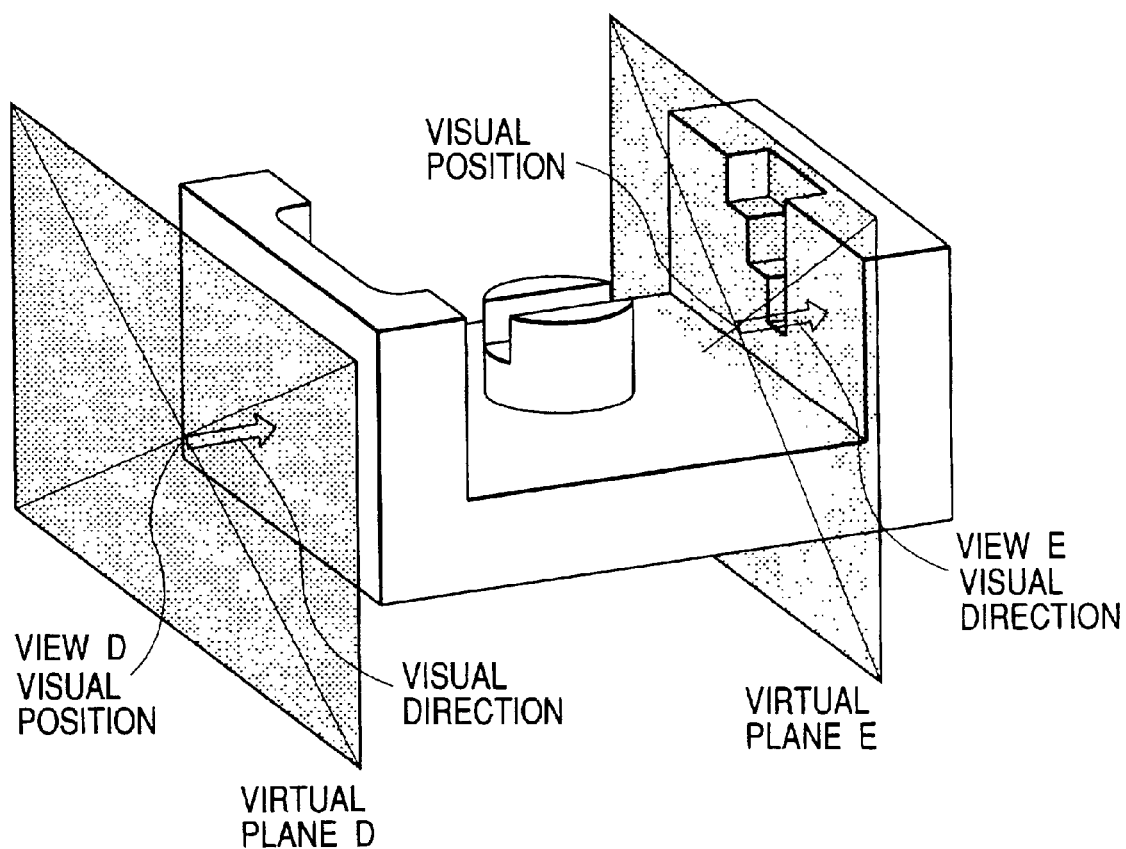
FIG. 18 is a diagram showing the state wherein a plurality of views are established for a 3D model.

FIG. 17 is a flowchart for the processing for setting up a plurality of views with the same visual direction orientation. FIG. 18 is a diagram showing a 3D model when a plurality of views with the same visual direction orientation are to be set up.

An explanation will be given for a case wherein a plurality of views is set up for which the perspective direction is that of the front view of the 3D model 1 in FIG. 7.

The 3D model 1 is created in the above described manner (step S171) and at step S172 a first view D is set up. The visual direction is the perspective direction employed for of the front view, the magnification is 2 and the center position is substantially the center of the front view. Then, the position of the visual line is set. The position of the visual line is defined as a position from which the 3D model 1 can be seen or displayed in the visual direction. The view D is, for example, set up at a position 30 mm distant from the exterior of the front view of the 3D model 1, and the visual position is aligned with the virtual plane D in FIG. 18. It should be noted that so long as a visual position is located outside the 3D model 1, it will not cause the display of a perspective view (the front view, the plan view, both side views, the bottom view or the rear view) to be affected by so-called trigonometry.

At step S173, the attribution information in FIG. 10A is entered in correlation with the view D, so that, as is shown in FIG. 10B, the 3D model 1 can extremely easily be viewed two-dimensionally in the direction set for the view D.

At step S174, a second view E is set up. The visual direction is the same as that of the view D, i.e., the direction for the front view, the magnification is also 2, and the center position is also set substantially as the center of the front view. Then, the visual position is located near the corner of the step-shaped groove of the 3D model 1.

Next, the visual position is set as the center of the hole in the 3D model 1. In FIG. 18, the visual position is located on the virtual plane E. At this time, the 3D model 1 in the direction set for the view E has a cross-sectional shape cut along the visual plane E, as is shown in FIG. 19B. Further, the attribution information is entered in correlation with the view E.

Figure 19A:
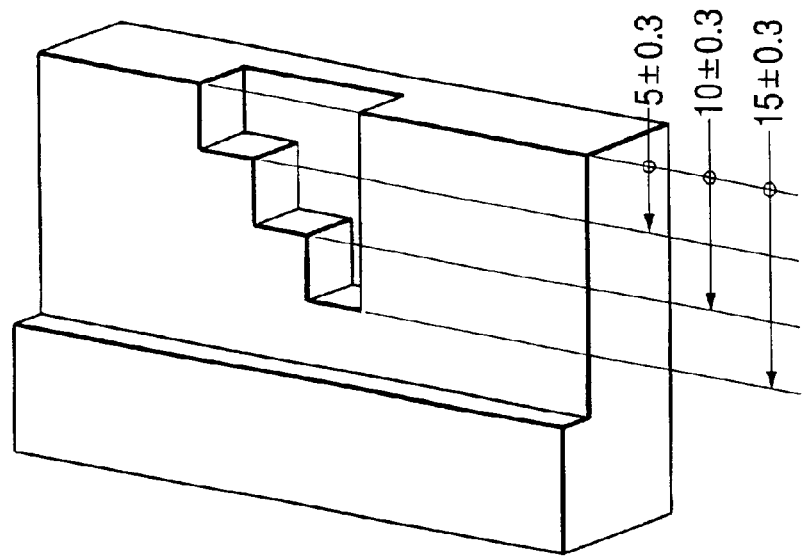
FIGS. 19A and 19B are diagrams of the 3D model in FIG. 18 corresponding to the view E.
Figure 19B:
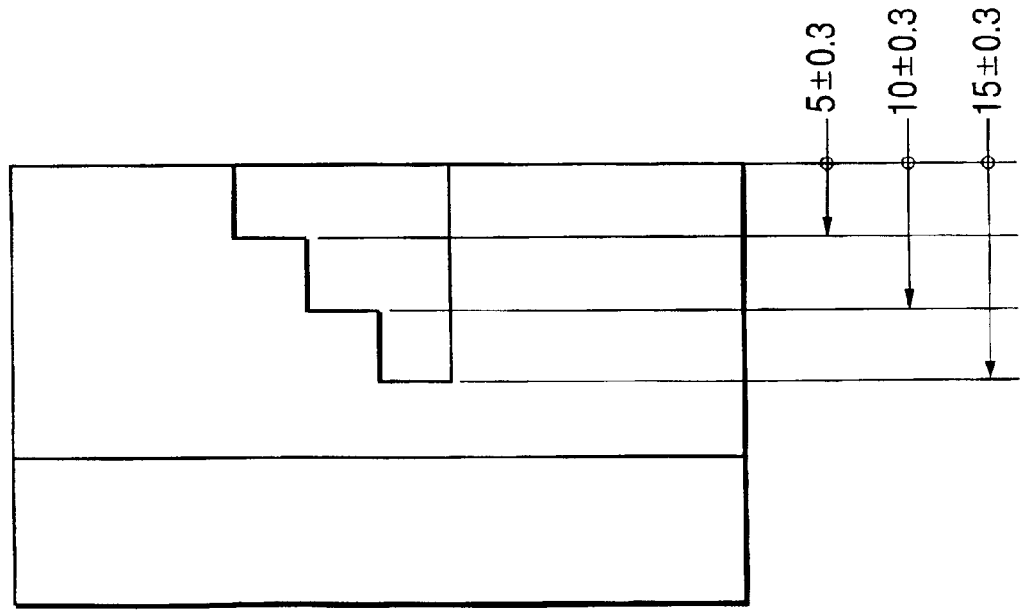

When the 3D model 1 is moved or rotated when the view E is selected, the 3D model 1 can be displayed in three dimensions, as is shown in FIG. 19A.

An explanation will now be given for the operation performed to change the overall view of the model in FIG. 7 into the cross-sectional view, and for confirming the attribution information. In some cases, it is difficult to identify the position on the model whereat the virtual plane correlated with the attribution information is located, and to identify the direction of the visual line.

Figure 20:
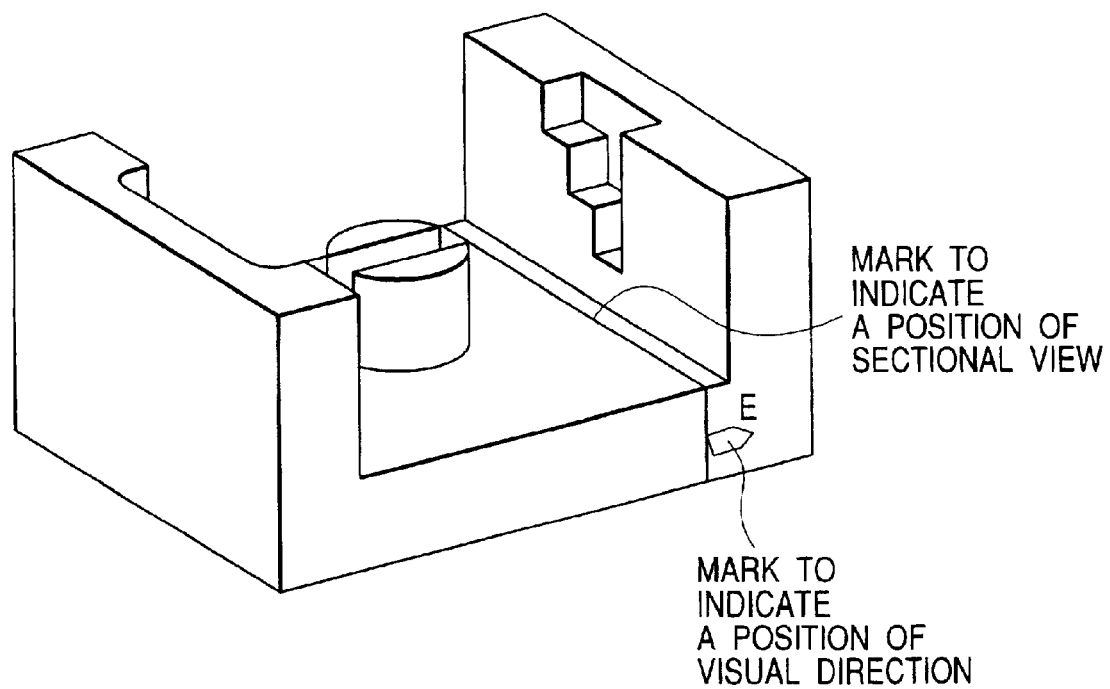
FIG. 20 is a diagram showing a view on 3D model.

FIG. 20 is a diagram showing an example wherein the location of a virtual plane and a visual direction are indicated. When the entire 3D model is displayed, lines are displayed at the points whereat the 3D model and the virtual planes intersect, i.e., at the cross-sectional positions. The types of lines used differ from those used to represent the ridge lines of the 3D model, and are, for example, broken lines, fine lines, or differently colored lines.

When a mark indicating the visual direction defined on the virtual plane and the name of a virtual plane are presented near the line, this is a further identification help.

Figure 21A:
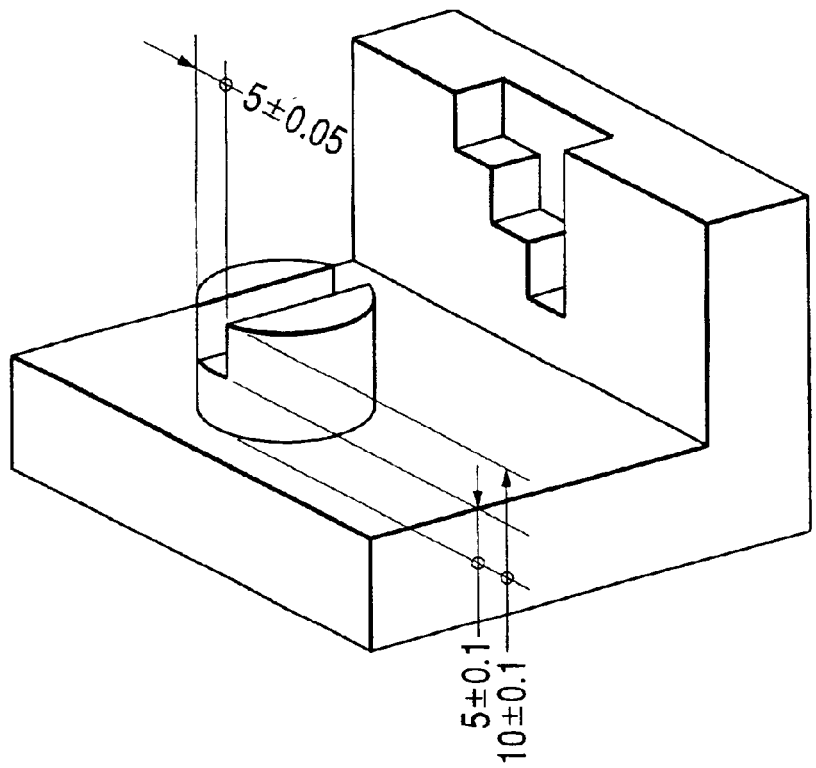
FIGS. 21A and 21B are partial, detailed diagrams of the 3D model.
Figure 21B:
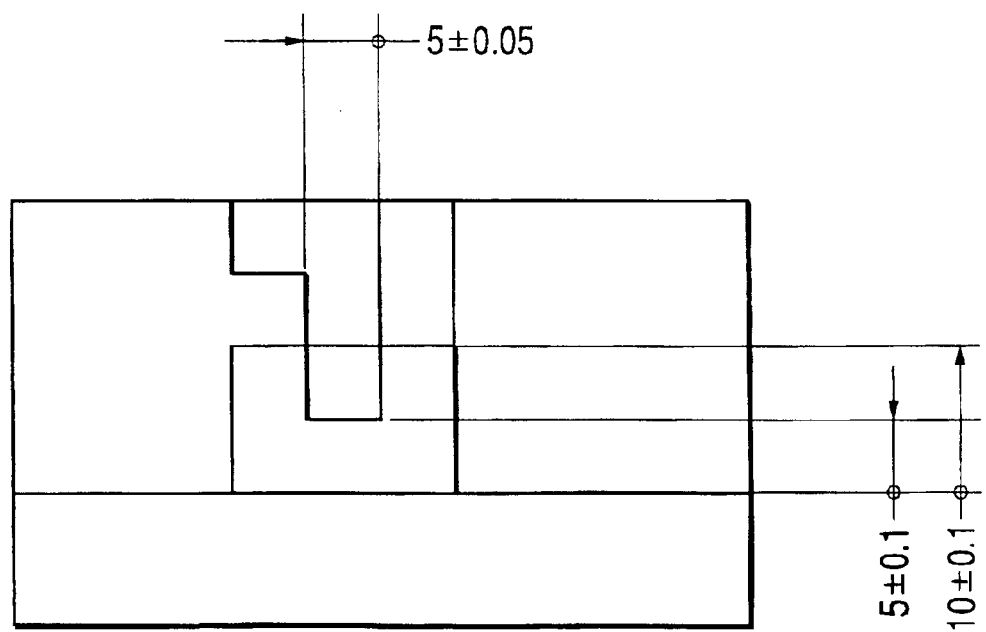
Figure 22:
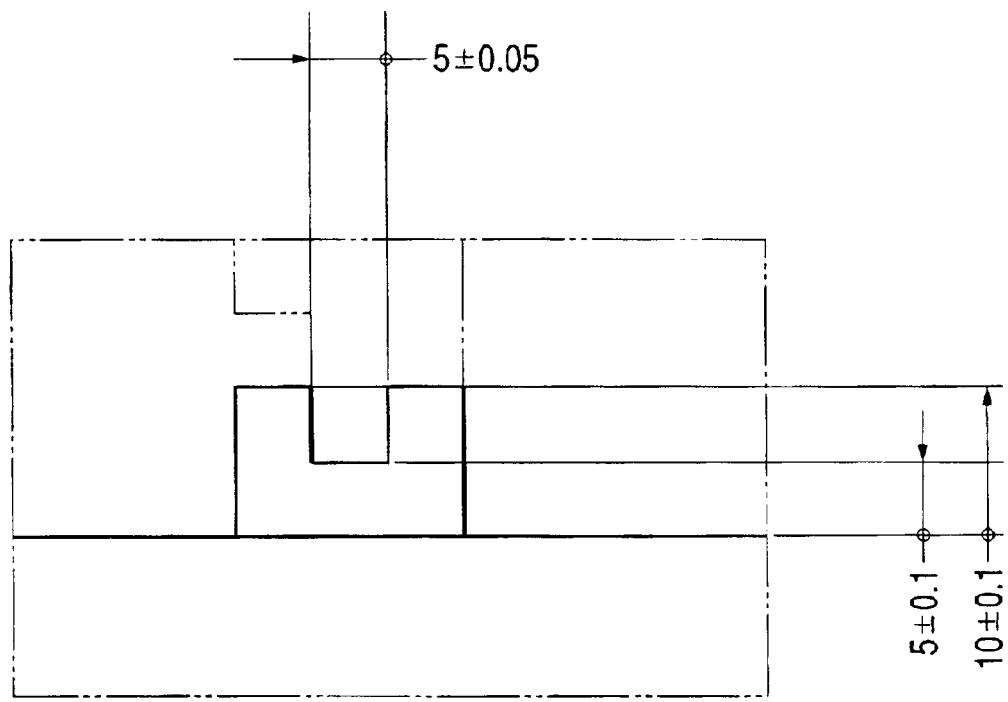
FIG. 22 is a diagram showing an example wherein the display of the geometry not correlated with attribution information is changed.

FIG. 21A, FIG. 21B and FIG. 22 are partial detailed diagrams.

An explanation will now be given for the processing for confirming the attribution information by referring to the cross section in FIG. 21A.

When the attribution information is confirmed by referring to the two-dimensional partial detailed drawing, the other ridge lines are complex and their visibility may be deteriorated, as is shown in FIG. 21B.

Thus, as is shown in FIG. 22, for the geometry that is not correlated with the displayed attribution information, visibility is improved by changing the method used to display the geometry. In FIG. 22, chain lines are used to represent the ridge lines of the non-correlated geometry.

The display method is not limited to the use of chain lines, and different colors or an opaque display may be employed.

Figure 23A:
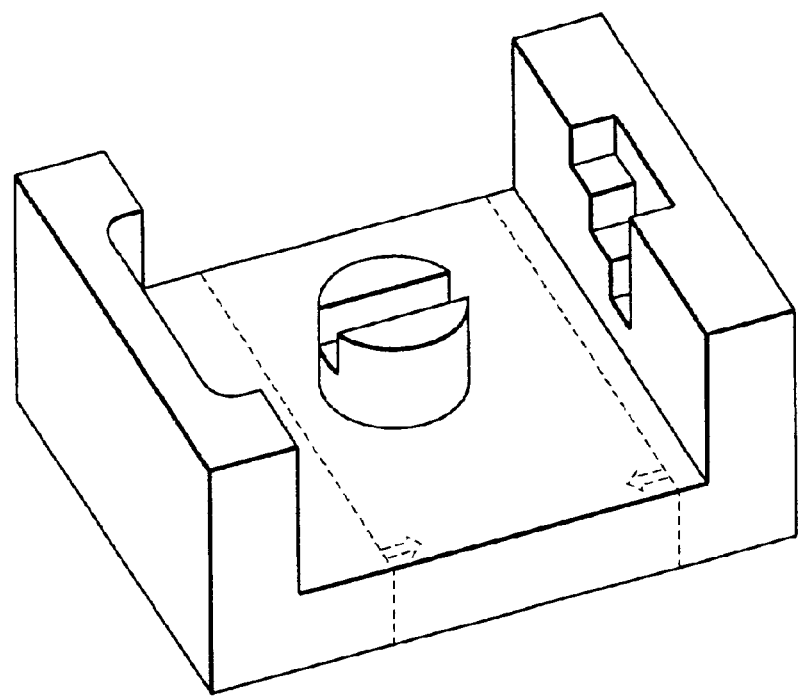
FIGS. 23A and 23B are diagrams showing an example wherein only the geometry within an arbitrary range is displayed.
Figure 23B:
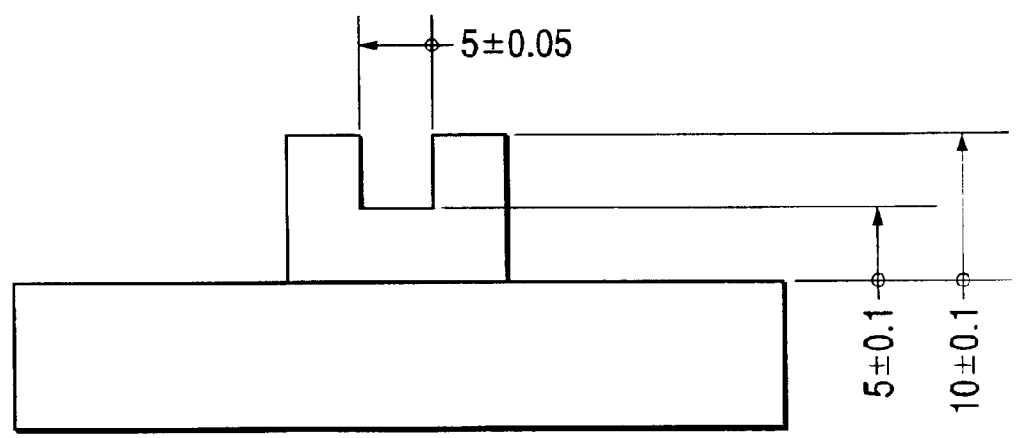

FIGS. 23A and 23B are diagrams showing an example wherein an area that is displayed is sandwiched between two planes. In FIG. 23A, lines are shown indicating the locations whereat two planes intersect the 3D model, and in FIG. 23B, a 3D model and attribution information are shown only for the area sandwiched between the two planes.

Since only a desired range is displayed, an operator can remove unnecessary information, improve the visibility, and efficiently perform the operation.

According to the embodiment, since the attribution information can be entered and displayed while watching the so-called cross-sectional geometry, the portion to which the attribution information is instructed can be easily and immediately identified.

Figure 24:
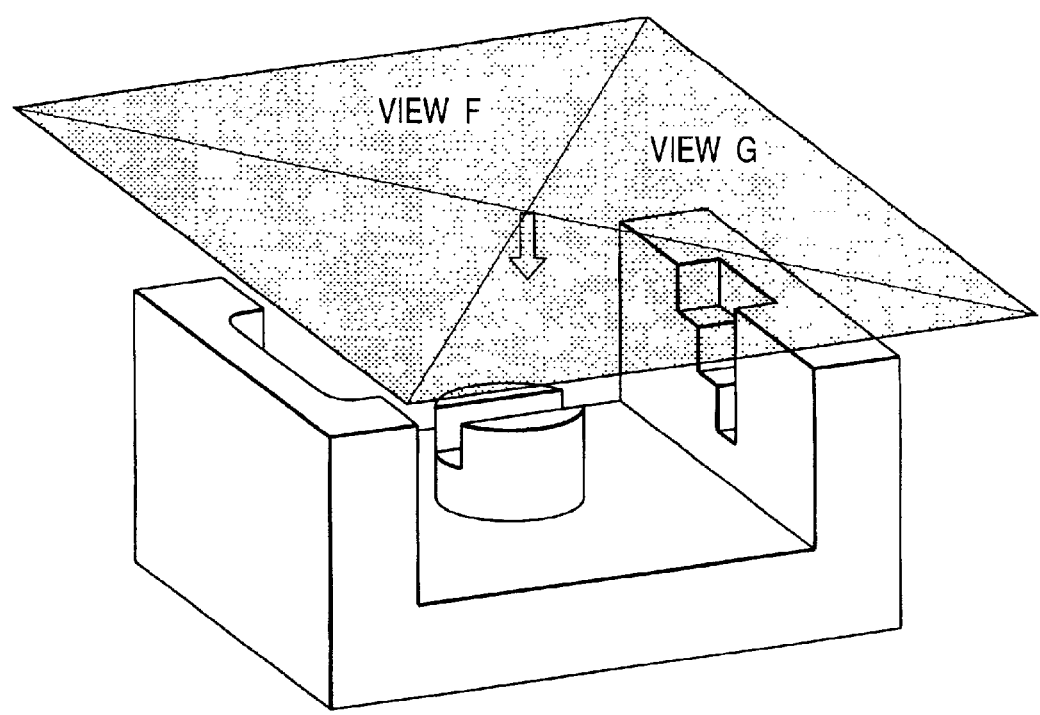
FIG. 24 is a diagram showing the state wherein a plurality of views are established for a 3D model.
Figure 25:
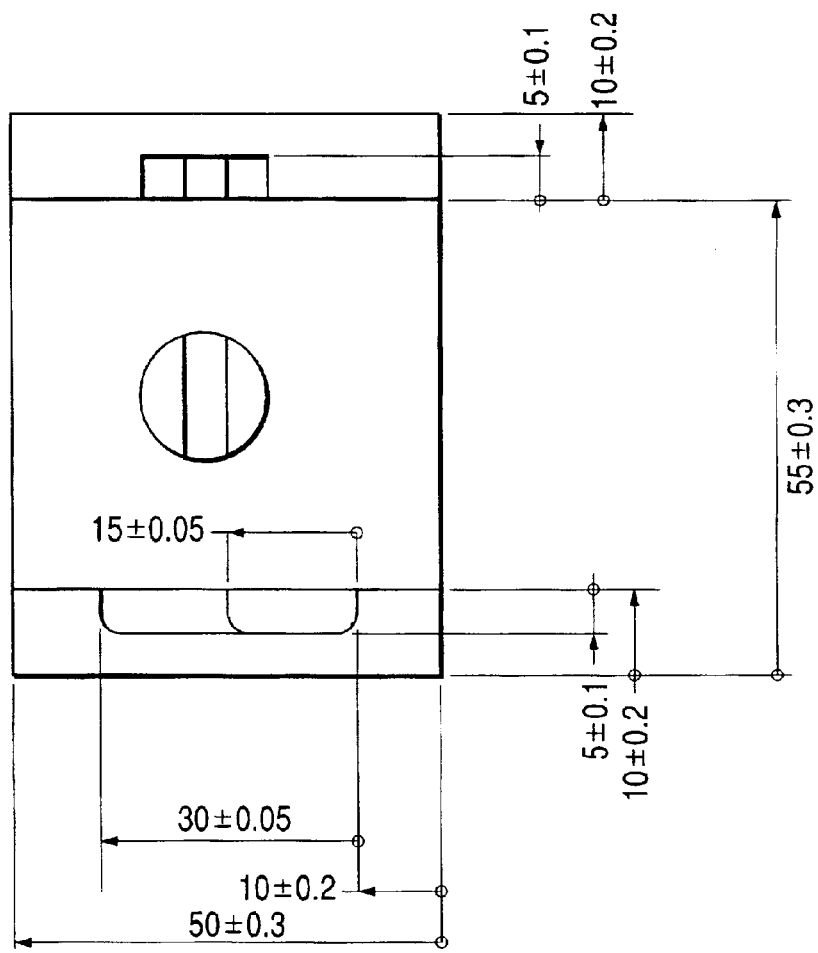
FIG. 25 is a diagram showing the 3D model seen from the view F in FIG. 24.
Figure 26:
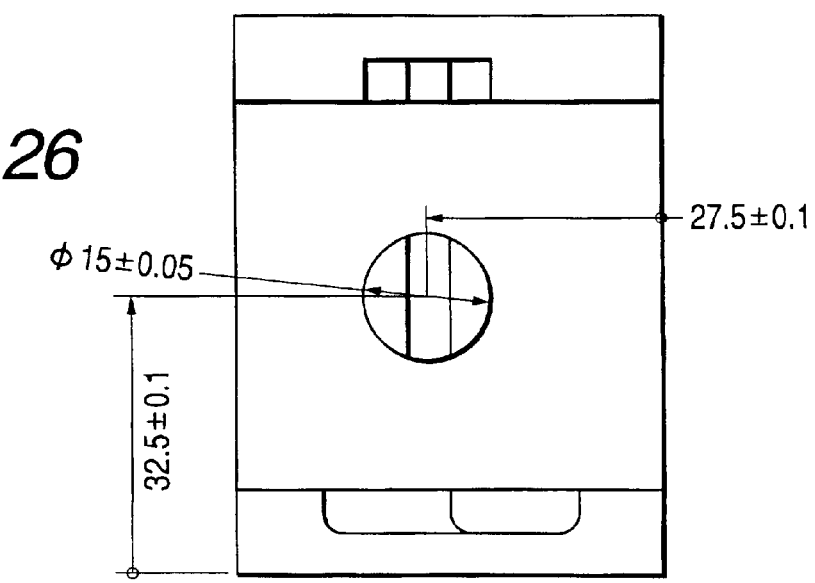
FIG. 26 is a diagram showing the 3D model seen from the view G in FIG. 24.
Figure 27:
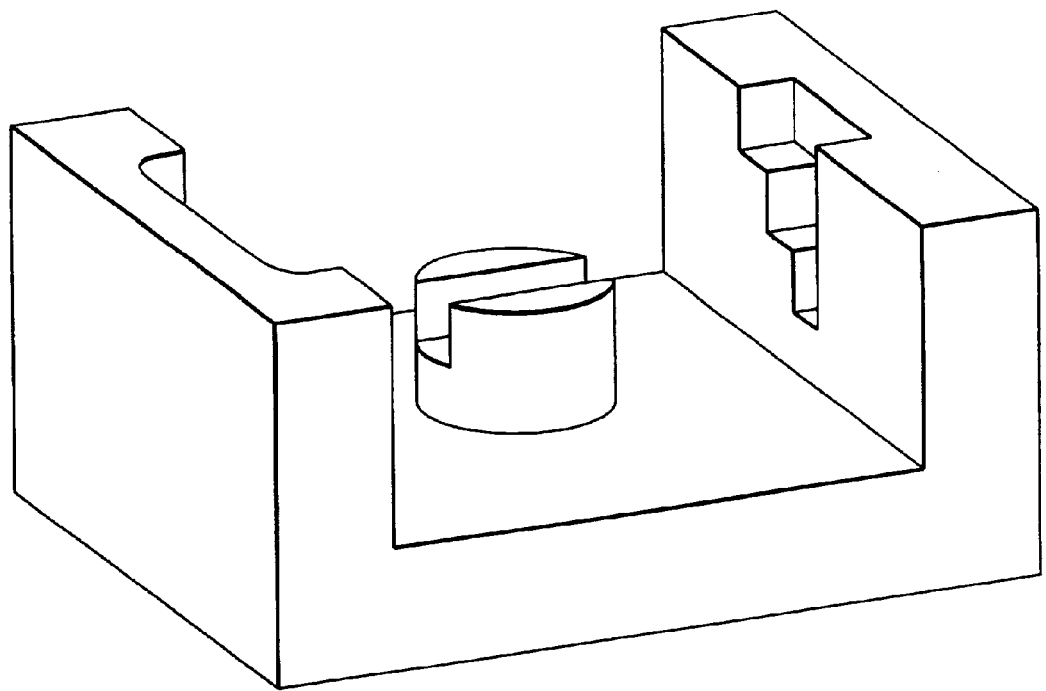
FIG. 27 is a diagram showing an example 3D model.
Figure 29:
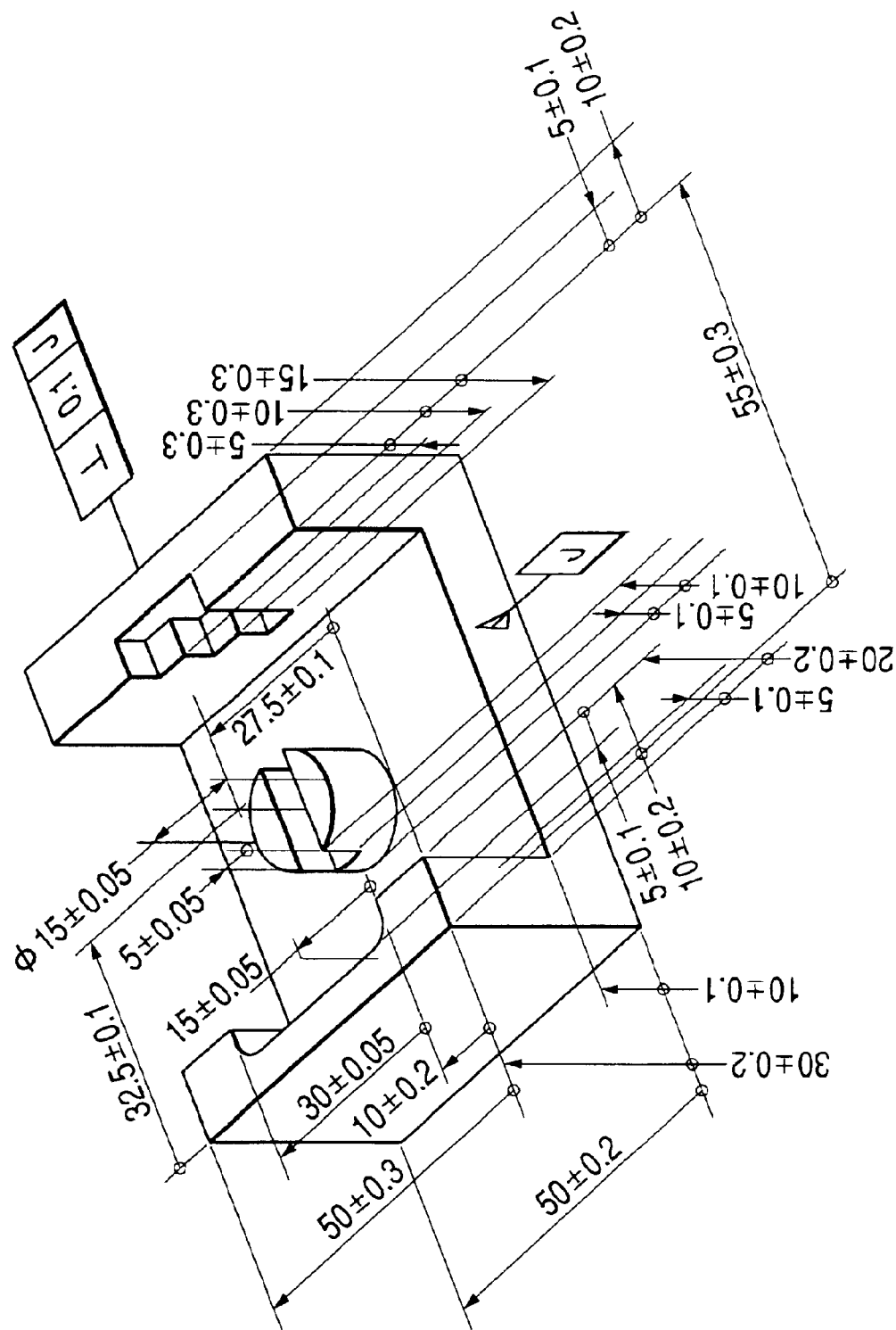
FIG. 29 is a diagram showing the state wherein attribution information is added to the 3D model in FIG. 27.

Further, a plurality of views from which the same geometry as that of the 3D model 1 may be seen can be employed. FIG. 24 is a diagram showing a view F and a view G having the same visual direction, magnification, center position and visual position. In this example, the views F and G are directed toward the plan view of the 3D model 1. When attribution information is grouped and correlated with the views, the entry of attribution information that can easily be seen can be implemented. For example, in FIG. 25 the attribution information related to an external dimension is grouped for the plan view of the 3D model 1, and in FIG. 26, the attribution information concerning the position and the shape of a hole is grouped. The attribution information groups are then correlated with the view F and the view G, and since the correlated groups of attribution information are is allocated for the views, the associated attribution information can be easily seen.

(Magnification of a View)

When a desired magnification of a view is employed, complicated geometry or detailed geometry can be easily identified.

This embodiment is effective for all the 3D-CAD and 2D-CAD systems, regardless of the hardware constituting a 3D-CAD apparatus or the method used for forming a 3D model.

Location of Attribution Information)

The location of attribution information will now be described.

In order to express a 3D model and attribution information to be added thereto so that they can be easily seen as a two-dimensional drawing, an operator selects or groups a plurality of attribution information for the portion of a 3D model to be expressed, and correlates the attribution information with the attribution allocation plane. So long as a two-dimensional drawing method is employed, the attribution information need only be allocated in an area in the visual direction of the correlated attribution allocation plane. However, for a so-called "3D drawing" where attribution information is added to a 3D model, some devices are required to satisfactorily demonstrate the merits of the 3D model.

In this case, as well as the view, the attribution allocation plane is used to define a condition concerning the display of the 3D model 1 and the attribution information that is added to the 3D model 1. In this embodiment, the attribution allocation plane is defined as the position of a point (hereinafter referred to as a visual line) in a (virtual) three-dimensional space and the normal direction (visual direction) of a plane to be generated. Further, the attribution allocation plane includes information for the display magnification (hereinafter referred to simply as a magnification) of the 3D model 1 and the attribution information added to the 3D model. The visual line is defined as a position from which the 3D model 1 can be seen, i.e., is displayed in the visual direction.

One of the merits of the 3D model 1 is that, since the 3D model 1 can be three-dimensionally expressed on a display screen so its appearance is near that of the real object, the process (conventionally performed mainly in the mind of the operator) for the transformation from two dimensions to three dimensions, which is required for the preparation of a two-dimensional drawing, is not required for an operator who prepares a 3D model or an operator (a step designer, a metal mold designer/manufacturer, a measurer, etc.) who performs the next step using the 3D model. This transformation process depends greatly on the skill of the operator, and accordingly, erroneous transformations and the loss of transformation time occur.

In order to prevent the loss of the merit of the 3D model 1 represented by the three-dimensional expression of a model in a 3D drawing, certain devices are required for the three-dimensional display of attribution information (the location of attribution information).

A point to be contrived will now be described while referring to FIGS. 30A to 30D.

Figure 30A:
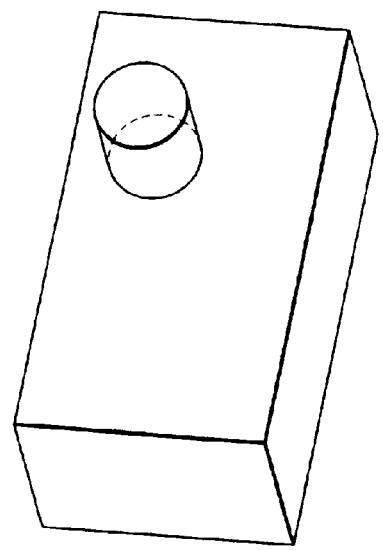
FIGS. 30A, 30B, 30C and 30D are diagrams showing an example 3D model.

FIG. 30A is a perspective view of a 3D model 2 used for the explanation. FIG. 30B is a plan view of the 3D model 2.

Figure 30C:
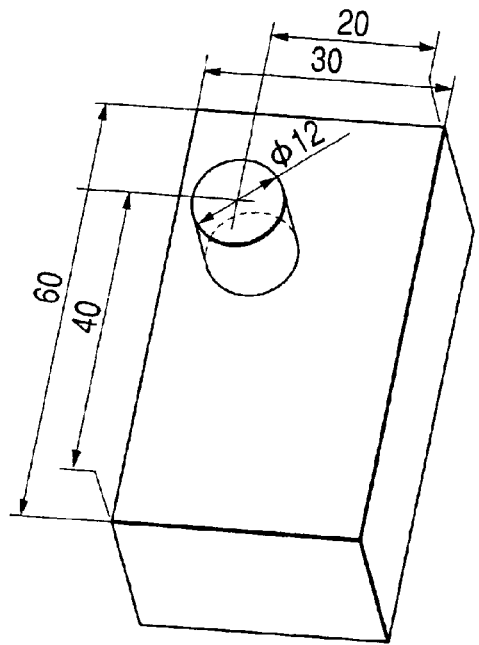
Figure 30B:
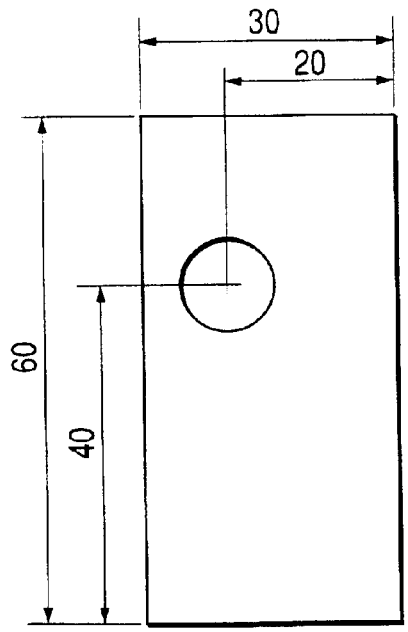
Figure 30D:
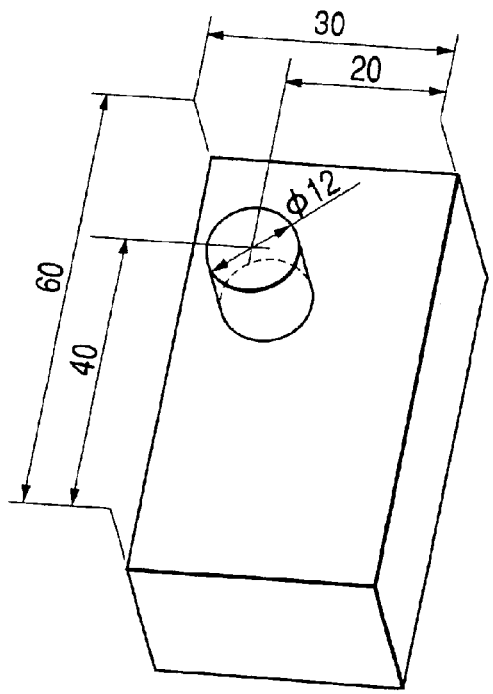

FIG. 30C is a perspective view for explaining the state wherein attribution information is added to the 3D model 2 without an allocation system being devised. FIG. 30D is a perspective view of the attribution information for which an allocation system has been devised.

First, an attribution allocation plane 218 is prepared and attribution information is entered in order to generate a two-dimensional plan view for the 3D model 2. The state wherein the 3D model 2 is displayed along the visual line of the attribution allocation plane 218 is shown in FIG. 30B.

When a plurality of attribution information allocation planes are alternately arranged as is shown in FIG. 30C in order to input attribution information, the attribution information sets are overlapped and it is difficult to identify the contents of the attribution information. Since as in FIG. 30C the contents of the attribution information are not easily seen even when only a small number of attributions is provided, it is easily assumed that, for a more complicated geometry, the attribution information will not be effective and that it will not be possible to establish the perspective state as a drawing.

However, when as is shown in FIG. 30D the attribution information sets are allocated on the same plane, the attribution information sets do not overlap each other and can be easily identified, as in the representation of the two-dimensional drawing in FIG. 30B.

In this manner, when the attribution information is added to the 3D model, as in the two-dimensional representation, the attribution information can be easily identified, while the merit of the 3D model, i.e., the three-dimensional representation, is employed. Thus, the obtained drawing can be used as a three-dimensional drawing.

Further, it is preferable that the plane whereon attribution information is to be allocated be the same plane as the attribution allocation plane.

In this example, a simple 3D model has been employed; however, when a more complicated 3D model is handled, a plurality of attribution allocation planes must be set in the same visual direction.

Assume that a plurality of attribution allocation planes and correlated attribution information are displayed together in order to select a desired attribution allocation plane or desired attribution information.

In this case, if the face whereon the attribution information is allocated is at a distance from the attribution allocation plane, the correlation of the attribution information and the attribution allocation plane is not easily perceived, and the attribution allocation plane or the attribution information may be erroneously selected. In order to prevent such an erroneous selection and make it easy to visually perceive the correlation, the attribution information should be allocated on the same plane as the attribution allocation plane.

Further, to generate the attribution allocation plane in the same visual direction as explained while referring to FIG. 24, a plurality of attribution allocation planes should be allocated in the same visual direction. When the attribution allocation planes and the correlated attribution information are displayed at the same time, and when the attribution allocation planes are generated on the same face, the face on which the attribution information is allocated is also on the same plane, the attribution information sets are overlapped and not easily identified, not only in the visual direction, but also in an oblique direction shifted away from the visual direction. Originally, because a large number of attribution information sets are provided in one direction, the attribution information sets are allocated for a plurality of attribution allocation planes, so that the overlapping of attribution information sets can not be avoided when they are displayed at the same time.

Even when no means is available to resolve the problem that attribution information can not easily be seen in the visual direction, arranging the attribution allocation planes at a distance in the same visual direction is an effective means for easily identifying the attribution information in the perspective state.

(Magnification)

A magnification will now be described.

When the attribution allocation plane is displayed at a desired magnification, a complicated or a detailed shape can more easily be seen.

Figure 31A:
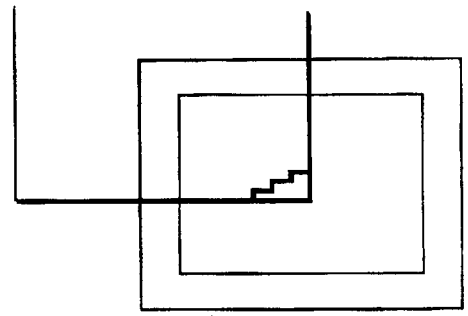
FIGS. 31A, 31B and 31C are partially enlarged diagrams showing a 3D model.
Figure 31B:
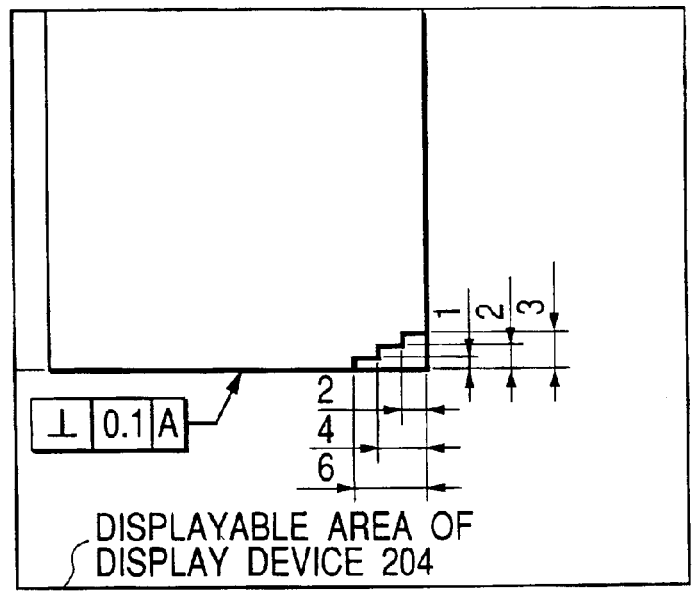
Figure 31C:
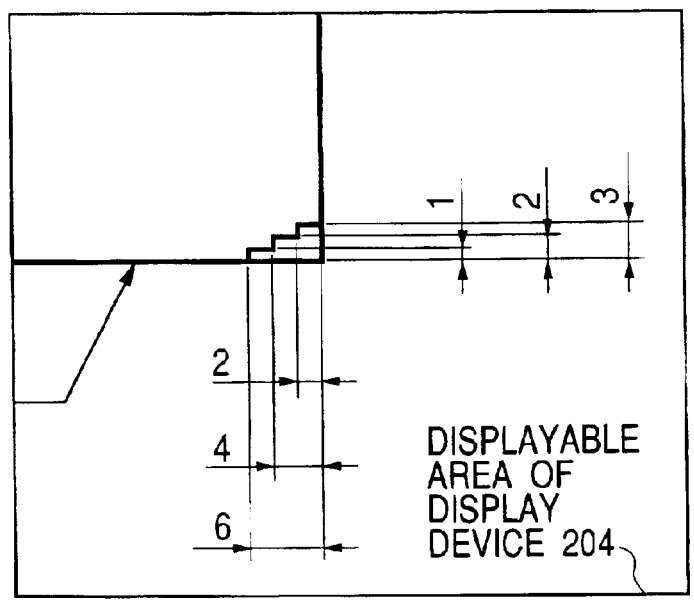
Figure 33A:
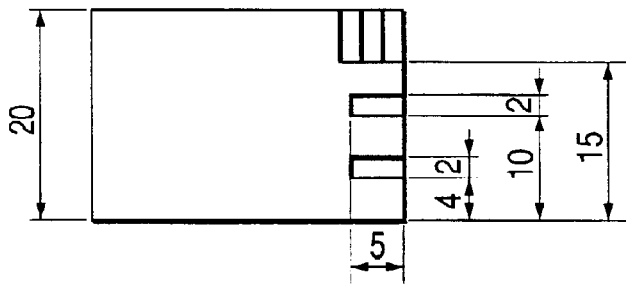
FIGS. 33A, 33B, 33C, 33D and 33E are diagrams for explaining the state wherein a 3D model and attribution information are represented two-dimensionally.
Figure 33B:
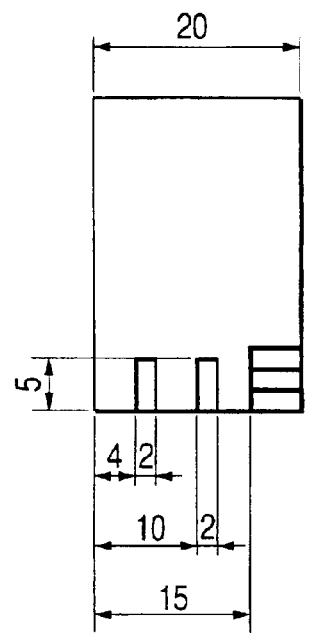
Figure 33C:
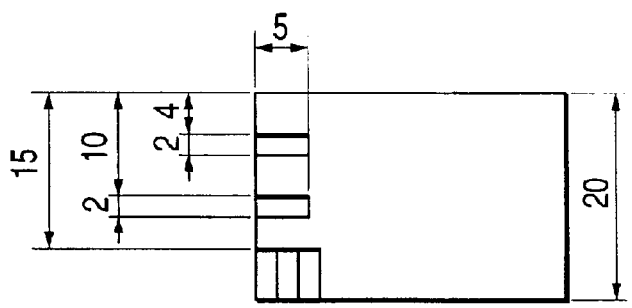
Figure 33D:
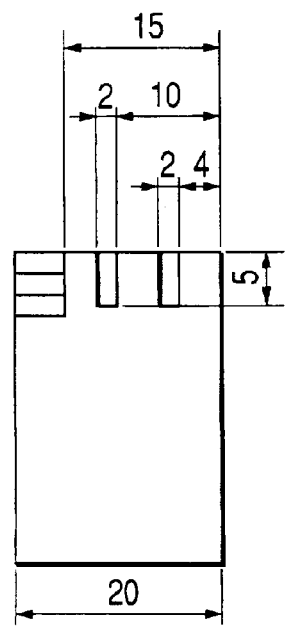
Figure 33E:
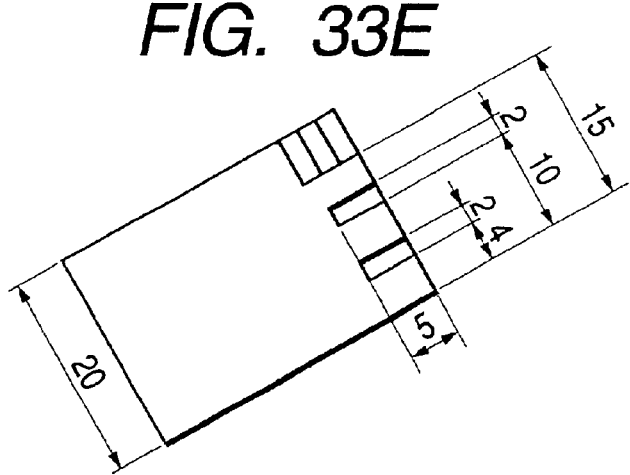

FIGS. 31A to 31C are diagrams showing the state wherein the 3D model 1 is partially enlarged and displayed. As is shown in FIG. 31A, while the visual direction of the 3D model 1 is oriented toward the plan view, the visual line position is set near the corner and the magnification is set to 5, the attribution allocation plane 217 is provided for the 3D model 1, and the step-shape and the attribution information can be displayed so they are easily understood (FIG. 31B). In this case, all the attribution information sets correlated with the attribution allocation plane are allocated in a frame 217a, and the attribution allocation plane 217 corresponds to a so-called local perspective view. Merely by watching the frame 217a, all the correlated attribution information can be seen, and no examination need be made to determine whether the attribution information for the 3D model is present outside the frame 217a. As a result, an efficient operation can be performed.

This embodiment is effective for all 3D-CAD and 2D-CAD systems, regardless of the hardware constituting a 3D-CAD apparatus or the method used to form a 3D model.

(Selection of a Plurality of Attribution Allocation Planes)

The selection of a plurality of attribution allocation planes will now be described.

In this embodiment, to display attribution information correlated with an attribution allocation plane, only one attribution allocation plane is selected. However, while taking into account the object of the present invention, a plurality of attribution allocation planes may be selected.

Since there is only one visual position and one visual direction when a single attribution allocation plane is selected, only one display method is employed for the display device. When a plurality of attribution allocation planes are selected, a plurality of display methods must be employed, so that some display means is required. For example, all the attribution information correlated with a plurality of selected attribution allocation planes may be displayed, and the setting for a specific attribution allocation plane can be selected and used for the visual position and the visual direction.

Further, the attribution information can be displayed by using a different color for each correlation attribution allocation plane, so that different attribution information groups can be easily identified.

(Horizontal or Vertical Setting of an Attribution Allocation Plane)

An explanation will now be given for the horizontal or vertical setting of an attribute allocation plane.

Thus far, only the setting of the visual position, the visual direction and the magnification according to the present invention has been explained, and no explanation has been given for the horizontal or vertical setting of the attribution allocation plane.

In the two-dimensional drawing, rules are provided for the allocation of views (a plan view, a front view and a side view) obtained in the individual visual directions in FIG. 32. This is because the positional relationship viewed in each visual direction must be easily understood in order to represent the actual three-dimensional geometry on a two-dimensional plane.

For the 3D drawing, whereat the attribution information is added to the 3D model, it is possible to provide not only the two-dimensional representations (FIGS. 9, 10B and 11B) viewed in the direction perpendicular to the external face of the 3D model, but also the three-dimensional representations (FIGS. 10A and 11A) that are viewed in the oblique direction by rotating the 3D model in the two-dimensional state.

Therefore, in the three-dimensional representation, the horizontal or vertical direction (it is assumed that the horizontal and vertical directions match the corresponding directions on the display screen) of the attribution allocation plane need not be specifically defined in order to display the plan view, the front view and the side view. So long as the 3D model and the attribution information attached thereto are correctly expressed, all the representations in FIGS. 33A to 33E can be correct representations. Further, when the 3D model is rotated slightly, the 3D model can be displayed three-dimensionally, and it is easy to identify in what part of the 3D model the currently displayed portion is located, and to easily understand the plan view and the side view taken in another visual direction. Thus, no special problem is encountered when the 3D model is displayed in the horizontal or vertical direction of the attribution allocation plane without taking into account the positional relationship of the visual directions.

However, in the three-dimensional drawing wherein attribution information is added to the 3D model, not all the operator conditions can be such that the operators can be freely rotated to display a 3D model. This is because there are some offices that do not require that a 3D drawing be corrected, and that need only store and read, as digital data, the two-dimensional image data displayed on each attribution allocation plane. Furthermore, there are also offices that can cope with only conventional paper drawings.

On this assumption, a rule used for the two-dimensional drawing must be employed for the display viewed in each visual direction.

Thus, before generating the attribution allocation plane, the horizontal or vertical direction for the display of the 3D model on the display device 204 must be set.

Figure 34:
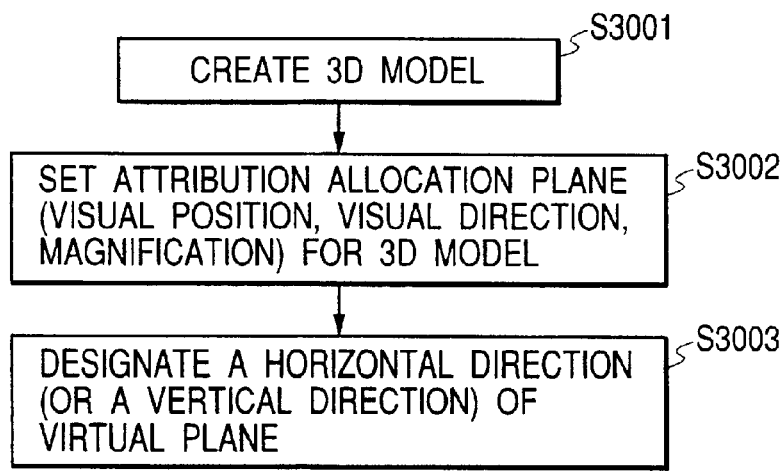
FIG. 34 is a flowchart showing the processing for setting the direction in which an attribution allocation plane is displayed.

FIG. 34 is a flowchart for this process.

First, a 3D model is created (step S3001).

Then, the visual position, the visual direction and the magnification for the 3D model are set, and the attribution allocation plane is generated (step S3002).

The horizontal direction (or the vertical direction) of the attribution allocation plane is designated (step S3003). For this designation, the three axial directions (X, Y and Z) present in the (virtual) three-dimensional space may be selected, or the direction of the ridge line of the 3D model or the vertical direction of the plane of the 3D model may be selected.

When the horizontal direction (or the vertical direction) of the attribution allocation plane is designated, the positions whereat the 3D model and the attribution information are displayed are determined by selecting the attribution allocation plane.

To create another attribution allocation plane, the horizontal direction (or the vertical direction) need only be designated while maintaining the visual direction of the created attribution allocation plane.

(Categorization of Each Plan for Measuring Attribution Information)

An explanation will now be given for the background wherefor, according to this invention, attribution information such as dimensions is categorized and groups are formed.

In the molded product inspection step at S109 in FIG. 1, a portion of the 3D model is measured using several measurement instruments, while referring to attribution information, such as a dimension and a dimensional tolerance, that is added to the 3D model or the drawing. The type of measurement instrument used is a three-dimensional measurement instrument, such as a CMM, or a micrometer or a microscope, that is manually operated by an operator.

The targeted portion is measured by referring to attribution information, such as a dimension, that is added to the 3D model or the drawing.

Parts to be measured have three dimensions, and are measured in every direction, or in an arbitrarily selected direction, depending on the portion to be measured.

Therefore, when an automatic measurement instrument, such as a CMM, is used for the measurement, a tool is used to fix the parts to be measured to the table of the instrument in several directions.

Guidelines established for the positioning of a part in each measurement direction and the settings for specific measurement instruments are called measurement plans.

Figure 37:
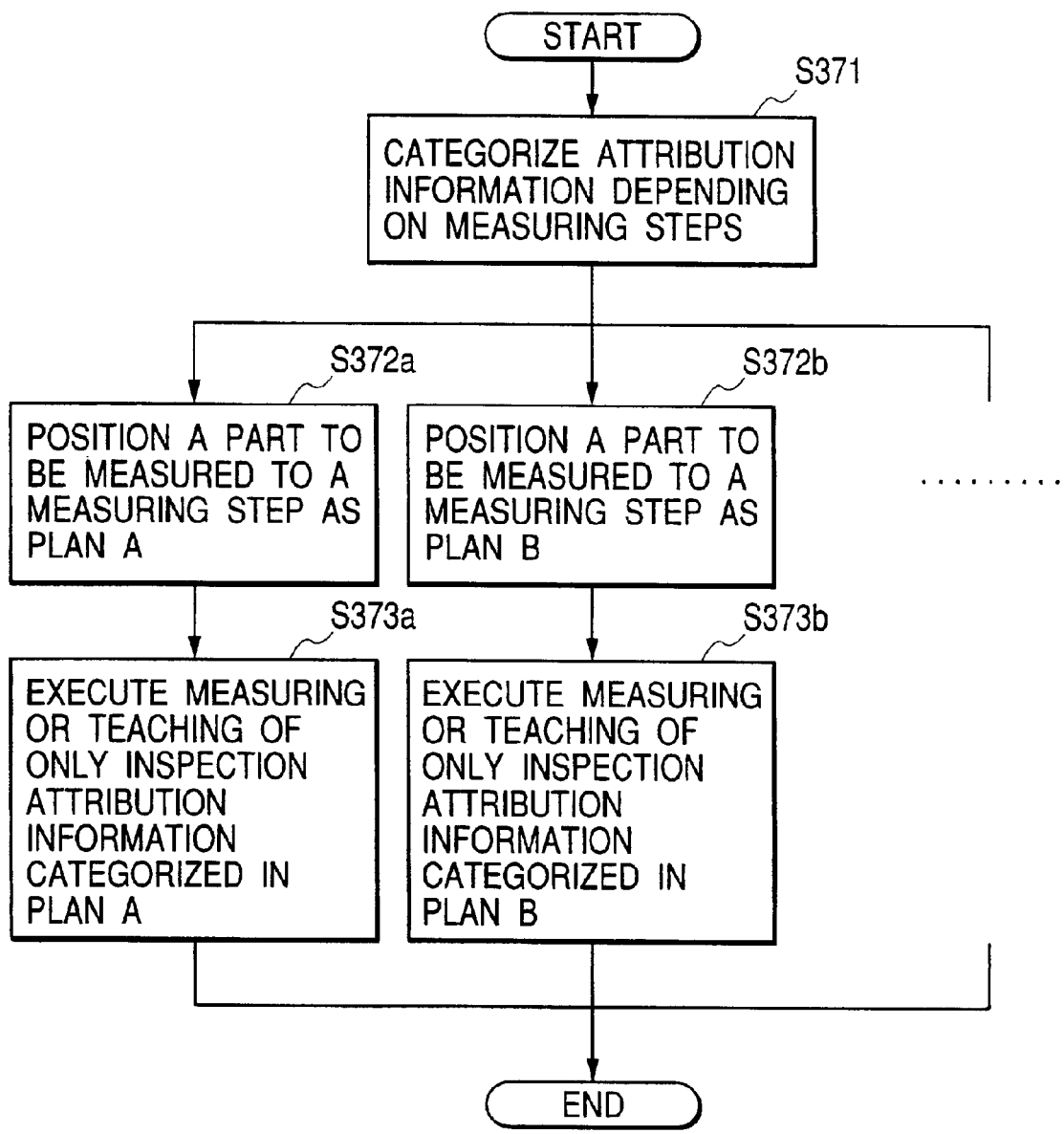
FIG. 37 is a flowchart for categorizing attribution information and for measuring a dimension for each plan.

An explanation will now be given, while referring to FIG. 37, for measurement plan categorization means and measurement navigation means according to the embodiment.

At step S371, the attribution information added to the 3D model or the drawing is categorized for individual measurement plans. In this process, as is explained while referring to FIG. 2, the operator employs the input device 205 to select desired attribution information from among that displayed on the display device 204, and to categorize it while providing a group name.

The selected attribution information may also be added to or deleted from a conventional group.

Furthermore, the categorized group information can be stored in the external storage device 202 in FIG. 2, such as a hard disk, or in a different information processing apparatus via an external connecting device 207, such as a network, so that the group information can be read by different information processing apparatuses.

In addition, a plurality of groups can be prepared for measurement plans, and therefore, in the following explanation it is assumed that plan A and plan B have been are generated.

A measurement operator a positions a target part on a measurement instrument as in plan A, and a measurement operator b positions a target part on the measurement instrument as in plan B. This operation can be performed in parallel by preparing a plurality of parts to be measured.

This process is performed following the product design step S102 in FIG. 1 and before the molded product inspection step S109.

At step S373*a*, only attribution information categorized for plan A is displayed on the display device 204 in FIG. 2, and while referring to plan A, the operator measures the target part, or performs the measurement teaching.

As another display method, attribution information categorized for plan A can be displayed in order on the display device 204.

With this method, even when there are many attribution information sets it is easy to identify the portion to be measured and to reduce omissions, such as the entry of measurements.

At step S373b, only attribution information categorized for plan B is displayed on the display device 204 in FIG. 2. While referring to plan B, the operator measures the target part, or performs the measurement teaching.

Since the operator efficiently refers to the attribution information pertinent to the plan, the occurrence of human errors, such as measurement omissions or measurement overlapping, can be reduced.

In this explanation, this embodiment has been employed for the molded product inspection processing; however, the embodiment can be applied for the metal mold inspection step S107, and the same effects can be obtained.

Furthermore, this embodiment can also be applied for a case wherein the attribution information must be repetitively referred to during an operation that requires several plans. Therefore, the planning process can be performed in advance and referring to attribution information can be performed efficiently.

Method for Displaying Attribution Information

A method for displaying attribution information will now be described.

In the explanation given for the embodiment, as a method for selectively displaying attribution information entered for the 3D model, first, an attribution allocation plane is selected, and then, attribution information correlated with the attribution allocation plane is displayed as needed. The embodiment is not limited to this method, however. As another effective method, attribution information is selected, and the 3D model and the attribution information are displayed at the visual position, in the visual direction and at the magnification for the attribution allocation plane correlated with the attribution information.

Figure 35:
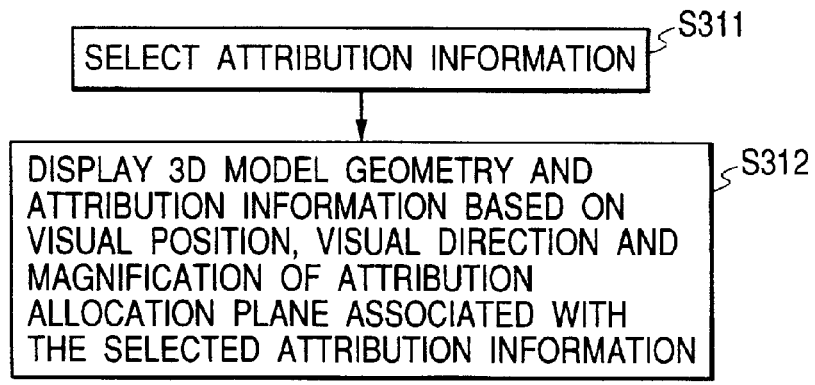
FIG. 35 is a flowchart for displaying a 3D model using attribution information as a key.

FIG. 35 is a flowchart showing the processing sequence for the selection and display of attribution information.

When the 3D model and the attribution information in the plan view in FIG. 8 are displayed, a cylindrical projection φ15±0.05 is selected (step S311).

The 3D model and the attribution information correlated with the attribution allocation plane 211 are displayed based on the visual position, the visual direction and the magnification that are set for the attribution allocation plane 211 (step S312). In this case, the front view in FIG. 9 is displayed.

Therefore, since the relationship of the selected attribution information and the 3D model is displayed two-dimensionally, the relationship can be easily identified.

Plane selection method

In this embodiment, as a method for selectively displaying attribution information entered for the 3D model, first, an attribution allocation plane or attribution information is selected, and then, the attribution information correlated with the attribution allocation plane is displayed as needed, based on the setting for the attribute allocation plane. The embodiment is not limited to this method, however. As another effective method, the geometric information (Geometry) for the 3D model is selected, the attribution information correlated with the geometric information is displayed, and the 3D model and the attribution information are displayed at the visual position, in the visual direction and at the magnification for the attribution allocation plane correlated with the attribution information.

Figure 36:
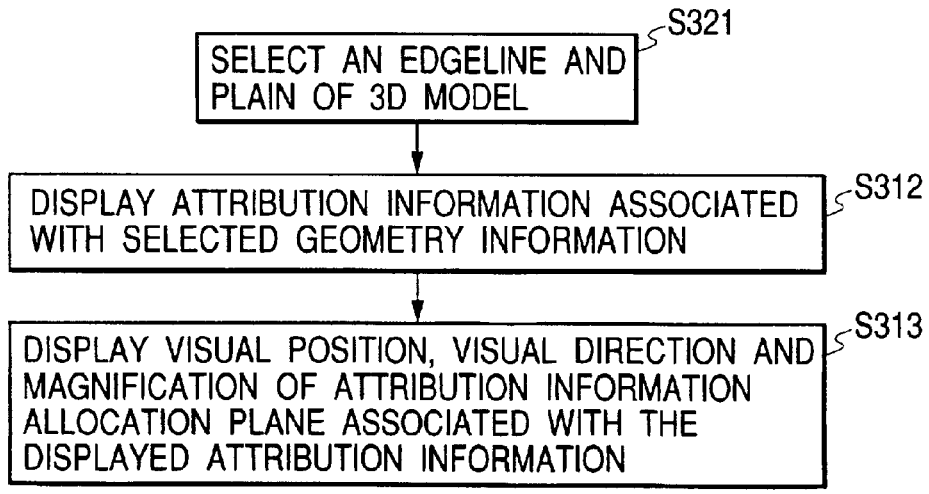
FIG. 36 is a flowchart for displaying a 3D model using geometric information as a key.

FIG. 36 is a flowchart showing the processing sequence for the selection and the display of attribution information.

Geometric information (ridge lines, planes and vertexes) for the 3D model is selected (step S321).

Attribution information correlated with the selected geometric information is then displayed (step S322).

When there is a plurality of correlated attribution information sets, all of them may be displayed. Further, all the attribution information belonging to attribution information planes with which attribution information is correlated may be displayed.

Next, the 3D model and the attribution information are displayed based on the visual position, the visual direction and the magnification (the horizontal direction of the attribution allocation plane) of the attribution allocation plane correlated with the displayed attribution information. At this time, when a plurality of attribution allocation planes are to be selected, the operator is permitted to select the planes that are to be displayed.

Since correlated attribution information can be searched for and displayed using the geometry of the 3D model as a key, this is a very practical method.

Selection of geometric information→display of correlated attribution information (single set)→display of attribution information at a position on a correlated attribution allocation plane.

Selection of geometric information→display of correlated attribution information (single set). Display all the attribution information correlated with an attribution allocation plane.

Selection of geometric information→display of correlated attribution information (multiple sets) →display of attribution information sets at positions on a single correlated attribution allocation plane.

Selection of geometric information→display of correlated attribution information (multiple sets). Display all the attribution information sets correlated with attribution allocation planes.

Selection of geometric information→display of correlated attribution information (multiple sets) →display of attribution information sets at positions on multiple correlated attribution allocation planes.

Selection of geometric information→display of correlated attribution information (multiple sets). Display all the attribution information sets correlated with attribution allocation planes.

(Display)

An explanation will now be given for the processing for displaying a 3D model to which the thus generated attribution information is added.

Data for a 3D model, to which the attribution information prepared by the information processing apparatus in FIG. 1 is added, can be transmitted by the information processing apparatus directly or via an external connecting device, and can be displayed by another information processing apparatus, as in FIG. 2, at the steps in FIG. 1.

First, an operator, a design engineer who designs products/units/parts, displays a generated 3D model in the manner shown in FIGS. 9, 10B and 11B, so that new attribution information can be added to a 3D model as though a two-dimensional drawing was being prepared. For example, when the shape of a 3D model is complicated, as needed, the three-dimensional representation and the two-dimensional representation for the 3D model are alternately displayed, or are displayed on the same plane. Thus, desired attribution information can be entered efficiently and accurately.

Further, an operator who is to examine/approve the generated 3D model displays and examines it by displaying the representations of the 3D model shown in FIGS. 9, 10B and 11B on the same plane or alternately. Then, marks or symbols indicating "inspected", "OK", "NG", "suspended" and "re-examination required", or attribution information, such as coloring, are added. In this case, it is natural for the operator to examine the 3D model by, as needed, comparing it with or referring to a plurality of products/units/parts.

Furthermore, a design engineer or a designer other than the creator of a 3D model may refer to the generated 3D model to design another product/unit/part. By referring to the 3D model, it is easy to apprehend the intent of the creator or the design method.

Further, when preparing a 3D model for use in manufacturing, an operator can add to it required information or attribution information. In this case, the operator is an engineer tasked with setting up the processing for the manufacture of products/units/parts. The operator instructs the use of a process type and tools, or adds corners R or the chamfering of ridge lines, angular portions or corners that is required for the machining of the 3D model. Either this, or the operator instructs a measurement method to be used for a dimension or a dimensional tolerance, adds measurement points to a 3D model, or enters measurement notes. The operator can efficiently perform this operation by referring to the representations shown in FIGS. 10B and 11B, which are easy to apprehend visually, and by, as needed, confirming the geometry three-dimensionally.

An operator can obtain information required for a desired preparation from the 3D model or the attribution information. In this case, the operator is a design engineer tasked with designing metal molds, tools and various types of devices required for manufacturing the 3D model. The operator apprehends the shape of the 3D model by referring to its representation in three-dimensional space, and extracts required information, which is easily perceived visually, from the representations shown in FIGS. 9, 10B and 11B. Then, based on the attribution information, the operator designs metal molds, tools and devices. When, for example, the operator is a metal mold designer, based on the 3D model and the attribution information, the operator designs metal molds by examining their structure, and adds, as needed, the corners R and the chamfering to ridge lines, angular portions and corners that are required for the manufacture of metal molds. Further, when a metal mold is a resin injection molded type, the operator adds a draft angle required for the molding of the 3D model.

Furthermore, an operator who is responsible for the manufacture of products/units/parts can also employ this embodiment. In this case, the operator will be a product/unit/part machining or assembly engineer. While referring to the representations in FIGS. 9, 10B and 11B, which are easily apprehended visually, and, as needed, confirming the shape three-dimensionally, the operator efficiently and accurately obtains the measurement method used for dimensions or dimension tolerances, the measurement points and the notes provided for the measurements and begins to perform the inspection, measurement and evaluation operation. Then, again as needed, the operator can add to the 3D model, as attribution information, the inspection, measurement and evaluation results that are thus provided. The operation can provide, for example, measurement results corresponding to the dimensions. In addition, the operator enters marks or symbols for the attribution information or for portions of the 3D model for which the dimensional tolerances are exceeded, or to indicate defects, such as scratches. Further, in addition to the examination results, marks or symbols indicting "inspected", "measured" and "evaluated" or coloring may be provided.

Moreover, an operator who works for a department, or is responsible for the manufacture of products/units/parts can employ this embodiment. In this case, the operator is a person tasked with analyzing manufacturing costs, a person responsible for the ordering of products/units/parts or various associated parts, or a person charged with overseeing the creation of operation manuals or the preparation of packing materials for products/units/parts. In this case, also while referring to the 3D model three dimensionally, the operator can easily apprehend the shape of a product/unit/part, and can efficiently perform his or her job by referring to the representations in FIGS. 9, 10B and 11B, which are easily perceived visually.

(Input an Inspection Instruction)

An inspection instruction will now be described.

As is described above, in order to inspect a produced metal mold or part, a 3D model is displayed for which dimensions have previously been allocated.

During this processing, attribution information is entered for an attribution allocation plane that was previously designated so that a position to be inspected is clearly displayed.

Specifically, a 3D model is formed, and the sequential inspection order, the positions to be inspected and the inspection entries for planes, lines and ridge lines are input. By conducting the inspection in the order designated, the number of inspection steps is reduced.

First, the entries and positions to be inspected are entered and the overall display is presented. Then, using a predetermined method, the inspection order is assigned for the individual entries. For an actual inspection, an attribution allocation plane is selected by designating the inspection order (the instructed order is stored on the storage medium 201), and on the attribution allocation plane, in order to clearly identify the inspection positions, faces at the positions to be inspected are displayed in different forms (different colors).

Then, the inspection results provided and whether re-molding is required are input for the individual designated inspection entries.

As is described above, according to the embodiment, an easy to see screen can be obtained by performing a simple operation for which attribution allocation planes and attribution information are used. Further, the relationship between the visual direction and the attribution information can also be perceived at a glance. Furthermore, since dimensional values are input in advance, erroneous readings, the result of operator manipulation errors, can be reduced.

In addition, since only information correlated with the visual direction can be read, required information can be easily obtained.

Moreover, since a large amount of attribution information in the same visual direction is allocated to a plurality of attribution allocation planes, an easy to see screen can be presented, and required information can be easily obtained.

Also, since an attribution allocation plane is set inside the 3D model, i.e., in its cross section, correlated attribution information can be displayed so that it is easily understood.

Since the size of attribution information is changed in accordance with the display magnification for the attribution allocation plane, the attribution information can be appropriately represented so it can be identified easily.

Further, since the attribution information is provided on the attribution allocation plane, it can be read even from a three-dimensional oblique view of the 3D model.

Furthermore, since by using the attribution information as a key the attribution allocation plane can be searched and only information correlated with the attribution allocation plane can be read, required information can be easily obtained.

And in addition, since by using the geometric information as a key the attribution information and the attribution allocation plane can be searched for and only information correlated with the attribution allocation information can be read, required information can be easily obtained.

As is described above, according to the embodiment, as the first effect attribution information, such as a dimension, is categorized by the information processing apparatus, and the obtained results are stored and read. Thus, since the dimensions are categorized only once, in advance, the processing time can be reduced compared with the conventional case, wherein repetitive categorization is performed each time a measurement is made.

In addition, while conventionally the categorization process is performed following the measurement of an object, such as a molded product or a metal mold, attribution information, such as a dimension, is categorized for each measurement instrument or each plan before the object to be measured is produced by the information processing apparatus. Thus, the categorization process can be performed early, and the inspection process time required following the production of the object to be measured can be reduced.

As the second effect, since attribution information, such as a dimension, is categorized in advance for each measurement instrument or each plan, the measurement processes that conventionally are sequentially performed can be performed in parallel. For example, whereas conventionally a measurement is obtained by using a three-dimensional measurement instrument, such as a CMM, and by then using a microscope and a micrometer, a measurement can be obtained by using these measurement instruments simultaneously.

As the third effect, attribution information is categorized by the information processing apparatus, or the process state is read from the storage device, and the attribution information, such as dimensions, is displayed in order, so that within a short period of time the measurement process can be performed and the attribution information apprehended.

As the fourth effect, attribution information is categorized by the information processing apparatus, or the process state is read from the storage device and the attribution information, such as dimensions, is displayed in order, so that human errors can be suppressed and the number of backtracking steps reduced.

(Mold Inspection Processing)

Figure 38:
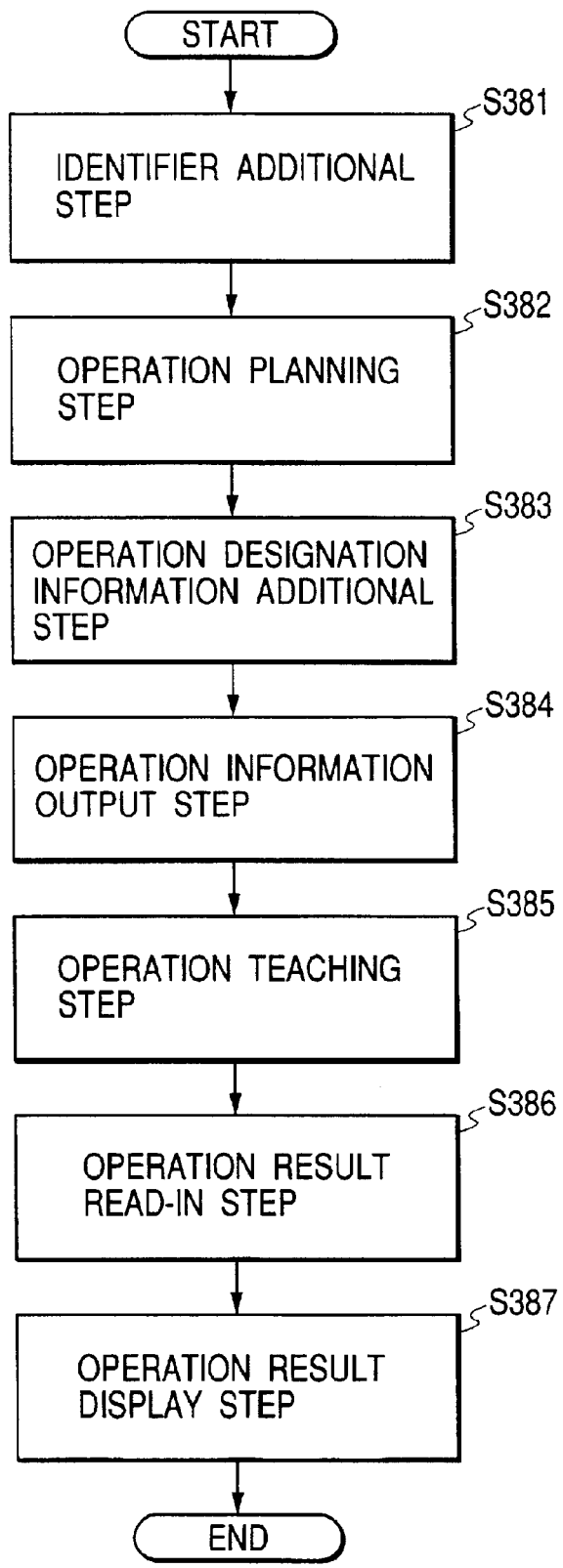
FIG. 38 is a flowchart showing the processing for a mold inspection step.

FIG. 38 is a flowchart showing the processing performed when the present invention is employed for mold inspection.

At step S381 in FIG. 38, attribution information is designated and a unique identifier is automatically added to it. During this processing, instead of inputting an identifier for the designated attribution information, an attribution information group is correlated with a view, or an arbitrary attribution information group, or parts of it, defined at S304 in FIG. 3 may be designated and identifiers collectively added in the order represented by designated numbers.

In addition, when at step S132 attribution information for a 3D model is input, a unique identifier may be added.

An added identifier is stored on the internal storage medium 201 or in the external storage device 202 as an attribution value for the attribution information in FIG. 6.

Figure 39:
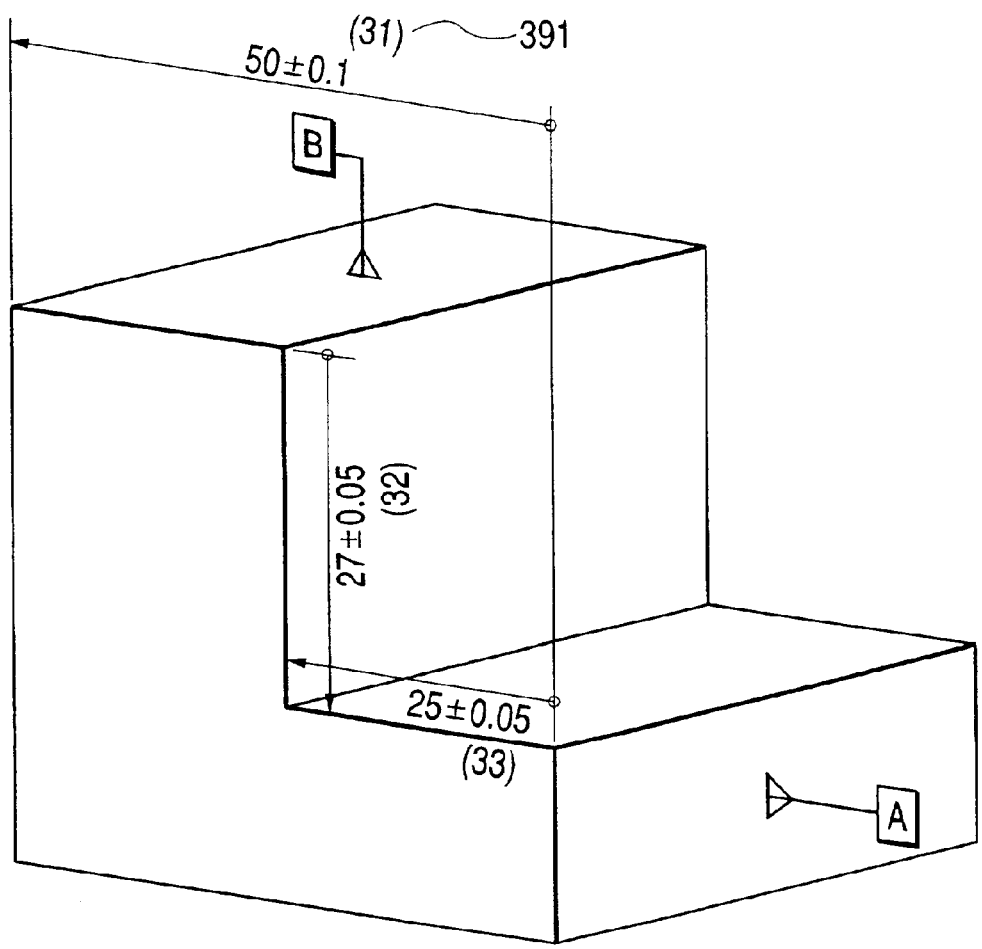
FIG. 39 is a diagram wherein identifiers have been added to attribution information for a 3D model.

FIG. 39 is a diagram showing an example wherein an added identifier is located near the attribution information displayed on the display device 204. An identifier 191 is displayed near the attribution information by enclosing it within a circle or a square. Since the identifier is enclosed within a circle or a square, it can be easily distinguished from the other attribution values.

At step S382, attribution information is categorized for each measurement plan.

The measurement planning will now be described.

A part to be measured has a 3D geometry, and is to be measured in every direction or in an arbitrary direction, depending on the measurement positions. When an automatic measurement instrument, such as a CMM, is employed, the measurement process is conducted by using a tool to fix a target part to the table of the instrument.

The process for categorizing a dimension for each measurement direction using an automatic measurement instrument, or the process for categorizing a dimension manually measured using a micrometer, is called measurement planning.

This step S382 is performed when dimensions to be categorized are grouped at step S304.

The attribution information groups are arranged following Group List in FIG. 6 and stored on the internal storage medium 201 or in the external storage device 202.

At step S383, measurement points are designated for attribution information.

For attribution information, such as dimensions, points that an operator uses as measurement indexes can be designated in advance on a CAD model. By referring to the information for a measurement point, a measurement path program for an automatic measurement instrument, such as a CMM, can also be generated.

The input device 205, such as a mouse, is used to enter the measurement points for a 3D model displayed on the display device 204. The input measurement points are stored as attribution values for the attribution information on the internal storage medium 201 or in the external storage device 202.

Figure 40:
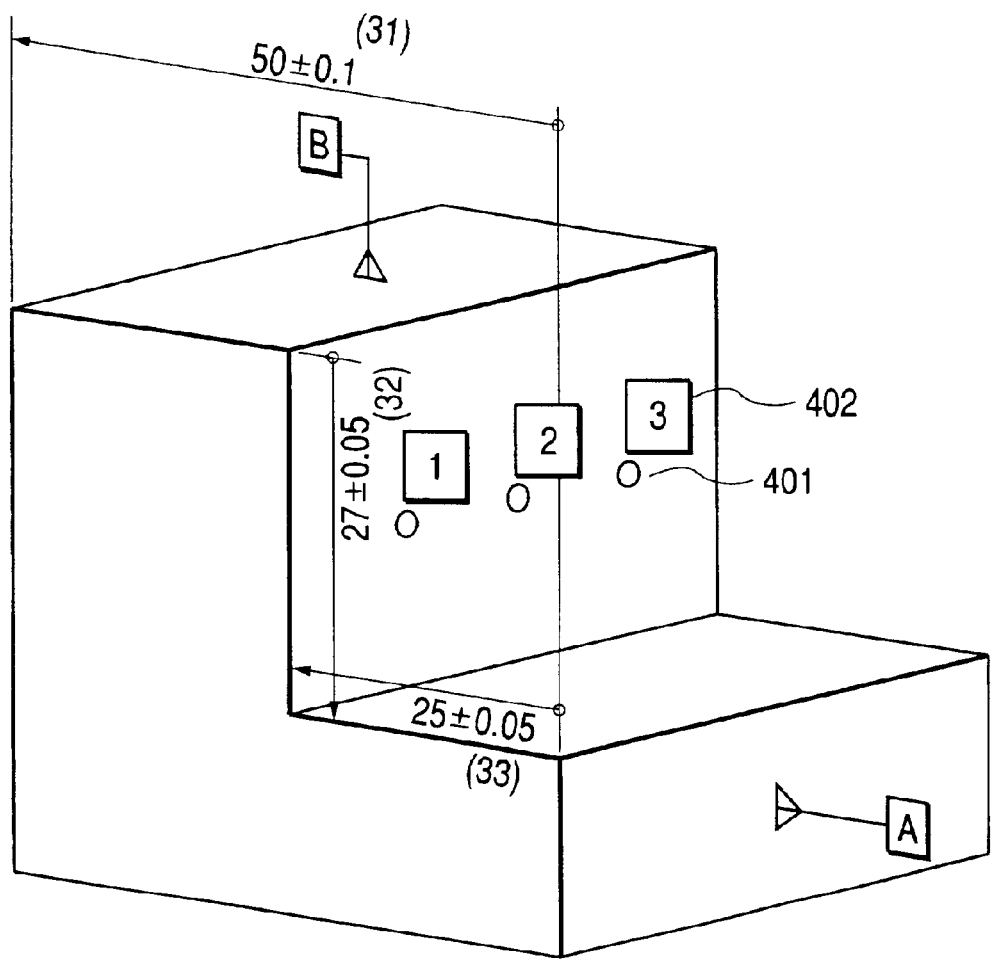
FIG. 40 is a diagram wherein measurement points have been added to attribution information for the 3D model.

FIG. 40 is a diagram showing an example wherein measurement points displayed on the display device 204 are correlated with the 3D model and the attribution information.

Measurement points 401 are examples displayed on the display device 204, as are point IDs 402. Identifiers unique to individual information attribution information are also added to the measurement points as point IDs 402. As is shown in FIG. 40, the point IDs 402 on the display device 204 are displayed near the measurement points 401.

At step S384, a part or a group is designated for measurement planning, and measurement data is output to the external storage device 202.

FIG. 41 is a diagram showing examples of the measurement data that is output.

The measurement data entries are an identifier, a measurement point ID, the coordinates of a measurement point, a design value, a tolerance upper limit, a tolerance lower limit, a measured value and other information.

While referring to information that, for each attribution information set, is stored on the internal storage medium 201, or in the external storage device 202, as an attribution value for attribution information, the above described data entries are output as the table in FIG. 41.

When the attribution information includes a plurality of measurement points, the above data are output for each measurement point.

When measurement data having a table form are output to the external storage device 202, the data collection operation can be automated by referring to measurement data output by another application.

When measurement data that include the coordinates of a measurement point are output, a coordinate system can also be designated.

At step S385, when a part or a group for an operation plan is designated as is shown in FIG. 42, to distinguish between ridge lines and points on the 3D model, indicating portions to be measured, and attribution information, such as dimensions, that are displayed on the display device 204, different display colors are used.

While referring to the 3D model on the display device 204, the measurement operator can generate a measurement program for a CMM, or can employ a manual measurement instrument, such as a vernier caliper or a gauge.

The measurement results can be input to the table in FIG. 41.

Figure 43:
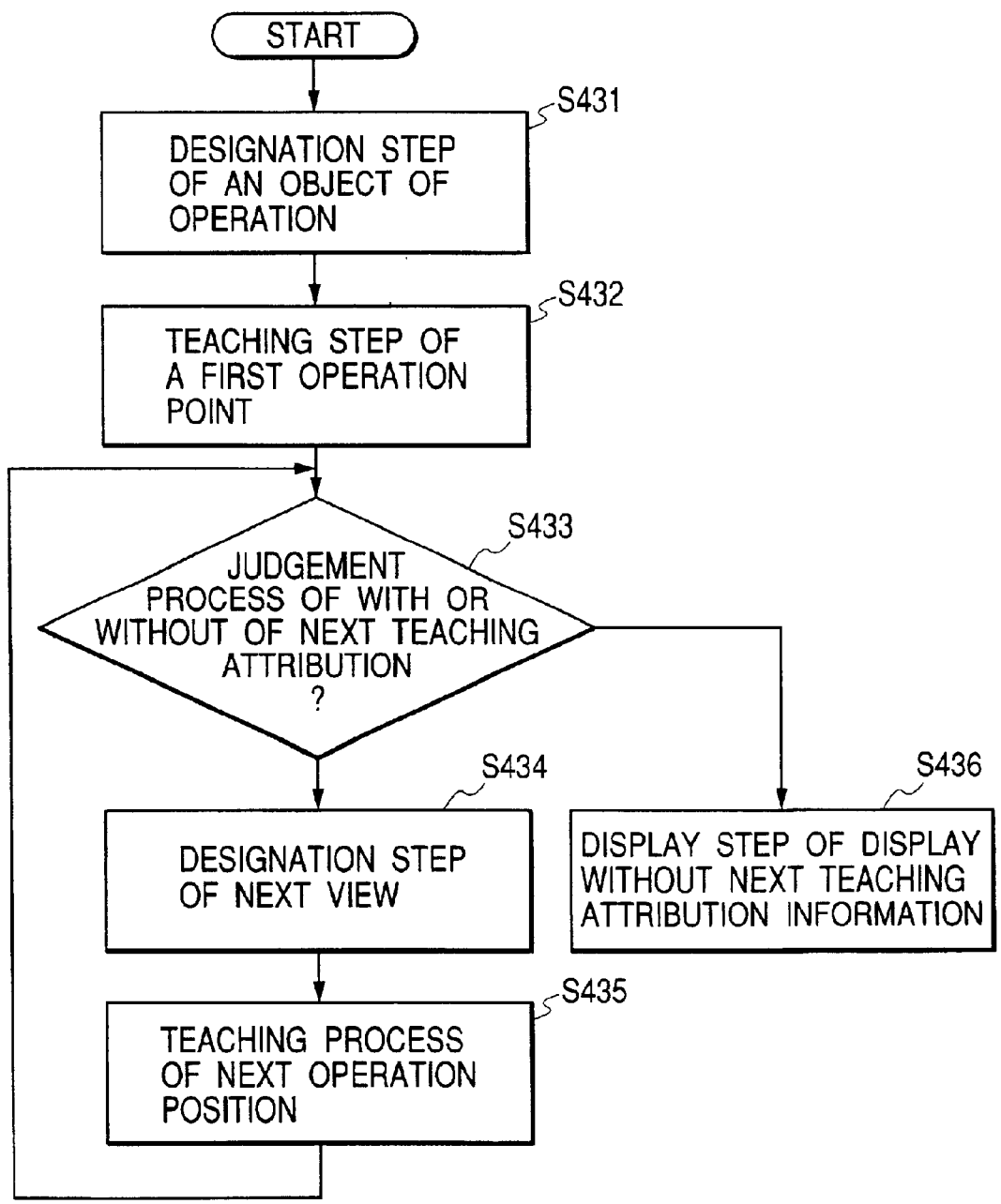
FIG. 43 is a detailed flowchart for explaining the operation teaching processing.

The process at step S385 will be further explained while referring to FIGS. 42 and 43.

At step S431 in FIG. 43, a part or an attribution information group is designated for which measurement navigation is to be performed. For this process, a menu 421 in FIG. 42 that is displayed on the display device 204 is employed for the interactive designation of the designated part or attribution information group.

When the part or the group is designated for the measurement navigation, at step S432 the first measurement portion is displayed on the display device 204.

An example 423 for teaching the measurement portion is shown in FIG. 42.

As is shown in FIG. 42, the attribution information to be measured is highlighted with the identifier, and can be easily distinguished from other attribution information.

Further, since a color differing from the color of a CAD model is used to display the face of the model that is to be measured, an operator can identify the portion that is to be measured.

Further, when a measurement point is present on the face to be measured, an identifier for the measurement point can be displayed near the portion of the face whereat the measurement point is defined, and the point to be measured can be taught the operator.

When no teaching attribution information is present for the designated part or attribution information group, information indicating "there is no teaching attribution information" is output to the display device 204, and program control returns to step S431. Then, another part or another attribution information group can be selected.

At step S433, a check is performed to determine whether there is attribution information for teaching the next measurement. A "teaching flag", which is one of attribution values for the attribution information shown in FIG. 6, is used to indicate whether the teaching has been accomplished and is stored, for each attribution information set, on the internal storage medium 201 or in the external storage device 202. When the attribution information is added, a value of "0", indicating pre-teaching, is set as the initial value for the "teaching flag". And when the teaching has been accomplished, a value of "1", indicating that the teaching has been accomplished, is set as the value for the "teaching flag" for the pertinent attribution information. Thus, when by referring to the "teaching flag" for the attribution information for the designated part or of the designated group, attribution information having a value "0" is found to be present, it is ascertained that attribution information is available for the teaching of the next measurement.

And when it is ascertained at step S433 that attribution information for teaching the next measurement is available, at step S434 a state (active) is set in which the "next page" button on the menu 421 in FIG. 42 can be selected. The operator can then use an input device 205, such as a mouse, to select the "next page" button so that an instruction is issued for the display of the attribution information for the next measurement.

Since the state is provided wherein the "next page" button can be selected on the menu 421, the operator can ascertain that attribution information to be measured remains. As a result, an inspection omission can be suppressed, and the time loss attributable to backtracking, such as a re-measurement process performed for attribution information that was missed, can be reduced.

At step S435, as at step S432, the portion to be measured is displayed on the display device 204. At this time, in the active state the "previous page" button on the menu 421 is changed to the "previous page" button on the menu 422, and the screen can be returned to the teaching screen for the attribution information for teaching the previous measurement.

To improve the operating efficiency, it is substantially important that a support system assume the occurrence of an artificial error, such as "a wrong portion was measured" or "without measuring the current attribution information, the process is shifted to the next attribution information". When the "previous page" button on the menu 422 is employed, the preceding operating state can be easily recovered.

Even when there is a large amount of attribution information, the recovery operation that accompanies an artificial error can be simplified, so that psychologically the operator can easily perform the measurement process, and the operating efficiency can be improved.

When it is ascertained at step S433 that no attribution information is available for the teaching of a next measurement, at step S436, the non-active state is set wherein the "next page" button can not be selected on the menu 422 in FIG. 42. When the nonactive state wherein the "next page" button can not be selected is displayed on the display device 204, the operator can easily ascertain that the measurement process has ended. Further, it is possible to prevent the overlapping measurement of the same attribution information.

During the measurement operation, the operator employs an automatic measurement apparatus or a manual measurement instrument, in addition to an inspection information processing apparatus explained in the embodiment. Since a plurality of apparatuses is employed, it is preferable that the process end information obtained by the inspection information processing apparatus be displayed so it can easily be seen by the operator.

During the measurement operation, the operator mainly manipulates the "next page" button on the menu 421 in FIG. 42. Therefore, when the process end information is displayed on the display device 204 and the display state of the "next page" button is changed, the operator can easily ascertain whether the operation has been completed or whether there is still attribution information to be processed.

At step S432 or S435, the attribution value of the target attribution information can be displayed at a predetermined location on the display device 204. As previously described, since the operator employs a plurality of measurement instruments, so long as the information necessary for a measurement is displayed at a predetermined location, the operator can efficiently perform the measurement.

At step S432 or S435, a measured value can be input for the target attribution information. The operator employs the process results input function on the menu 421 in FIG. 42 to enter the process results, such as measured values, and these results are stored on the internal storage medium 201 or in the external storage device 202 as the attribution values for the attribution information in FIG. 6.

Referring again in FIG. 38, the processing will now be described that is performed when the present invention is applied for mold inspection.

At step S386, the measurement results data is read from the external storage device 202.

The measurement results data in FIG. 41 are merely examples.

The operator can add the measurement results data as measured values to the measurement data output at step S384.

Furthermore, a file output by another measurement support application can be also be read as measurement results data.

When the measurement results data including the coordinate value, such as a measurement point, is to be read, a coordinate system can be designated.

At step S387, the measurement results are displayed in correlation with the 3D model.

Figure 44:
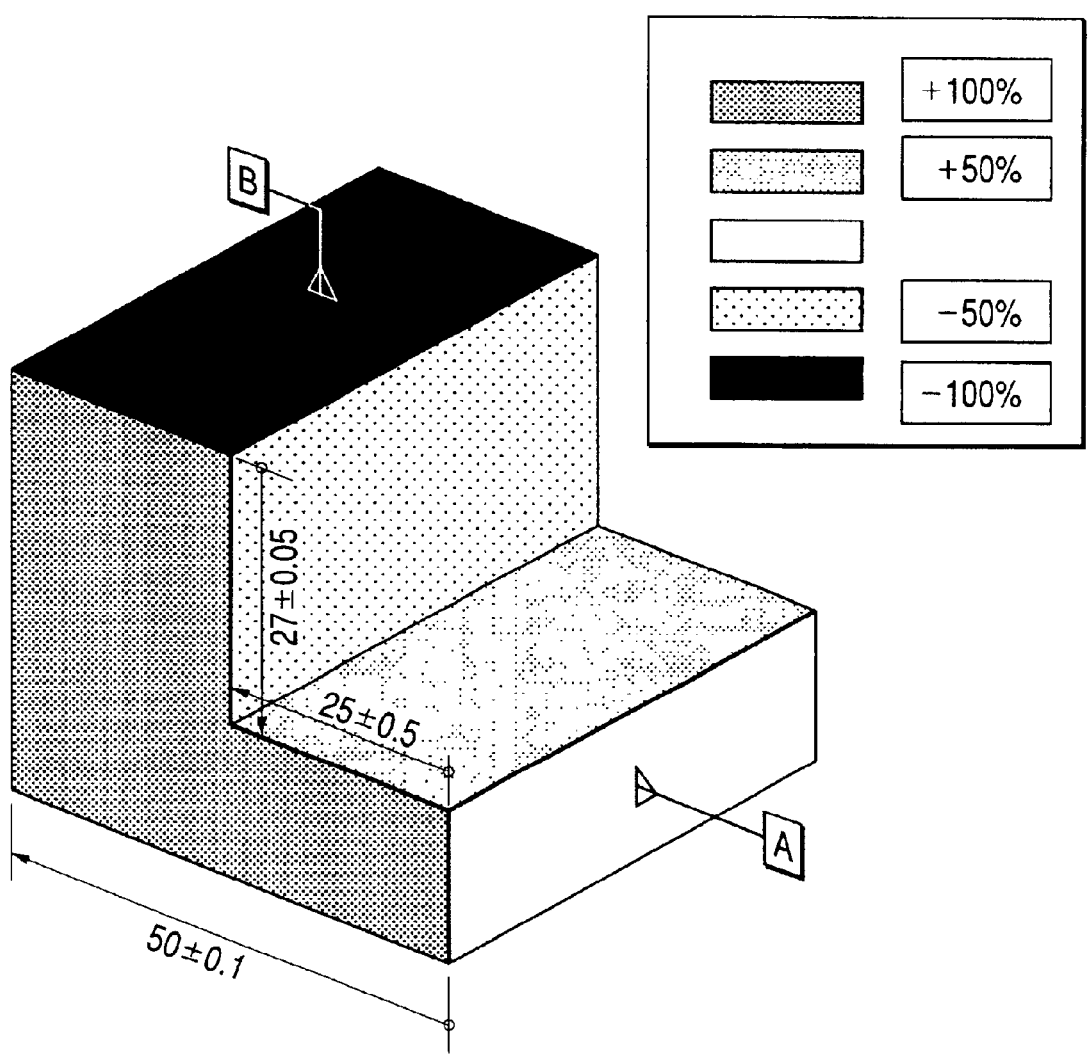
FIG. 44 is a diagram showing a 3D model displayed in correlation with measurement results.

FIG. 44 is a diagram showing an example wherein the measurement results are displayed in correlation with the 3D model.

The measurement results can be displayed, while for individual attribution information, the colors of the faces and the ridge lines of the 3D model are changed in accordance with the difference between the measured value and the design value.

Furthermore, by referring to the tolerance value of attribution information, the measurement results can be displayed, while the colors of the faces and the ridge lines of the 3D model are changed at the ratio of the difference to the tolerance value.

The embodiment has been explained for an operation wherein the present invention is applied for the mold inspection process using the 3D-CAD apparatus. However, the present invention is not limited to the use of the 3D-CAD apparatus, and a 2D-CAD apparatus can also be employed. And even when the 2D-CAD apparatus is employed, the inspection process can be efficiently performed.

In addition, as another example, the present invention is not limited to its use for the mold inspection process, and it can be applied for a process for inspecting a metal mold or a metal plate. Moreover, the present invention can be used to support the processing performed for the evaluation of CAD attribution information items, such as dimensions or dimensional tolerances.

As is described above, according to the present invention, an attribution information apparatus and a method therefor comprises:

identifier addition means for adding an identifier to attribution information, such as a dimension, on a CAD model;

operation information output means for outputting information required for an operation such as a measurement;

operation teaching means for teaching an operation such as a measurement;

operation results reading means for reading operation results, such as measurement results, in correlation with the identifier and the attribution information; and operation results display means for displaying the operation results in correlation with the CAD model. Thus, the efficiency of the manual inspection operation can be improved, and even without a 2D drawing, an inspection can be performed, so that the steps and costs required for information transmission for design and manufacturing can be reduced.

In addition, the attribution information processing apparatus of the invention further comprises:

operation planning means for grouping attribution information for each operation plan. Thus, at least several hundreds of attribution information sets can be easily processed, and the inspection operation can be performed in parallel for individual measurement plans. Therefore, the inspection period can be reduced.

Furthermore, an attribution information processing apparatus according to the present invention comprises:

operation instruction information addition means for adding to attribution information operation instruction information, such as measurement points; and operation instruction information display means, provided for the operation teaching means to display the operation instruction information. Since the instruction for the portion to be inspected is presented in correlation with the CAD model, an operator can be accurately and efficiently apprised of an operation instruction.

Further, the operation teaching means includes the attribution information correlation element display means that displays the elements of the CAD model with the attribution information so that the elements of the CAD model can be distinguished from the other elements. Therefore, even when the geometry is complicated or when the attribution information is intricate, the operator can easily apprehend which portion is to be measured.

Furthermore, the operation teaching means includes:

group designation means for designating a group that is obtained for each operation plan;

attribution information determination means for determining whether in the group for an operation plan there is next teaching attribution information;

next page display means for, when the attribution information determination means determines that the next teaching attribution information is present, instructing the display of the next attribution information; and next page non-active means for, when the attribution information determination means determines that there is no next teaching attribution information, inhibiting the instruction of the display of the next attribution information. With this arrangement, an operator can easily identify the end of the measurement operation, so that the omission of a measurement can be prevented and the backtracking of the measurement can be avoided.

In addition, the operation teaching means includes the attribution information fixed position display means for displaying attribution information at a predetermined position. With this arrangement, the operator can easily obtain the information required for the measurement, and can efficiently perform the measurement while simultaneously manipulating a plurality of apparatuses.

(Other Molding Inspection Processing)

Other molding inspection processing and the operation instruction information addition processing will now be described in detail.

In the operation planning process at step S382 in FIG. 38, the attribution information is categorized for each measurement plan.

A part to be measured has a 3D shape, and is measured in every direction or in an arbitrary direction, depending on the portion to be measured. When an automatic measurement instrument, such as a CMM, is employed, at tool is used to fix a part to be measured to the table of the instrument.

Figure 63A:
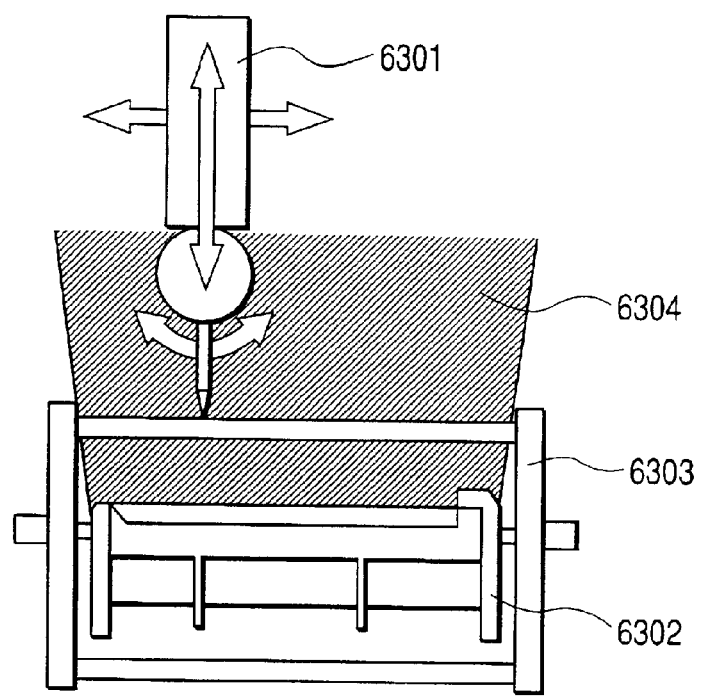
FIGS. 63A and 63B are schematic diagrams showing the measurement status when a CMM automatic measurement instrument is being used.
Figure 63B:
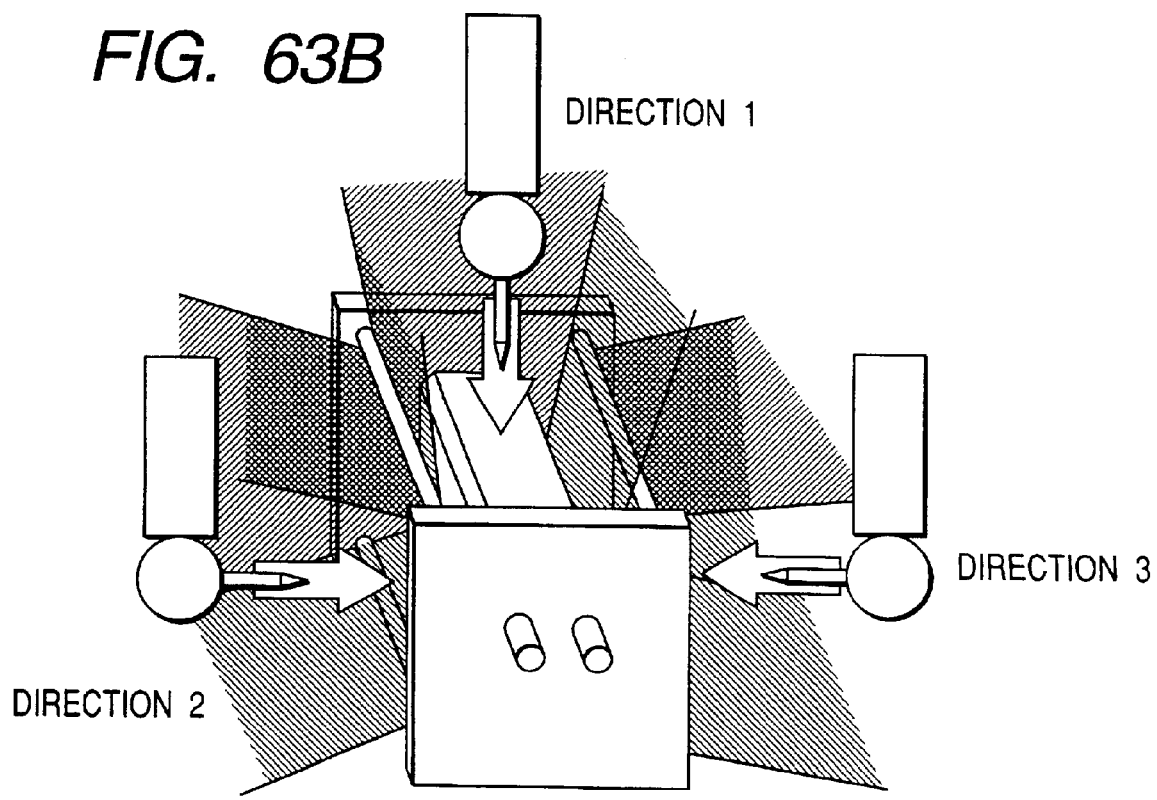

FIGS. 63A and 63B are schematic diagrams showing the measurement state when an automatic measurement instrument, such as a CMM, is used.

For a measurement performed in this example using the CMM, an available measurement range 6304 is determined by the movable range of a measurement terminal 6301, the shape of a part 6302 to be measured and the shape of a tool 6303 used to fix the part 6302.

As is shown in FIG. 63B, the measurement range 6304 is defined in each direction. The attribution information that falls within the measurement range 6304 can be measured in the pertinent direction, and the categorization of available attribution information for each direction for the automatic measurement instrument is called the measurement planning.

Further, when means, such as a micrometer, a microscope or a gauge, is employed to manually measure attribution information that can not be measured by the automatic measurement instrument, the process for categorizing, for each measurement means, dimensions manually measured by the micrometer is also called operation planning.

This process will now be described while referring to FIGS. 64 and 65.

Figure 64:
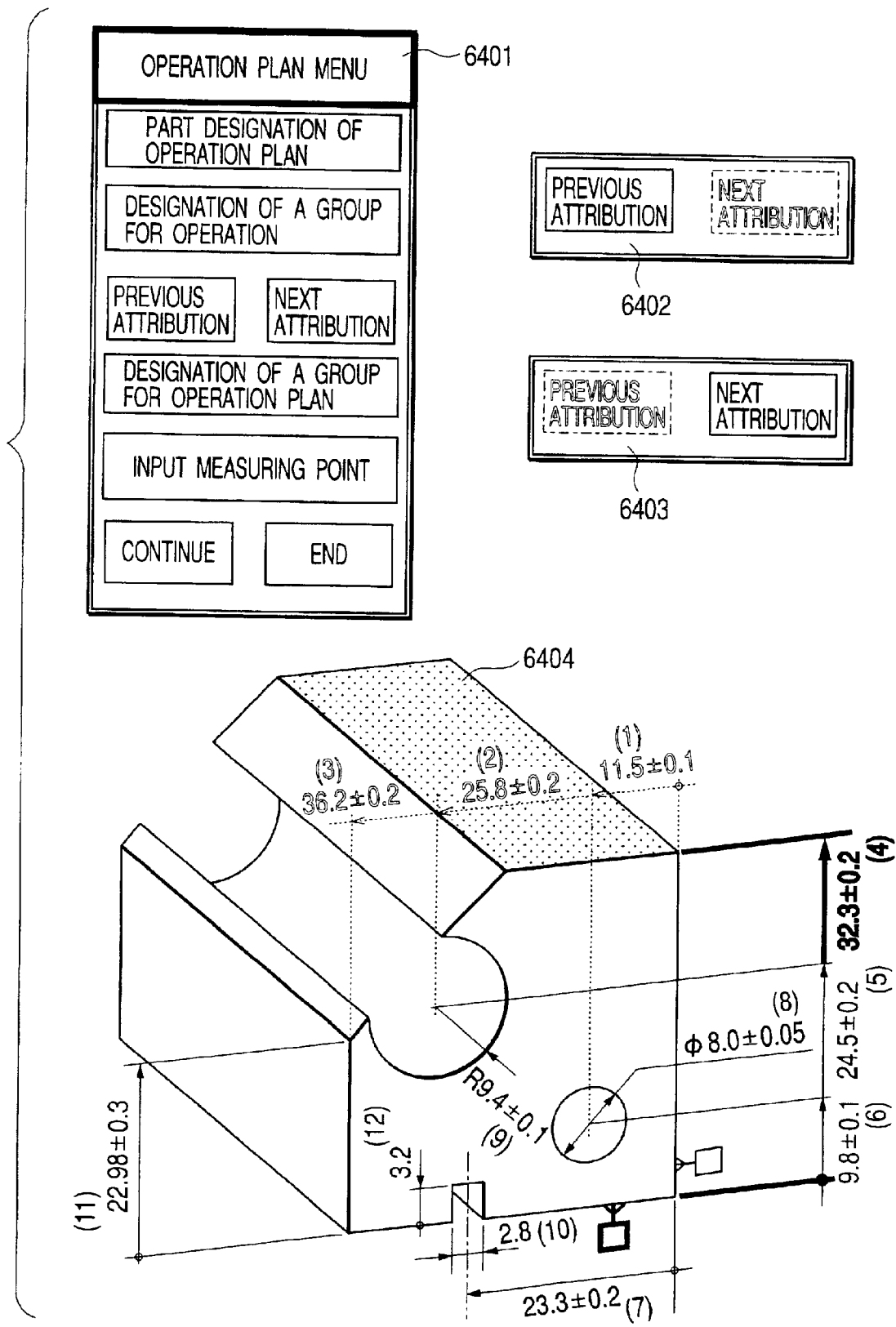
FIG. 64 is a diagram showing a 3D model in an operation plan.
Figure 65:
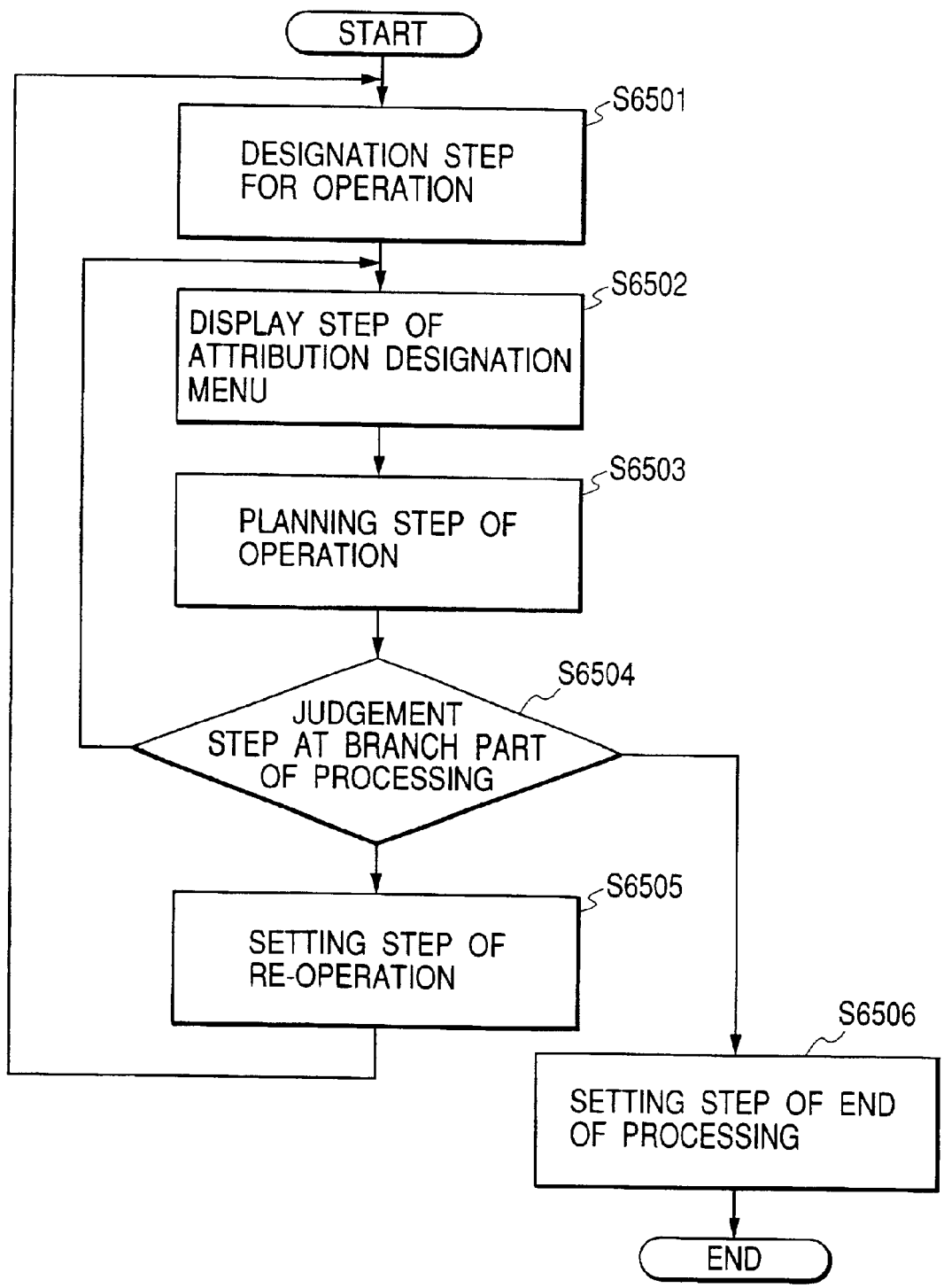
FIG. 65 is a detailed flowchart for explaining the operation planning processing.

At step S6501 in FIG. 65, a part or an attribution information group is designated as a target for the measurement planning. For this process, a menu 641 in FIG. 64, displayed on the display device 204, is employed to interactively designate the part or the attribution information group.

When the part or the attribution information group for the measurement planning is designated, the attribution information belonging to this group is automatically displayed on the display device 204. When an attribution information group correlated with a view is designated, the attribution information is displayed in accordance with the view.

When no attribution information for which planning should be performed is present for the part or the attribution information group that is designated, the message, "no attribution information is present", is displayed on the display device 204. Program control then returns to step S6501 and another part or attribution information group is selected.

When at step S6501 a part or an attribution information group is designated as a target for a measurement plan, the process at step S6502 is performed for the first attribution information in GroupList.

At step S6502, the operation menu status in FIG. 64 is changed in accordance with the entry order in GroupList for the current attribution information.

When there is no preceding attribution information, as is shown in a state 6403 in FIG. 64, the "previous attribution" button is set in the non-selectable state (inactive).

When there is no attribution information after the current one, as is shown in a state 6402 in FIG. 64, the "next attribution" button is set to inactive.

When in the GroupList there are preceding and succeeding attribution information entries for the current attribution information, both the "previous attribution" button and the "next attribution" button are set to the selectable state (active).

At step S6503, the target attribution information for which the planning is to be performed is displayed on the display device 204.

Since the target attribution information with the associated elements of the 3D model is highlighted, the information can be easily distinguished from other attribution information.

FIG. 64 is a diagram showing an example 3D model 6404 for which the measurement planning is currently being performed.

When the target attribution information is highlighted, at the same time, the process for displaying the attribution information fixed position is performed. For this process, important information, such as a design value, a tolerance and an identifier, which is included in the target attribution information, the rank of the currently target attribution information in GroupList, and the total number of attribution information sets in GroupList are displayed at fixed positions on the display device 204.

The operator determines which method to use for measuring attribution information by referring to the highlighted attribution information and the attribution information fixed position display.

After this determination, a group that matches the measurement method is interactively selected by using the button, "designation of a group for an operation plan", on the menu 6401 in FIG. 64.

Further, when, as a result of the determination, a measurement point is required for the attribution information for which the planning is to be performed, the process at step S383 is called by selecting the "input measuring point" button on the menu 6401 in FIG. 64.

When the operator selects a group for an operation plan, and then selects the "next attribution" button by using the input device 205, such as a mouse, the next attribution information for an operation plan can be designated.

When the "next attribution" button is selected by the operator, the attribution information ranked higher rank in GroupList than the current attribution information is regarded as attribution information for an operation plan.

During the measurement plan, the operator mainly manipulates the "next attribution" button. When it is ascertained at step S6502 that the next attribution information for an operation plan is present, the "next attribution" button on the menu 6401 in FIG. 64 is always in the active state. Therefore, the operator can easily identify the presence of attribution information for which the planning should be performed, and can be prevented from forgetting the measurement planning.

When the operator selects the "next attribution" button and designates for the operation plan the next attribution information, at the same time, the process for completing the operation planning for the current attribution information is performed.

The group name designated at step S6501 is entered in "planning group name", which is one of the attribution values for the attribution information shown in FIG. 6, and is stored on the internal storage medium 201 or in the external storage device 202.

The attribution information is entered in GroupList at a location corresponding the planning group name, and is stored on the internal storage medium 201 or in the external storage device 202.

The display color for the present target attribution information is changed to a "processed" color indicating that the information has been processed.

Since the display color for the attribution information is changed to the "processed" color, the operator can easily identify the attribution information for which the planning has been completed.

Further, since the rank of the current target attribution information in GroupList and the total number of attribution information sets in GroupList are presented while the attribution information fixed positions are displayed, the operator can readily identify the current state of the planning operation.

When the planning group name is already set in the attribution value "planning group name" in the planning completed processing, it indicates that the operation planning has been completed for the target attribution information.

In this case, the processed information handling process is performed. The pertinent attribution information that corresponds to the planning group name that has already been stored is deleted from GroupList, and the attribution value "planning group name" is deleted. The planning completed process is performed after the processed information handling process.

Since the processed information handling process is performed, one set of attribution information can belong to one planning group.

Through this processing, one method for measuring the attribution information is established, and a measurement for which a plurality of methods is erroneously used can be prevented.

When the "previous attribution" button is selected by the operator, the attribution information ranked higher in GroupList than the current attribution information is regarded as target attribution information for the operation planning.

In this case, the planning completed process is not performed.

To improve operating efficiency, it is substantially important that a support system assumes the occurrence of an artificial error, such as "a wrong planning group has been designated" or "a measurement point to be designated has been missed". In this case, the preceding operating state can be easily recovered by selecting the "previous attribution" button on the menu 6402.

Since the recovery process accompanied by an artificial error is simplified even when there is a large amount of attribution information, psychologically, the operator can readily conduct the measurement, and the operating efficiency can be improved.

When there is no more succeeding attribution information for the operation planning in the current target attribution information group, the "next attribution" button is set inactive.

In this case, when another attribution information group is designated to continue the measurement planning process, the "continue" button on the menu 6401 in FIG. 64 is designated.

Further, when the measurement planning is to be ended or interrupted for the current attribution information group, the "end" button on the menu 6401 in FIG. 64 is designated.

When at step S6503 the "previous attribution" button and the "next attribution" button are designated, it is ascertained at step S6504 that the measurement planning for the currently selected attribution information group has been continued, and program control returns to step S6502.

When the "continue" button is designated at step S6503, it is ascertained that the measurement planning for the currently selected attribution information group is to be terminated, and that the measurement planning is to be continued by selecting another attribution information group. Thus, program control is shifted to step S6505.

When the "end" button is selected at step S6503, it is ascertained that the measurement planning process is to be terminated, and program control is shifted to step S6506.

At step S6505, the planning completed process is performed for the current target attribution information, and thereafter, the part and the attribution information group that are currently designated are released, and a new part and a new attribution information group can be designated. Program control is shifted to step S6501.

At step S6506, the planning completed process for the current target attribution information is performed. Thereafter, the part and the attribution information that are currently designated are released, and program control exits the processing using the menu 6401 in FIG. 64.

Since a degree of freedom is provided for the measurement planning operation, the operation can be interrupted even when planning has not been performed for the attribution information of all the attribution information groups. Since this may result in the omission of measurement planning for the attribution information, the measurement planning means includes: means for providing, for a group for which the planning had not yet been performed, attribution information that does not belong to any of the groups for the operation plan; and means for displaying only a group for which the operation planning has not yet been performed.

Figure 66:
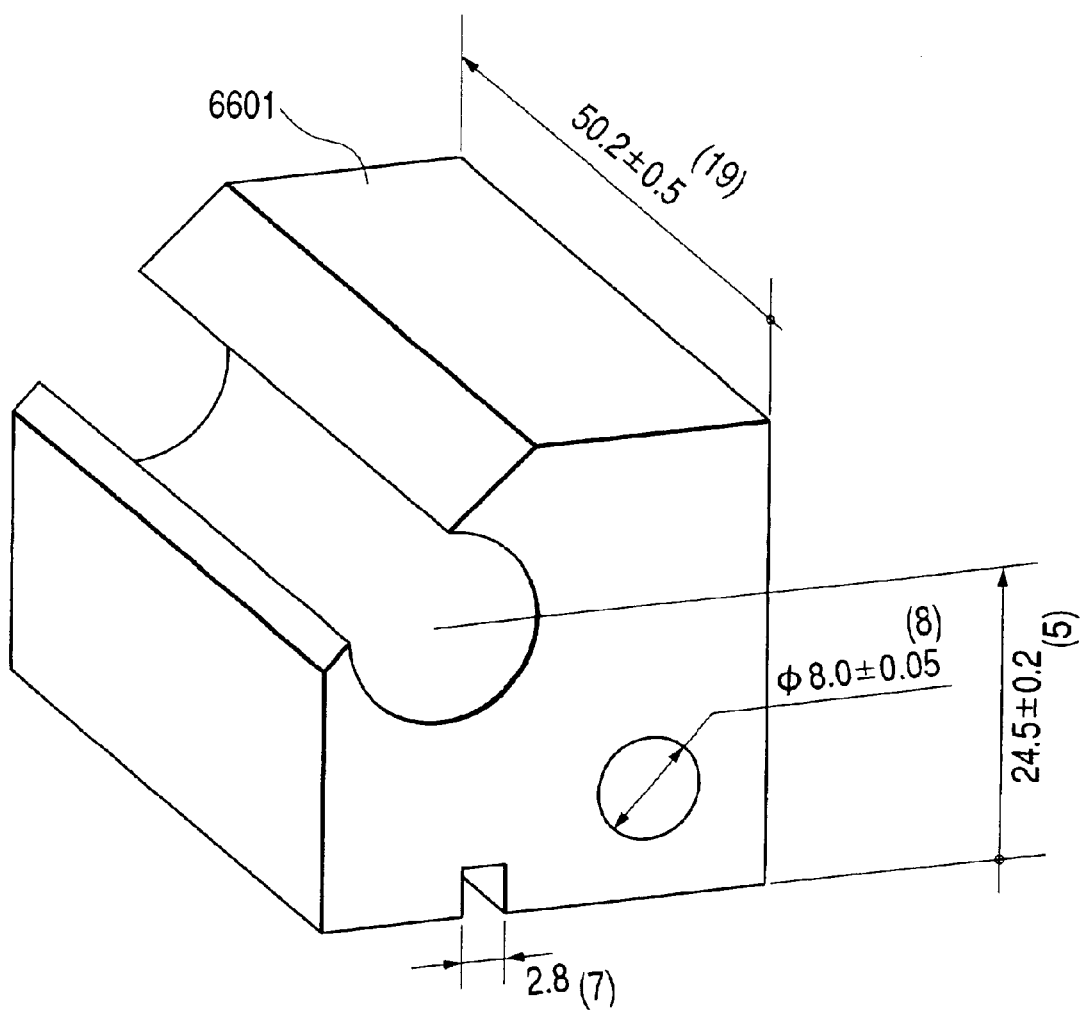
FIG. 66 is a diagram showing a 3D model for which attribution information is displayed indicating an operation plan has been missed.

FIG. 66 is a diagram showing an example display for attribution information for which the measurement planning has not yet been performed.

By using the means for displaying only a group for which the measurement planning has not yet been performed, the operator can easily identify attribution information that has been missed for the measurement planning. Further, by using the means for providing, for a group for which the planning has not yet been performed, the attribution information that does not belong to a group for the operation plan, the operator can perform re-planning for only the attribution information that has been missed for planning. With these means, the forgetting of planning can be prevented.

At step S383 a measurement point is selected for the attribution information.

As the measurement point, a point that the operator uses as a measurement index can be designated in advance on the CAD model relative to attribution information, such as a dimension. And a measurement path program for an automatic measurement instrument, such as a CMM, can be prepared by referring to the information for the measurement point.

The input device 205, such as a mouse, is used to designate the measurement point on the 3D model displayed on the display device 204.

However, since the position accuracy for the input of the measurement point can not be performed satisfactorily when using the input device 205, such as a mouse, the input device 205 is not appropriate for the designation of an important portion for which accurate positioning is required.

Further, when the geometry of the part must be changed based on the measurement results, an accurate coordinate position may be required for the instruction of the portion to be changed. In this case also the designation of the measurement point using the mouse is inappropriate.

Therefore, in this invention, coordinates can also be employed to designate a measurement point.

Figure 67:
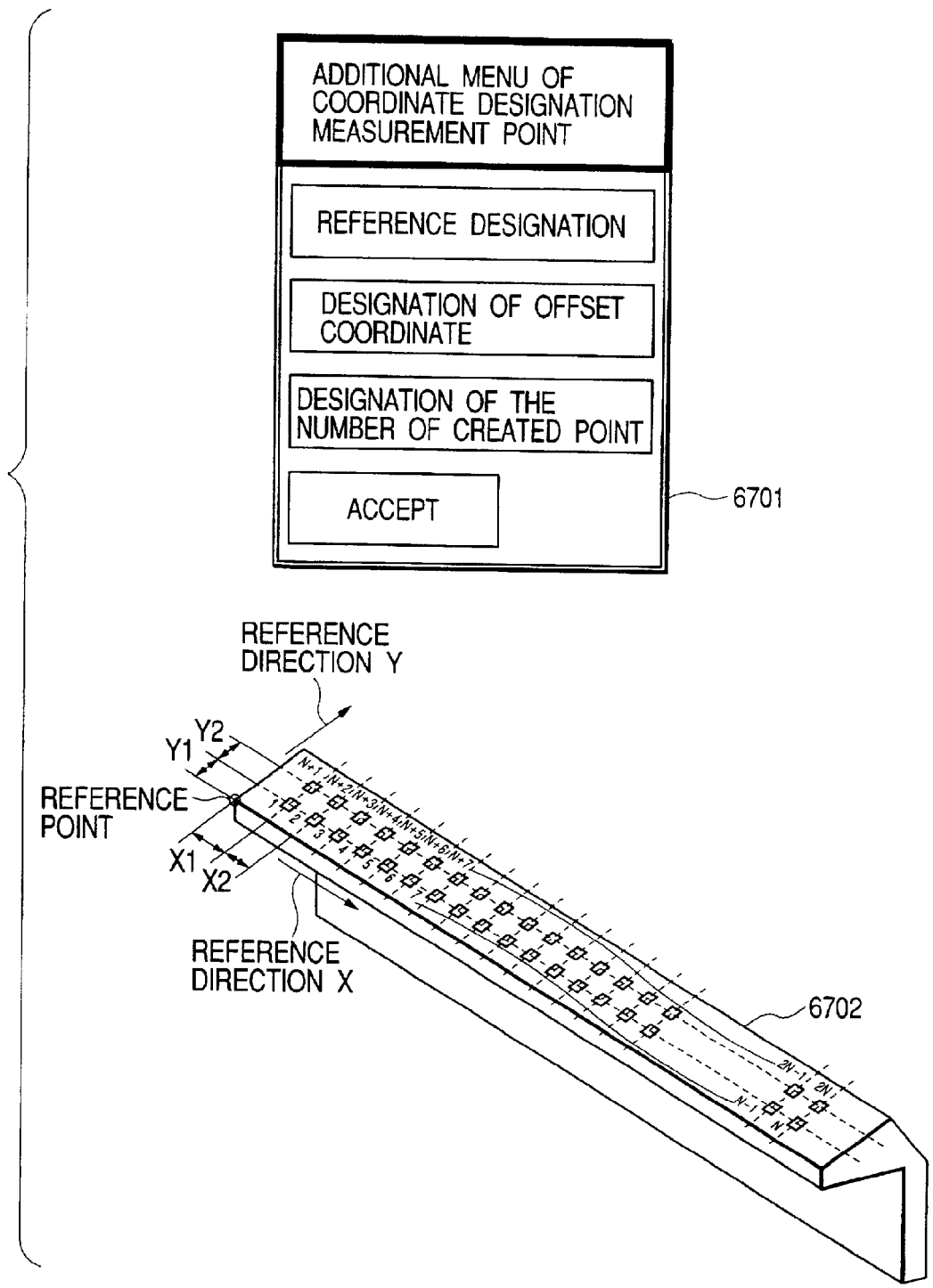
FIG. 67 is a diagram showing an example where measurement points are added by designating coordinates.

FIG. 67 is a diagram showing an example wherein the designation of a measurement point is performed using coordinates. The designation of a measurement point using coordinates is performed as follows.

A reference point and reference directions X and Y are designated on the element face of the 3D model that is correlated with the attribution information to which the measurement points are added. An offset value X1 in the direction X from the reference point and an offset value Y1 in the direction Y are designated, and an interval value X2 in the X direction from the measurement point and an interval value Y2 in the Y direction are designated. Then, the number of measurement points allocated in the X direction and the number of measurement points in the Y direction are designated.

These designations are interactively performed by using a menu 6701 in FIG. 67 that is displayed on the display device 204. Through this processing, one or more accurately positioned measurement points can be added.

When accurate positioning of the measurement points is not required, or when multiple (several tens to several hundreds) measurement points must be positioned, only a small number of steps need be performed by using the means of the invention to designate the measurement points.

The measurement points that are designated are stored on the internal storage medium 201 or in the external storage device 202 as the attribution values for the attribution information.

FIG. 40 is a diagram showing an example wherein the measurement points are displayed in correlation with the attribution information and the 3D model displayed on the display device 204.

Measurement points 401 and point IDs 402 are examples displayed on the display device 204, while identifiers unique to individual attribution information are added as point IDs to the measurement points 401. As is shown in FIG. 40, the point IDs 402 are displayed near the measurement points 401 displayed on the display device 204.

Since the processing following step S384 in FIG. 38 has been described above, no further explanation for this processing will be given.

(Identifier)

A detailed explanation will now be given for the process at step S151 for adding an identifier to attribution information that has been added to the 3D model.

In this invention, an identifier can be added to the attribution information correlated with the geometry model, and can be stored on the internal storage medium 201.

Further, in the invention, the added identifiers can be stored on the internal storage medium 201 as an identifier list on which all the histories are correlated with the geometry model.

Furthermore, in this invention, in accordance with an instruction from the operator, the added identifiers and identifier list can be stored together with the attribution information in the external storage device 202 (step S307).

When the attribution information to which the identifier is added is deleted, the identifier is also deleted from the internal storage medium 201; however, the history on the identifier list is maintained.

As a result, the identifier used in the past can be prevented from being used repetitively, and the confusion in the post-process caused by repetitively using the identifier can be avoided.

Figure 45:
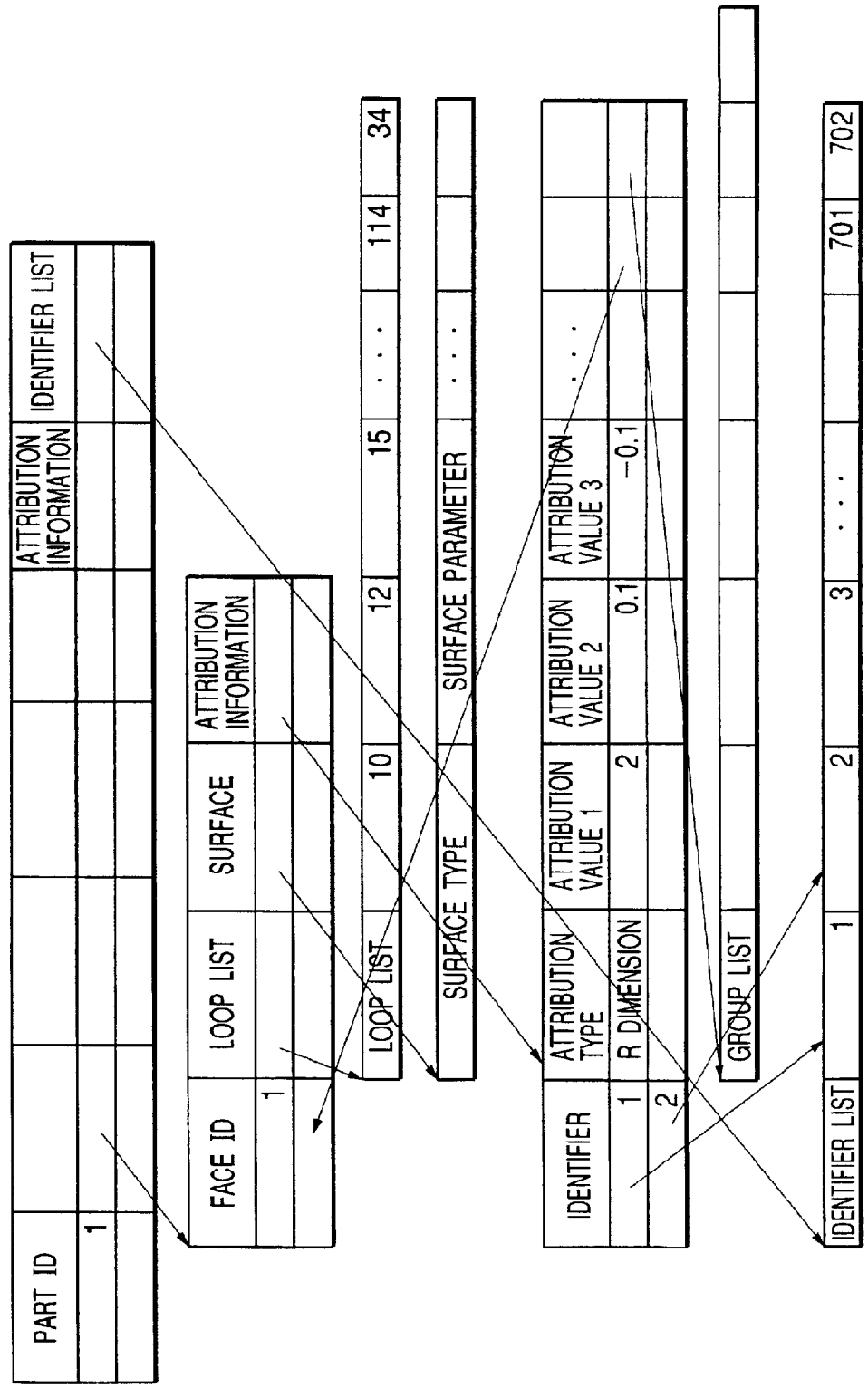
FIG. 45 is a conceptual diagram showing a method for storing an identifier and identifier list information in the internal storage medium 201.

FIG. 45 is a conceptual diagram showing a method for storing an identifier and an identifier list in a storage medium according to the present invention.

In the invention, the identifier addition function is implemented by a method for automatically adding an identifier at the same time as the attribution information is added; a method for collectively adding an identifier for each geometry model or for each attribution group; and a method for adding an identifier to each set of attribution information.

The identifier display function of the invention can display, near the area for the attribution information, the identifier that is added in the identifier addition process. At this time, the display color, the display form and the display size of an identifier can be designated.

Figure 46:
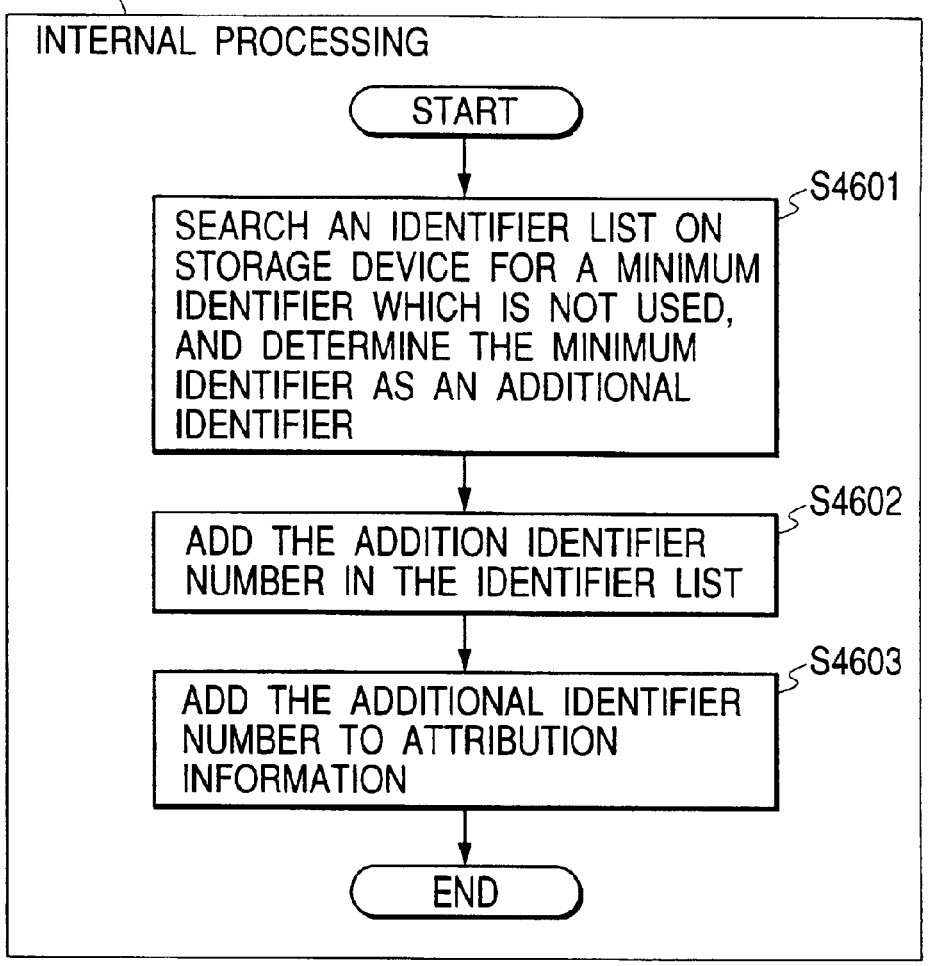
FIG. 46 is a flowchart for the automatic identifier addition processing performed during the attribution information addition processing.

FIG. 46 is a flowchart showing the attribution addition processing at step S303 for automatically adding an identifier. When the attribution addition process S303 is performed, at the same time, the following process is also performed.

At step S4601, the internal storage medium 201 is examined to find the identifier list correlated with the geometry model to which the attribution is to be added, and the smallest unused identifier number is selected.

At step S4602, the selected identifier number is added to the identifier list, and is stored on the internal storage medium 201.

At step S4603, the identifier is added to the attribution information and is stored on the internal storage medium 201.

Figure 47:
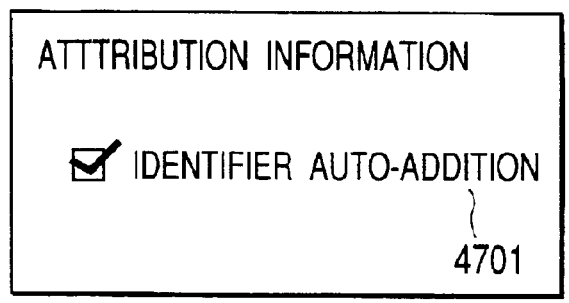
FIG. 47 is a diagram showing an automatic identifier addition switching program menu for the attribution information addition processing.

When the operator uses the input device 205 to select from the menu in FIG. 47 the automatic identifier addition entry 4701, it is possible to change the setting or non-setting of the method for automatically adding an identifier at the time the attribution information is added.

Figure 48:
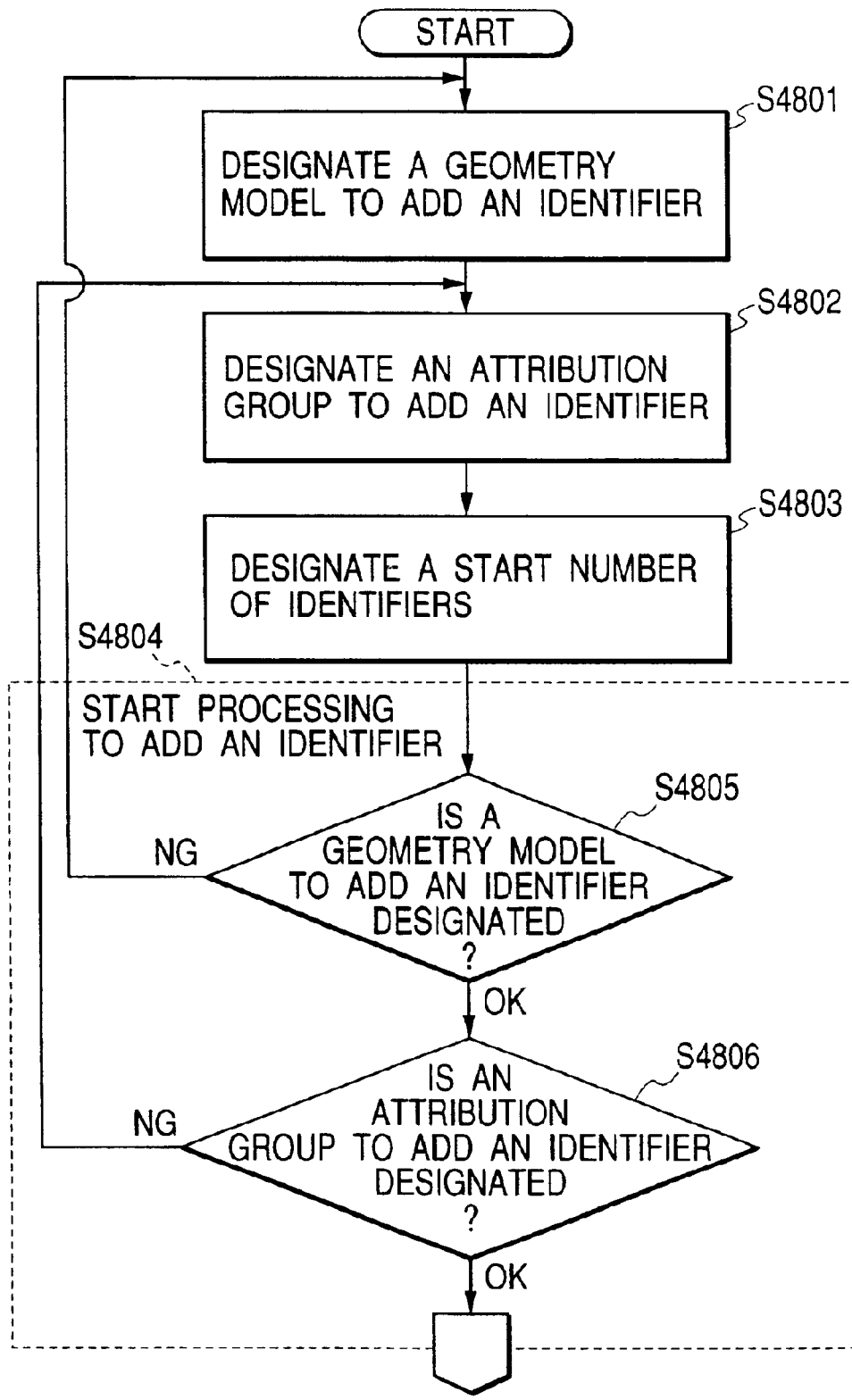
FIG. 48 is a flowchart for a method for adding an identifier to each geometry model or each attribution group.
Figure 49:
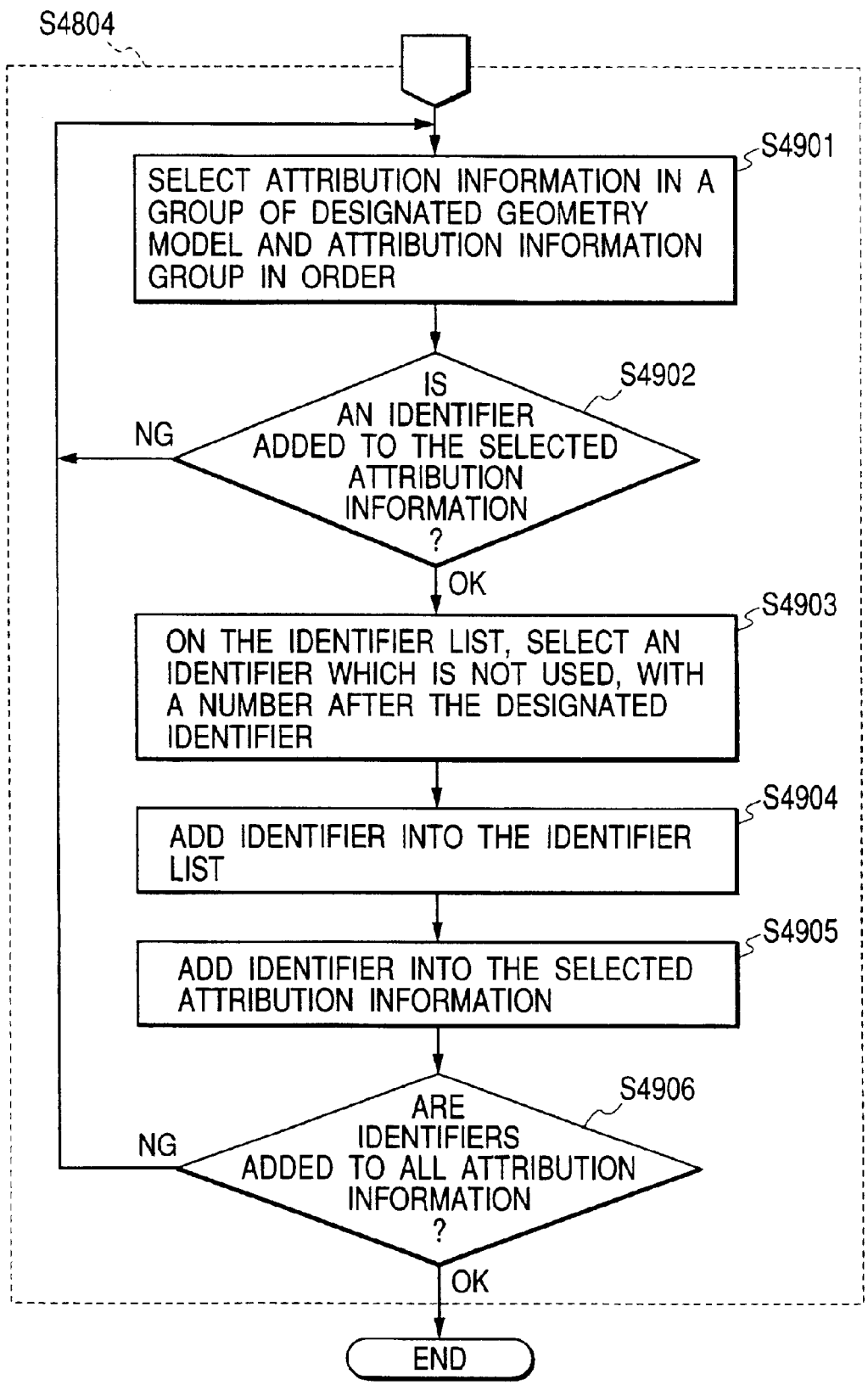
FIG. 49 is a flowchart for the method used for adding an identifier to each geometry model or each attribution group.

FIGS. 48 and 49 are flowcharts showing the processing for adding an identifier for each geometry model or each attribution group.

Figure 50:
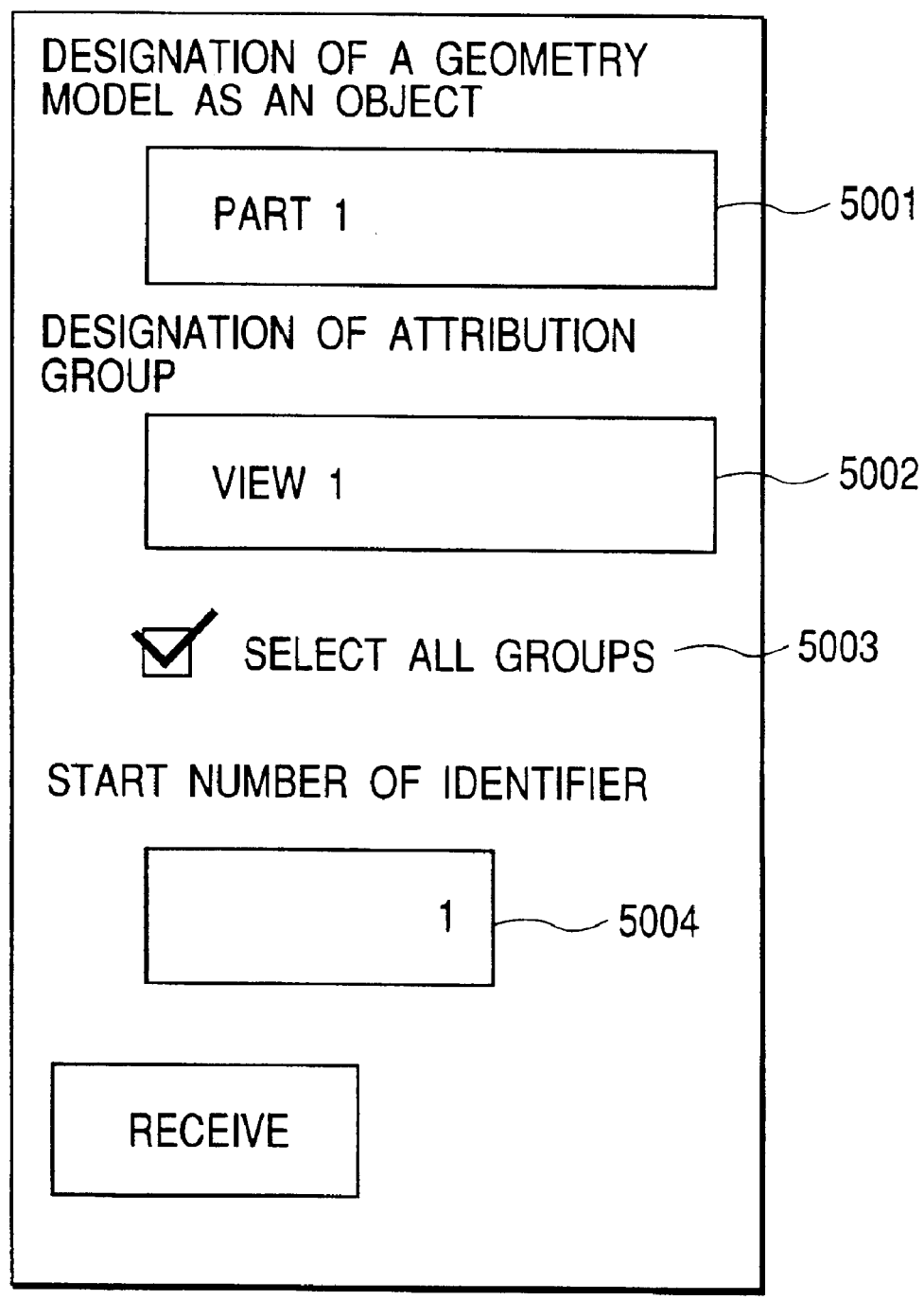
FIG. 50 is a diagram showing a program menu for the method used for adding an identifier to each geometry model or each attribution group.

FIG. 50 is a diagram showing an operating menu for the method for adding an identifier for each geometry model or each attribution group, and each process on the menu is performed when an operator interactively issues an instruction using the input device 205.

At step S4801, a geometry model to which the identifier is to be added can be selected.

Figure 51:
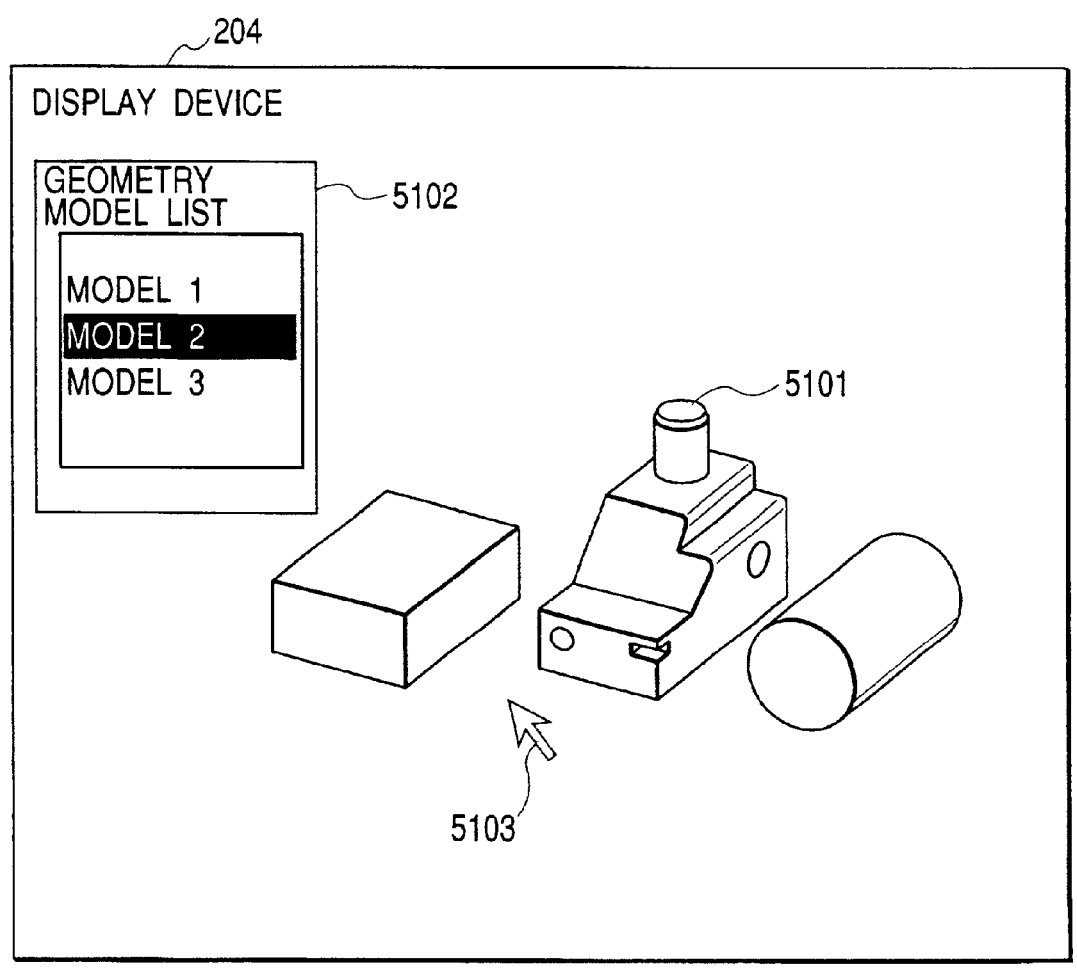
FIG. 51 is a diagram showing a geometry model and a geometry model list displayed on a display device 204.

FIG. 51 is a diagram showing the process performed at step S4801 to select a geometry model.

While confirming the geometry displayed on the display device 204, an operator can select an arbitrary geometry model by manipulating the input device 205. An instruction pointer 5103 is provided for the input device 205.

To select a geometry model using the input device 205, either a geometry model 5101 displayed on the display device 2045 is designated using the instruction pointer 5103, or a specific geometry model is selected from a geometry model list 5102 also displayed on the display device 204, or the name of a geometry model can be entered directly.

After the geometry model has been selected, at step S4802 an attribution group to which the identifier is to be added is selected from among attribution groups correlated with the selected geometry model.

It should be noted that the process at step S4802 is initiated by using an operation menu 5002, which facilitates the selection of the attribution group.

Figure 52:
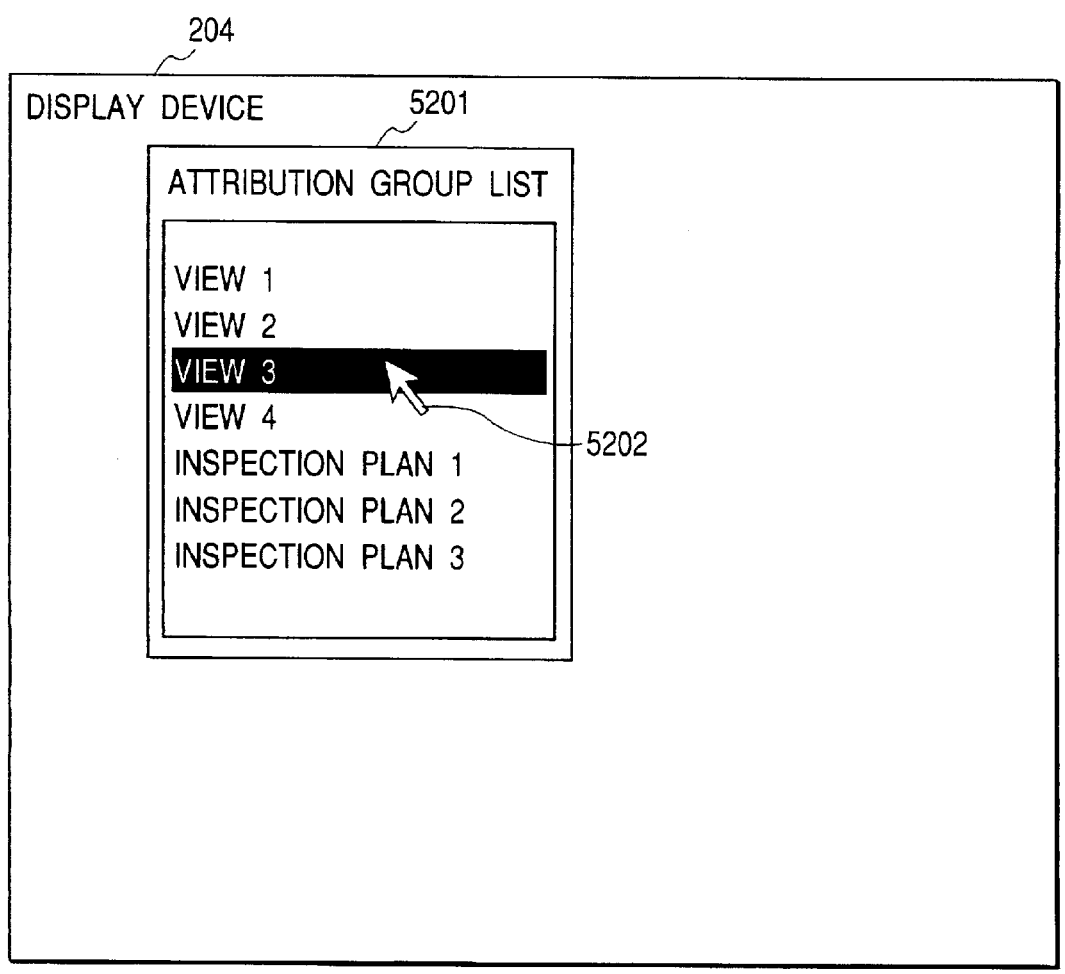
FIG. 52 is a diagram showing an attribution group list displayed on the display device 204.

FIG. 52 is a diagram showing an attribution group selection method according to the invention.

While confirming an attribution group list 5201 displayed on the display device 204, an operator can select an arbitrary attribution group by using a pointer 5202 provided for the input device 205.

Further, when the "select all groups" switch 5003 on the program menu in FIG. 50 is selected, "all the groups" can be selected instead of a specific dimension group.

The process at step S4803 is activated by using an operation menu 5004, and the designation of a start number for an identifier.

When at step S4801 a target geometry model is designated for processing, the unused, minimum identifier is selected from the identifier list correlated with this target geometry model, and is designated as the initial setup for step S4803. The start number of the identifier can be designated by using the input device 205 to enter a numerical value.

Upon receiving an instruction selected by an operator from the operation menu 5004, the identifier addition process S4804 is initiated.

First, at step S4805, a check is performed to determine whether a geometry model has been designated to which the identifier should be added.

When a target geometry model has not been designated, program control is returned to step S4801.

When, however, a target geometry model has been designated at step S4805, the process at step S4806 is initiated to determine whether a target attribution information group has been designated to which an identifier is to be added.

When the target attribution information has not been designated, program control is shifted to step S4802.

The process at step S4901 is initiated, however, if a target attribution group has been designated at step S4806.

At step S4901, in the order whereat the data is input, one attribution information set is selected from among those included in the selected attribution information group for the selected geometry model.

At step S4902, a check is performed to determine whether an identifier has been added to the selected attribution information. When an identifier has been added to the selected attribution information, program control returns to step S4901 and the next attribution information is selected. When an identifier has not been added to the selected attribution information, program control is shifted to step S4903.

At step S4903, an unused identifier located following the start number of the identifier designated at step S4803 is selected from the identifier list.

At step S4904, the identifier is added to the selected attribution information and is stored on the internal storage medium 201.

At step S4905, the identifier is added to the identifier list, and is stored on the internal storage medium 201.

At step S4906, a check is performed to determine whether the identifier has been added to all the attribution information in the selected attribution group for the selected geometry model. When it is determined that not all attribution information has been processed, program control returns to step S4901 and the above processing is repeated. Whereas when it is determined the identifier has been added to all the attribution information, the processing is terminated.

Figure 53:
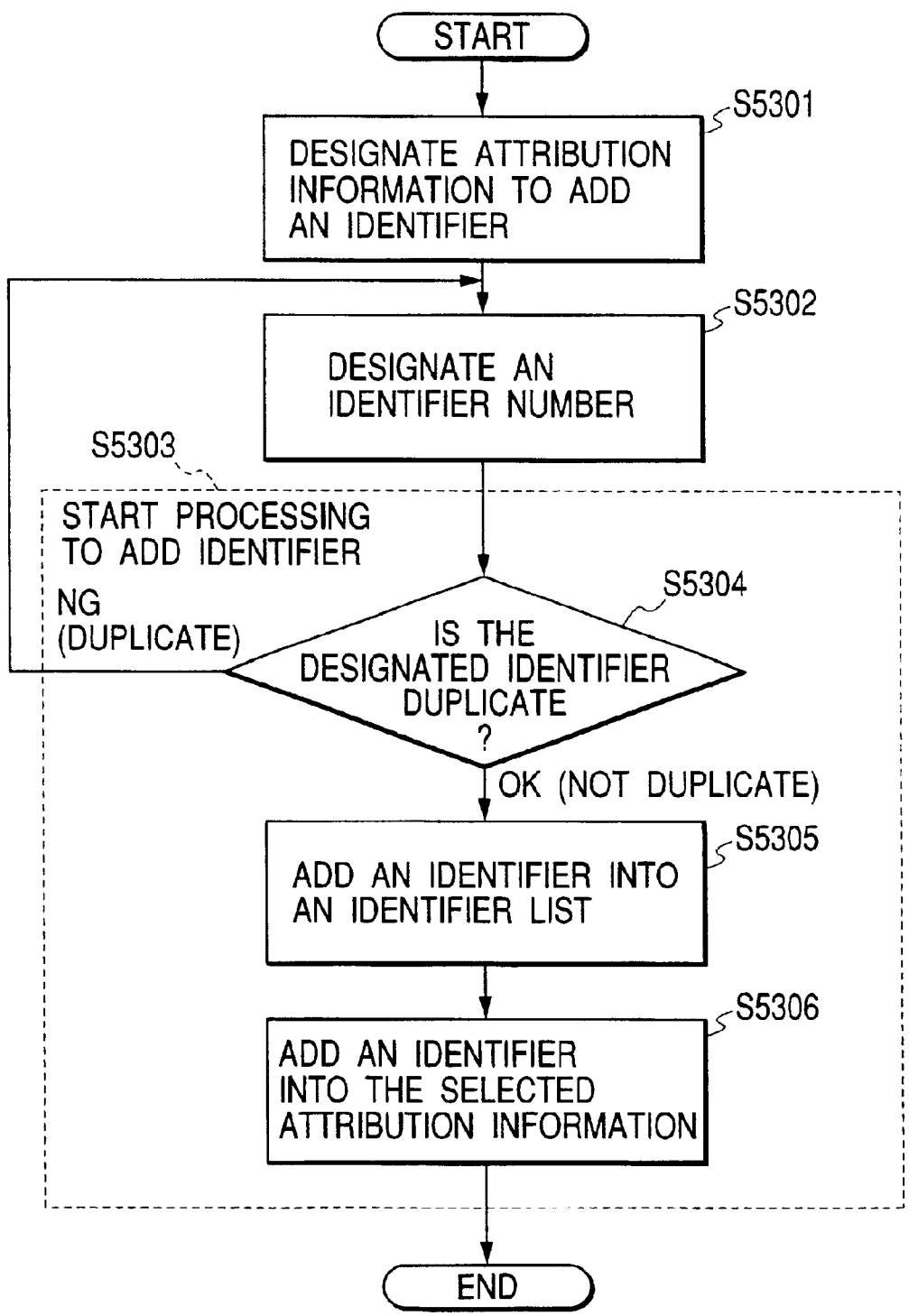
FIG. 53 is a flowchart for a method used for adding an identifier for each set of attribution information.

FIG. 53 is a flowchart showing the processing performed to add an identifier for each set of attribution information.

Figure 54:
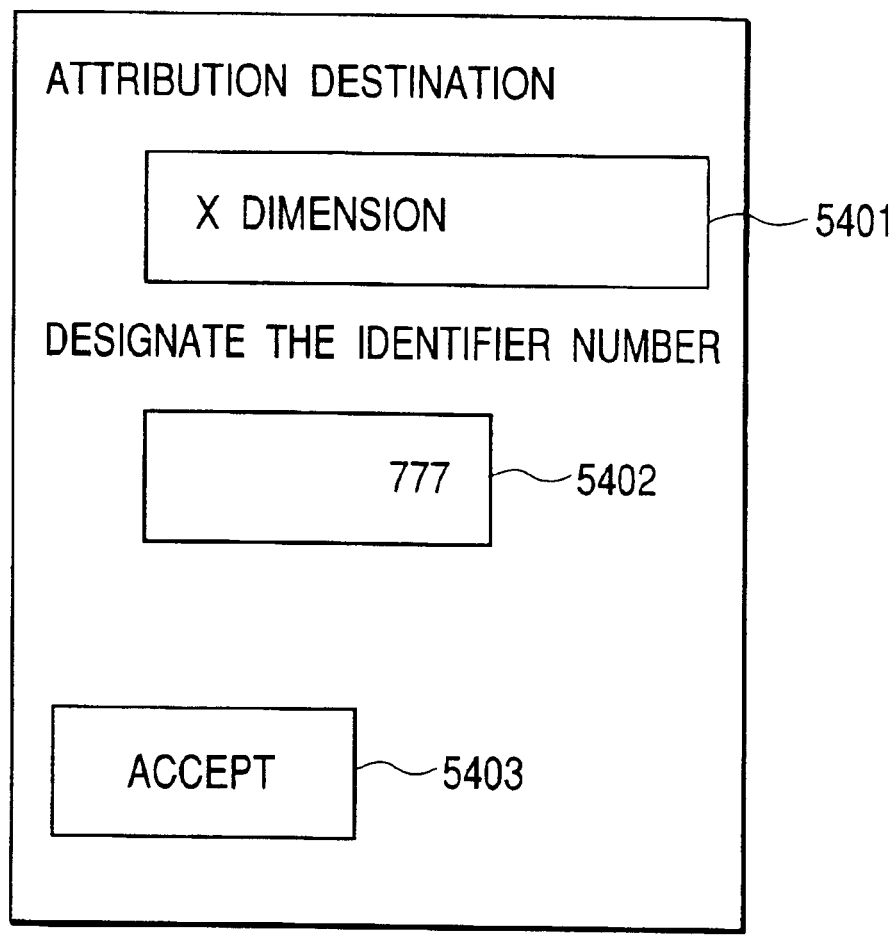
FIG. 54 is a diagram showing a program menu for the method for adding an identifier for each set of attribution information.

FIG. 54 is a diagram showing the operation menu used for the processing for adding an identifier for each set of attribution information. The individual processes are performed when an operator interactively issues an instruction using the input device 205.

At step S5301, target attribution information to which an identifier has been added can be selected. During this process, specific attribution information displayed on the display device 204 is selected using the input device 205.

At step S5302, the identifier number to be added for the selected attribution information is designated.

The identifier addition process S5303 is initiated when the operator uses the input device 205 to select an "accept" button 5403.

First, at step S5304, the presence on the identifier list for the internal storage medium 01 of the identifier number designated at step S5302 is confirmed. When the identifier numbers overlap, program control returns to step S5302. But when the identifier numbers do not overlap, program control advances to step S5305.

At step S5305, the selected identifier is added to the identifier list.

At step S5306, the selected identifier is added to the selected attribution information and the processing is thereafter terminated.

Figure 55:
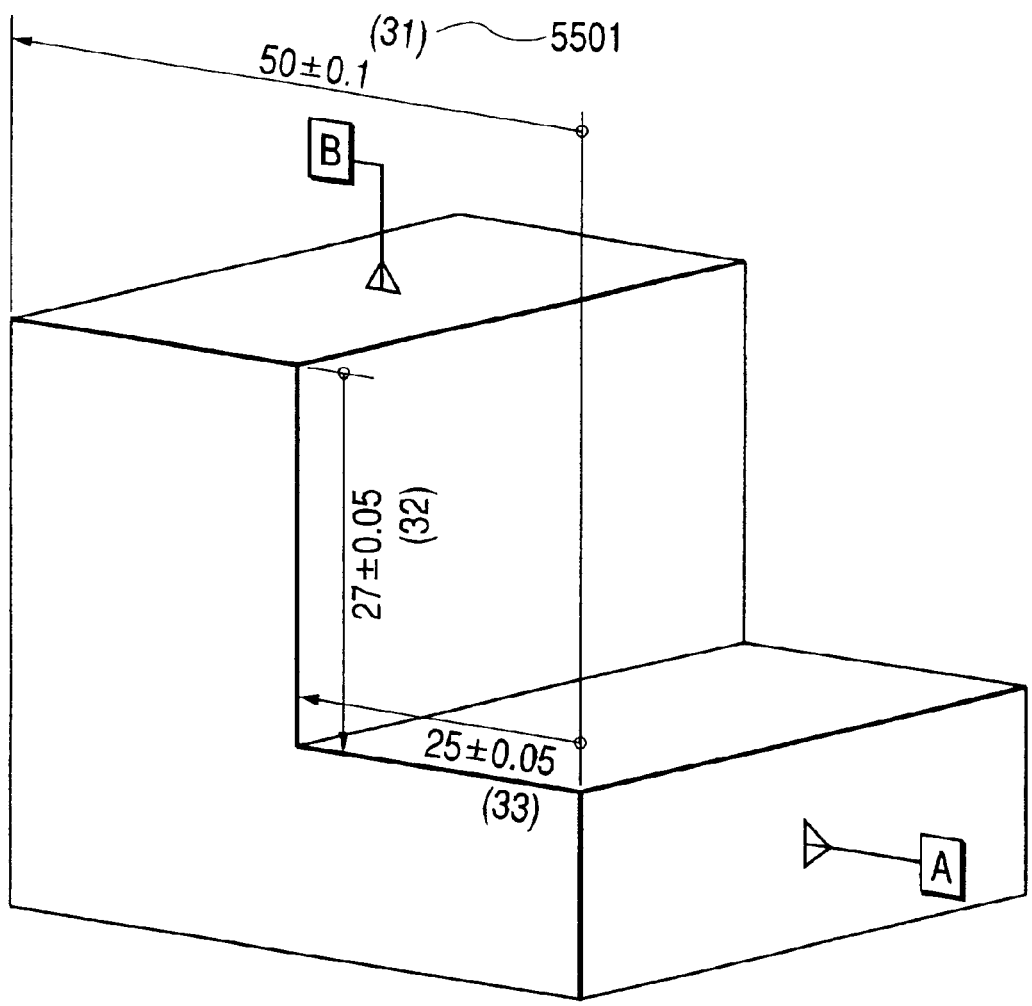
FIG. 55 is a diagram showing attribution information to which an identifier has been added.
Figure 56:
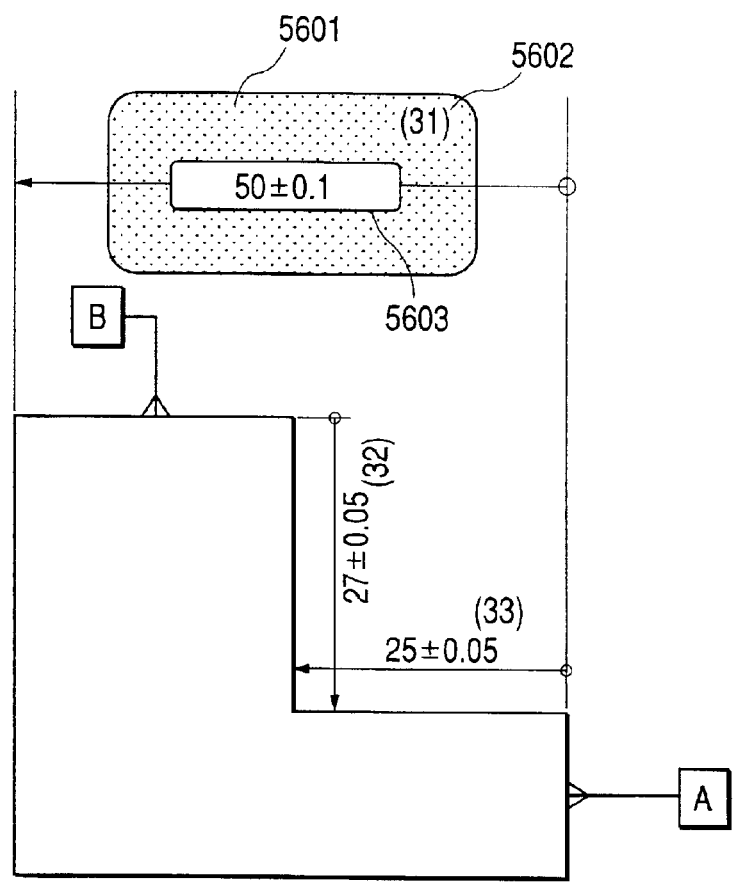
FIG. 56 is a diagram showing an area near attribution information for which an identifier can be allocated.

FIGS. 55 and 56 are diagrams showing example states in which the identifier added to the attribution information is displayed.

An identifier 5601 is added to and located in a neighboring area adjacent to attribution information 5602. Thus, the identifier for each attribution information set can be easily distinguished.

The neighboring area, adjacent to the attribution information 5602, in which the identifier 5601 is located is one that does not overlap attribution information 5603 and that maintains a predetermined distance therefrom.

The identifier 5601 can be located within the neighboring area in accordance with an operator's instruction.

The identifier 5601 can be displayed using a frame or a parenthesis.

Figure 57:
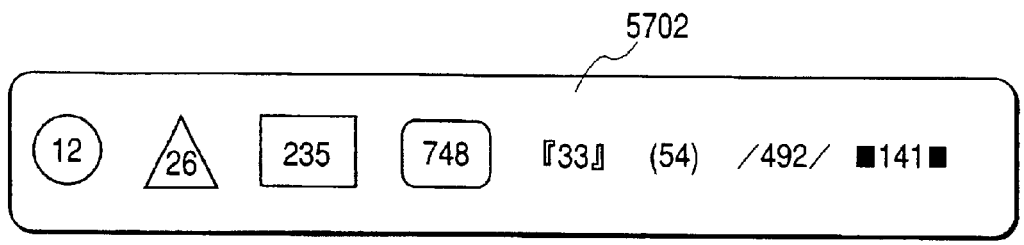
FIG. 57 is a diagram showing an identifier display form.

FIG. 57 is a diagram showing example enclosures used for identifiers.

Since the identifier number can be easily distinguished from another attribution or identifier, it can more easily be identified.

Figure 58:
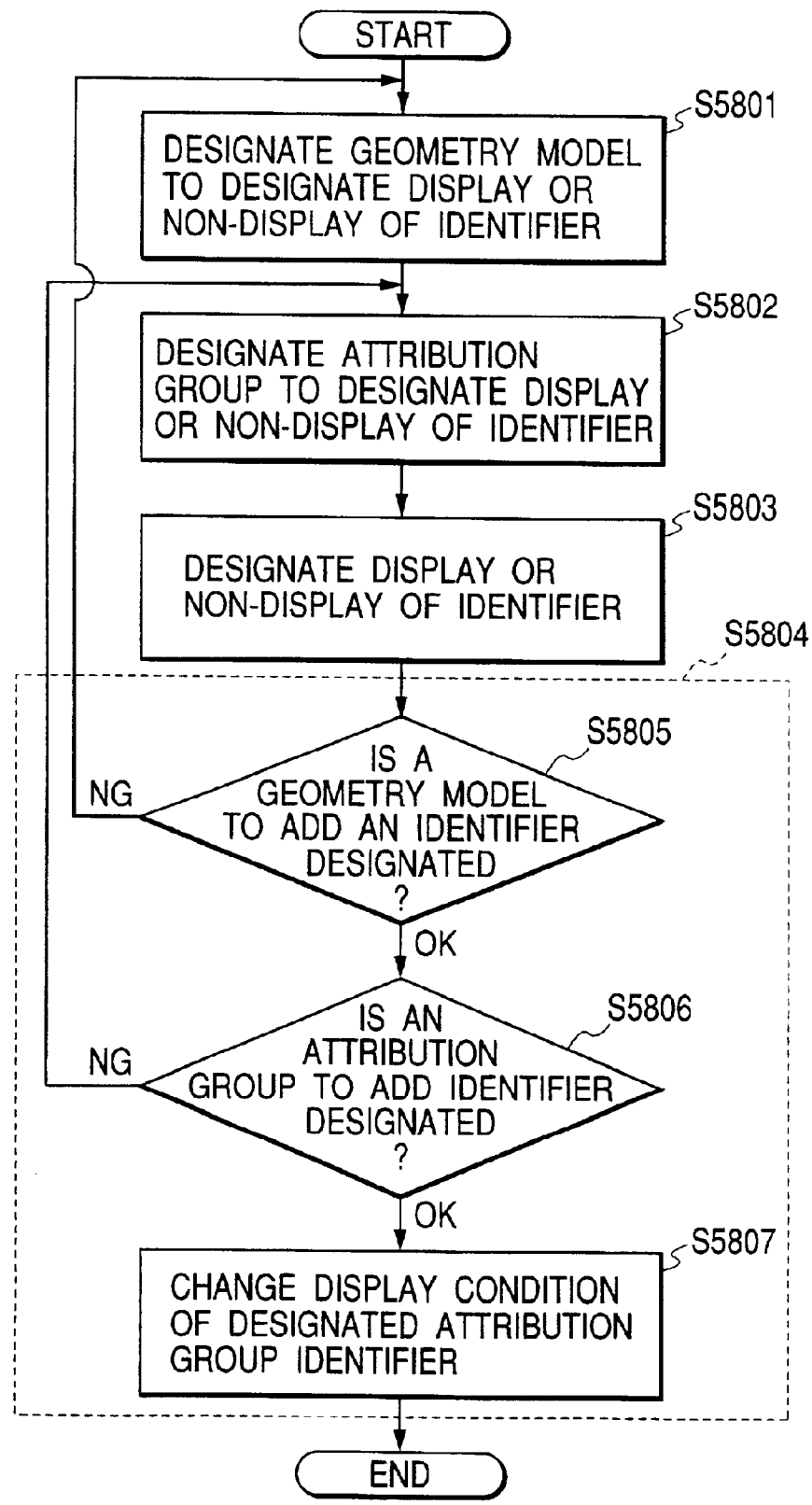
FIG. 58 is a flowchart for a method for setting and displaying an identifier for each geometry model or each attribution group.

FIG. 58 is a flowchart showing the processing performed for setting an identifier for each geometry model or each attribution group.

Figure 59:
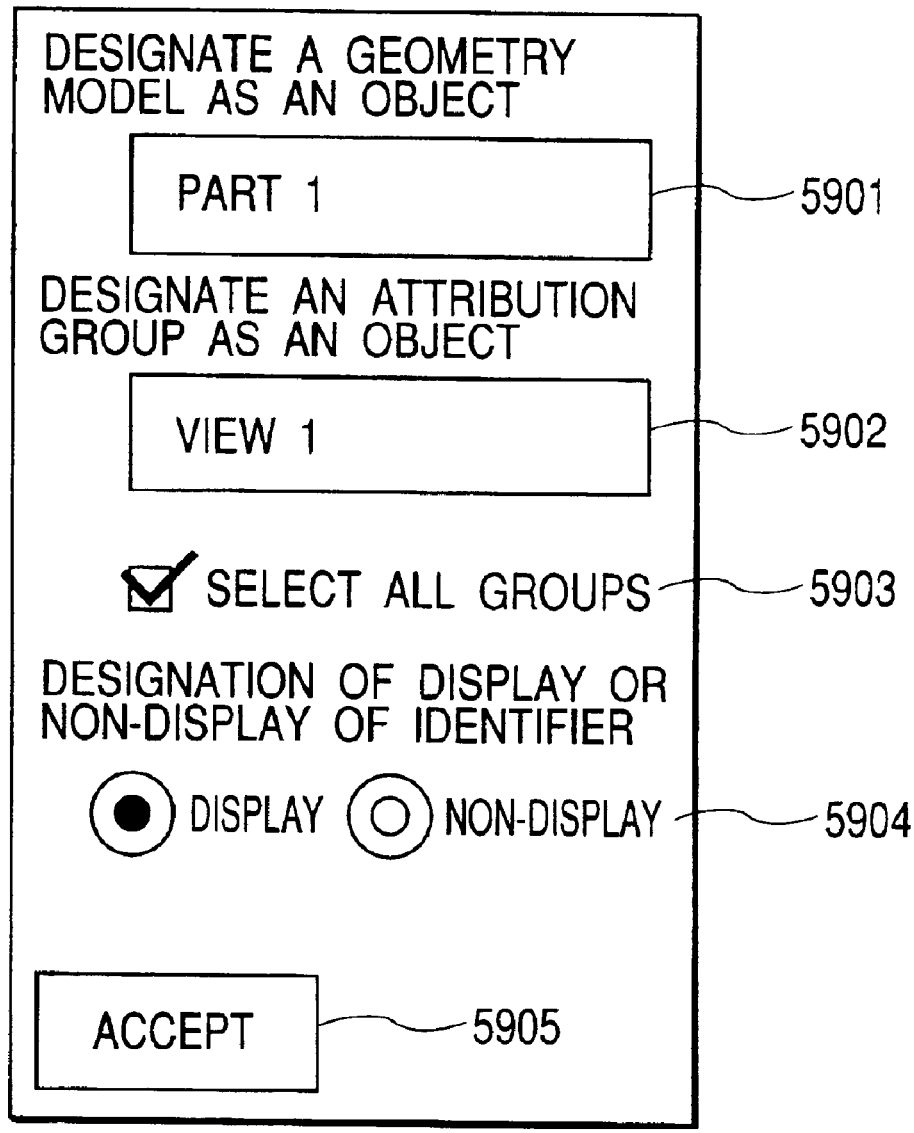
FIG. 59 is a diagram showing a program menu for the method for setting and displaying an identifier for each geometry model or each attribution group.

FIG. 59 is a diagram showing a program menu for setting an identifier for each geometry model or each attribution group.

Through this processing, the display/non-display of an identifier can be collectively changed for each geometry model or each attribution group.

When the display of an identifier for attribution information is not required, no identifier is displayed, so that the attribution information on the display device 204 can be easily seen.

(Reflection of Design Change)

Figure 60:
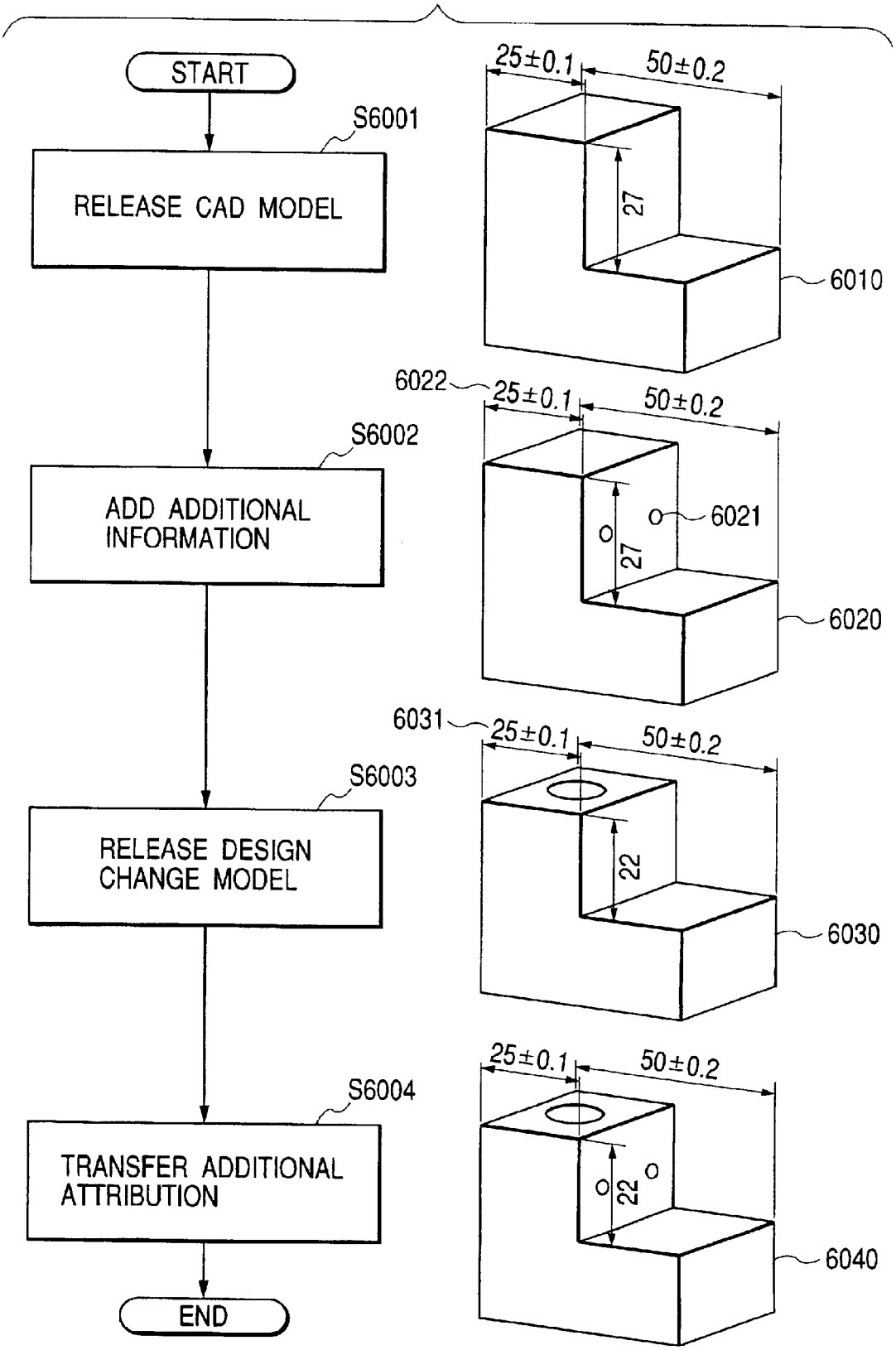
FIG. 60 is a diagram showing the transmission of data in a downstream section when a design is changed.

FIG. 60 is a flowchart for explaining the processing performed at the downstream department when a design is changed.

At step S6001 in FIG. 60, a CAD model 6010 is released from the design department to the downstream department.

At step S6002, an additional information model 6020 is created by adding additional information, such as a measurement point 6021, to the CAD model 6010.

The measurement points shown in FIG. 60 are added to the CAD model 6010 as additional information for a dimension 6022.

At step S6003, a design change model 6030 is newly released by the design department.

At step S6004, the design change model 6030 is compared with the additional information model 6002. Thereafter, the additional information is reflected in the design change model 6030, producing a design change and generating the additional information model 6040.

Figure 61:
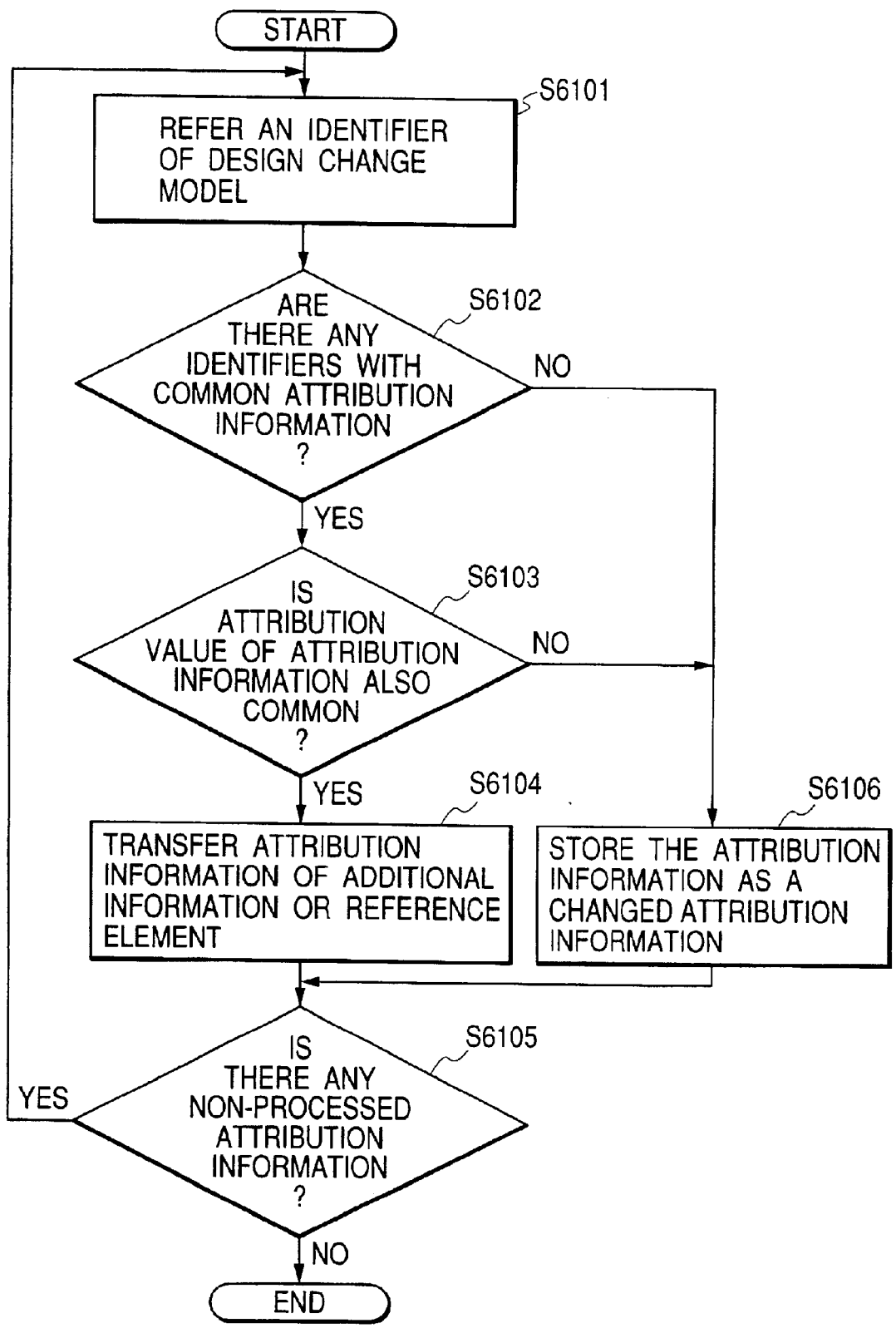
FIG. 61 is a detailed diagram for explaining the processing for comparing attribution information and for transferring additional information.

FIG. 61 is a detailed flowchart for explaining the process at step S6004.

At step S1601 in FIG. 61, the identifier for the attribution information of the design change model 6030 is referred to.

At step S6102, the attribution information sets of the additional information model 6020 are examined to find attribution information having the same identifier.

When attribution information having the same identifier is found at step S6102, at step S6103 the attribution values, other than the identifier of the pertinent attribution information, are compared.

The process at step S6103 will now be described by using the dimensional tolerance information as example attribution information.

The dimensional tolerance information, as shown in FIG. 6, includes an identifier, a nominal value, a tolerance value, and a pointer to dimensional reference elements, such as Face, Edge and Vertex.

Dimensional tolerance information sets having the same identifier are compared to determine whether they have the same values for the nominal value, the tolerance value, the dimension text and the reference element.

As an example, for the dimensions 6022 and 6031 in FIG. 60, the nominal value of 25, the tolerance value of 0.1 and the reference element of the dimension are the same, i.e., all the attribution values allocated for the dimension match.

When at step S6103 all the attribution values match, at step S6104 additional information, such as a measurement point, which is added to attribution information that is unchanged, is transferred to the attribution information of the design change model 6030.

At step S6004 in FIG. 60, the measurement point 6021 for the dimension 6022 of the additional attribution model 6020 is transferred to the dimension 6031 for the design change model 6030.

When for attribution information having reference elements, such as a dimensional tolerance, all the attribution values match, other attribution information, accompanied by the reference element for the attribution information, may also be transferred.

Therefore, whether a design has been changed can be determined in accordance with a dimensional tolerance attribution. As for other attribution information, attribution information such as a process or a step that is added to an unchanged element can be efficiently transferred to the design change model.

At step S6105, a check is performed to determine whether data constituting the next attribution information to be compared is present for the design change model 6030.

When it is ascertained at step S6105 that all the attribution information for the design change model 6030 has been processed, the processing is terminated.

When at step S6102 it is determined that no duplicate identifiers are provided for attribution information, or when at step S6103 there is an attribution value that does not match, at step S6106 the attribution information is regarded as being one obtained by design change and is stored on the internal storage medium 201 or in the external storage device 202.

In the above processing, a search performed for attribution information while focusing on an identifier has been explained. However, this processing can also be performed for attribution information having no identifier.

In this case, steps S6101 and S6102 are not required, and at step S6103, a search is performed for attribution information for an additional information model for which all the attribution values match those of the attribution information included in a target design change model.

Further, the attribution information for which all the attribution values match is excluded for the succeeding search, so as to improve the efficiency of the search.

At step S6103, for a comparison of attribution values, those attribution values that are not to be compared can be designated. Assume that a dimensional tolerance attribution is employed as an example. Even when the size of characters on a dimensional label or the position whereat a dimensional label is allocated for the additional attribution model does not match that of the design change model, so long as the other attribution values match it is ascertained that the attribution information is unchanged, and that the additional information or the attribution information of an element that is referred to by the dimensional tolerance attribution should be transferred.

In this case, since the size of the dimensional label or the size of the character on the label are not compared, the efficiency of the conversion can be improved.

Figure 62:
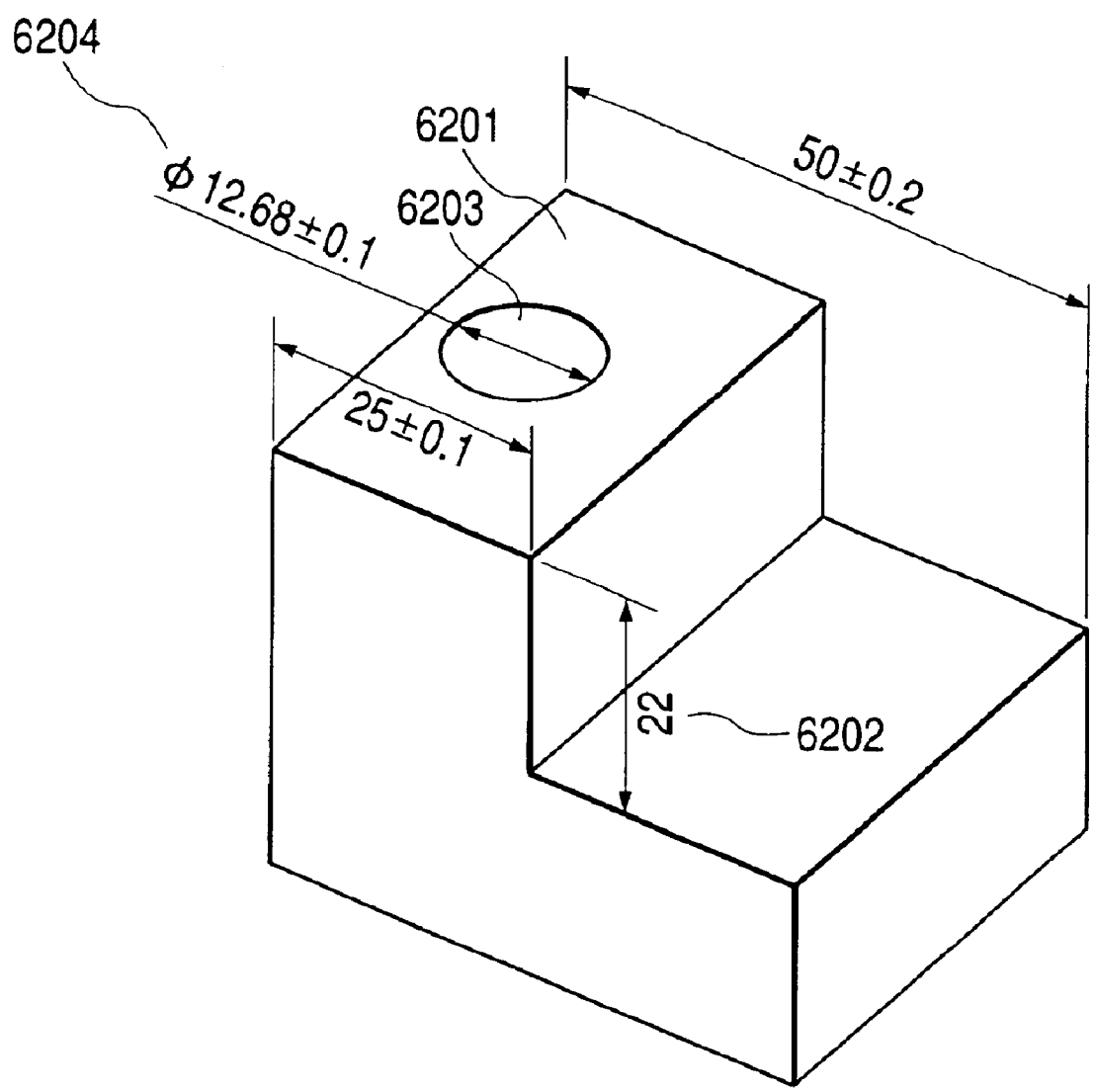
FIG. 62 is a diagram showing the state wherein changed attribution information is displayed in correlation with a CAD model.

FIG. 62 is a diagram showing an example wherein the changed attribution information is correlated with the CAD model.

A plane 6201 in FIG. 62 is referred to by a dimension 6202, the changed attribution information.

A plane 6203 in FIG. 62 is referred to by the dimension 6202 that is newly added for the additional information model 6020.

Since the element referred to by the changed dimension is highlighted and can thus be distinguished from another element, the portion for which the design has been changed can be easily identified.

In the above explanation, the present invention has been applied for the mold inspection processing using a 3D-CAD apparatus. However, the present invention is not limited to the use of a 3D-CAD apparatus, and a 2D-CAD apparatus can also be employed. When a 2D-CAD apparatus is employed, the correction operation, accompanied by the design change, can be efficiently performed.

In addition to a CAD apparatus, the present invention can be also used for an information processing apparatus for handing attribution information.

For example, additional information that has been added to a text or image data document prepared by a document creation apparatus can be transferred to a changed document.

Specifically, when during the post-process display attribution information, such as a color, is added to the image data of a document, or when the image data is not changed in a changed document, the display information, such as a color, can be transferred to the image data of the document that has been changed.

Thus, a correction operation constituting a post process accompanied by a document change can be efficiently performed.

As is described above, according to the present invention, an attribution information processing apparatus and a method therefor comprise:

attribution information comparison means for comparing attribution information for two sets of CAD data, i.e., old data and new data; and additional information transfer means for, when attribution information is not changed, transferring to new data additional information that is added to the attribution information for the old data, wherein the attribution information comparison means includes
   dimensional information comparison means for comparing dimensional information for each dimension of the two sets of CAD data, and wherein the additional information transfer means includes
   additional dimension information transfer means for transferring additional dimension information that is added to the dimension information for the CAD model,
   additional element information transfer means for transferring additional element information that is added to the elements of the CAD model that are referred to by the dimension information for the CAD model, and
   measurement point transfer means for transferring a measurement point. Even when the original data is changed, e.g., when the design is changed, information that is added later can be efficiently and accurately reflected in the changed data.

Especially during product development, a design is frequently changed while parallel processing is performed, and the attribution data that is added downstream can be reflected in the design change model without the attribution data having to be re-entered. As a result, concurrent development production can be smoothly performed.

Further, the attribution information processing apparatus comprises:

attribution information comparison means for comparing attribution information for two sets of CAD data, i.e., old data and new data, including dimension information comparison means for comparing dimension information for the two CAD data;

change attribution information storage means for, when attribution information comparison means determines that the attribution information has been changed, storing the changed attribution information;

changed attribution information teaching means for displaying the changed attribution information in correlation with the data;

changed dimension teaching means for so displaying a changed dimension on the CAD model that the changed dimension can be easily seen; and changed element teaching means for displaying, e.g., highlighting, the elements (Face, Edge and Vertex) of the CAD model that is referred to by a dimension, so that the elements can be distinguished from other elements. Therefore, the portion of a model that has been changed can be easily discerned visually.

Since the changed portion can be detected, the number of steps that must be performed when a changed portion is missed, and the number of steps required for confirming the changed portion can be reduced.

(Another Embodiment)

The scope of the present invention also includes a configuration wherein, to achieve the functions of the embodiment, software program code that implements the functions of the embodiment is supplied to an apparatus or a system computer that is connected to various devices, and the devices are operated in accordance with a program stored in the computer (a CPU or an MPU) of the system or the apparatus.

In this case, invention functions are provided by the software program code, and the program code also constitutes the present invention. The storage medium for supplying the program code can be a communication medium for a computer network (LAN or the Internet) system that acts as a carrier for the transmission of program information.

Further, means for supplying the program code to a computer, e.g., a storage medium on which the program code is stored (a floppy disk, a CD-ROM, a magnetic tape, a nonvolatile memory card, a ROM, a hard disk, an optical disk, a magneto-optical disk, etc.), constitutes the present invention.

In addition, with the present invention it is not only possible for the functions of the previous embodiment to be provided through the execution of program code by a computer, but also, the program code can interact with an OS (Operating System) or with another software application running on the computer to provide the functions described in the above embodiment.

As many apparently widely different embodiments for the present invention can be devised without departing from the spirit and scope thereof, it is to be understood that the invention is not limited to the specific embodiments presented herein except as defined in the appended claims.

What is claimed is:

1. An information processing apparatus comprising:
   attribution categorization means for sorting attribution information of a 3D model into a plurality of groups;
   selection means for selecting a group from the plurality of group;
   display means for selectively displaying a part of the attribution information corresponding to the group selected by said selection means with the 3D model in a virtual 3D space.

2. An information processing apparatus according to claim 1, wherein said display means displays in order the attribution information for each of said categorized groups.

3. An information processing apparatus according to claim 1, further comprising:
   visual line setting means for defining a plurality of view directions for the 3D model;
   storage means for storing one of said plurality of visual directions each in correlation with the plurality of groups in which attribution information is sorted; and
   wherein said selection means selects a group corresponding to user's designation, and said display means displays attribution information which belongs to the group selected by said selection means.

4. An information processing apparatus according to claim 1, wherein:
   said attribution categorization means sorts the attribution information into the plurality of groups for each operation plan, and said display means displays attribution information corresponding to a group selected by said selecting means.

5. An information processing method comprising:
   sorting attribution information of a 3D model into a plurality of groups;
   selecting a group from the plurality of groups;
   displaying the attribution information corresponding to the group selected in said selecting a group with the 3D model in a virtual 3D space.

6. An information processing method according to claim 5, further comprising:
   defining a plurality of view directions for the 3D model; and
   storing one of said plurality of visual directions in correlation with the plurality of groups in which attribution information is sorted,
   wherein a group corresponding to user's designation is selected in said selecting a group, and attribution information which belongs to the group selected in said selecting a group is displayed in said displaying the attribution information.

7. A computer-readable medium encoded with processing instructions for implementing a method comprising:
   sorting attribution information of a 3D model into a plurality of groups;
   selecting a group from the plurality of groups;
   displaying the attribution information corresponding to the group selected in said step of selecting a group with the 3D model in a virtual 3D space.

8. A computer-readable medium according to claim 7, wherein the method further comprises:
   a plurality of view directions for the 3D model; and
   storing one of said plurality of visual directions in correlation with the plurality of groups in which attribution information is sorted,
   wherein a group corresponding to user's designation is selected in said selecting a group, and attribution information which belongs to the group selected in said selecting a group is displayed in said displaying the attribution information.

9. An information processing apparatus comprising:

identifier addition means for adding an identification number to each part of attribution information of a 3D model;

display means for displaying the each identification number near the corresponded part of attribution information with 3D model in a virtual 3D space; and output means for outputting the attribution information with the identification number as a list to input a result of measurement of an objet corresponding to the 3D model.

10. An information processing method comprising:

adding an identification number to each part of attribution information of a 3D model;

displaying the each identification number near the corresponded part of attribution information with the 3D model in a virtual 3D space; and outputting the attribution information with the identification number as a list to input a result of measurement of an objet corresponding to the 3D model.

11. A computer-readable medium encoded with processing instructions for implementing a method comprising:

adding an identification number to each part of attribution information of a 3D model;

displaying the each identification number near the corresponded part of attribution information with the 3D model in a virtual 3D space; and outputting the attribution information with the identification number as a list to input a result of measurement of an object corresponding to the 3D model.

* * * * *